United States Patent
Noffsinger et al.

(10) Patent No.: US 8,180,544 B2
(45) Date of Patent: *May 15, 2012

(54) SYSTEM AND METHOD FOR OPTIMIZING A BRAKING SCHEDULE OF A POWERED SYSTEM TRAVELING ALONG A ROUTE

(75) Inventors: Joseph Forrest Noffsinger, Lees Summit, MO (US); Ajith Kuttannair Kumar, Erie, PA (US); David Michael Peltz, Melbourne, FL (US)

(73) Assignee: General Electric Company, Schenectady, NY (US)

( * ) Notice: Subject to any disclaimer, the term of this patent is extended or adjusted under 35 U.S.C. 154(b) by 635 days.

This patent is subject to a terminal disclaimer.

(21) Appl. No.: 12/352,861

(22) Filed: Jan. 13, 2009

(65) Prior Publication Data

US 2009/0125170 A1     May 14, 2009

Related U.S. Application Data

(63) Continuation-in-part of application No. 12/183,310, filed on Jul. 31, 2008, which is a continuation-in-part of application No. 11/739,864, filed on Apr. 25, 2007, now Pat. No. 7,715,958.

(60) Provisional application No. 60/988,605, filed on Nov. 16, 2007.

(51) Int. Cl.
    *G06F 19/00*      (2006.01)
(52) U.S. Cl. ............ 701/70; 701/29.7; 701/83; 303/167
(58) Field of Classification Search .................... 701/22, 701/33, 34, 70, 83, 209, 29.7, 34.3, 420; 303/155, 166, 167
See application file for complete search history.

(56) References Cited

U.S. PATENT DOCUMENTS

| | | | |
|---|---|---|---|
| 3,519,805 A | 7/1970 | Thorne-Booth |
| 3,650,216 A | 3/1972 | Harwick et al. |
| 3,655,962 A | 4/1972 | Koch |
| 3,865,042 A | 2/1975 | DePaola et al. |
| 4,005,838 A | 2/1977 | Grundy |
| 4,041,283 A | 8/1977 | Mosier |
| 4,042,810 A | 8/1977 | Mosher |
| 4,181,943 A | 1/1980 | Mercer, Sr. |
| 4,203,058 A | 5/1980 | Chen |
| 4,253,399 A | 3/1981 | Spigarelli |

(Continued)

FOREIGN PATENT DOCUMENTS

DE     102 33 845     7/2002

(Continued)

*Primary Examiner* — Gertrude Arthur Jeanglaude
(74) *Attorney, Agent, or Firm* — GE Global Patent Operation; John A. Kramer

(57) ABSTRACT

An optimization system is provided for a braking schedule of a powered system traveling along a route. The braking schedule is based on at least one predetermined characteristic of the powered system and is configured to be enacted in a braking region along the route. The optimization system includes a sensor configured to measure a parameter related to the operation of the powered system. Additionally, the system includes a processor coupled to the sensor, to receive parameter data. The processor compares the measured parameter with an expected parameter, which is based on the at least one predetermined characteristic of the powered system. The processor adjusts the at least one predetermined characteristic based on the comparison, and adjusts the braking schedule based on the adjustment to the at least one predetermined characteristic. A method is also provided for optimizing a braking schedule of a powered system traveling along a route.

22 Claims, 36 Drawing Sheets

U.S. PATENT DOCUMENTS

| | | | |
|---|---|---|---|
| 4,279,395 | A | 7/1981 | Boggio et al. |
| 4,344,364 | A | 8/1982 | Nickles et al. |
| 4,401,035 | A | 8/1983 | Spigarelli et al. |
| 4,440,015 | A | 4/1984 | Hann |
| 4,561,057 | A | 12/1985 | Haley, Jr. et al. |
| 4,602,335 | A | 7/1986 | Perlmutter |
| 4,711,418 | A | 12/1987 | Aver, Jr. et al. |
| 4,735,385 | A | 4/1988 | Nickles et al. |
| 4,794,548 | A | 12/1988 | Lynch et al. |
| 4,827,438 | A | 5/1989 | Nickles et al. |
| 4,830,437 | A | 5/1989 | Runsey |
| 4,853,883 | A | 8/1989 | Nickles et al. |
| 5,041,772 | A | 8/1991 | Earlson |
| 5,109,343 | A | 4/1992 | Budway |
| 5,398,894 | A | 3/1995 | Pascoe |
| 5,437,422 | A | 8/1995 | Newman |
| 5,440,489 | A | 8/1995 | Newman |
| 5,517,093 | A | 5/1996 | Augustyniak et al. |
| 5,586,812 | A | 12/1996 | Kanjo et al. |
| 5,676,059 | A | 10/1997 | Alt |
| 5,744,707 | A | 4/1998 | Kull |
| 5,758,299 | A | 5/1998 | Sandborg et al. |
| 5,785,392 | A | 7/1998 | Hart |
| 5,828,979 | A | 10/1998 | Polivka et al. |
| 5,898,102 | A | 4/1999 | Skantar |
| 5,950,967 | A | 9/1999 | Montgomery |
| 6,035,250 | A | 3/2000 | Newton et al. |
| 6,112,142 | A | 8/2000 | Shockley et al. |
| 6,125,311 | A | 9/2000 | Lo |
| 6,144,901 | A | 11/2000 | Nickles et al. |
| 6,269,034 | B1 | 7/2001 | Shibuya |
| 6,273,522 | B1 | 8/2001 | Feetenby et al. |
| 6,308,117 | B1 | 10/2001 | Ryland et al. |
| 6,435,624 | B1 | 8/2002 | Kull |
| 6,474,150 | B1 | 11/2002 | Berg et al. |
| 6,487,488 | B1 | 11/2002 | Peterson, Jr. et al. |
| 6,505,103 | B1 | 1/2003 | Howell et al. |
| 6,516,727 | B2 | 2/2003 | Kraft |
| 6,578,679 | B2 | 6/2003 | Hill et al. |
| 6,591,758 | B2 | 7/2003 | Kumar |
| 6,609,049 | B1 | 8/2003 | Kane et al. |
| 6,612,245 | B2 | 9/2003 | Kumar et al. |
| 6,612,246 | B2 | 9/2003 | Kumar |
| 6,615,118 | B2 | 9/2003 | Kumar |
| 6,625,539 | B1 | 9/2003 | Kittell et al. |
| 6,629,034 | B1 | 9/2003 | Kozak et al. |
| 6,691,957 | B2 | 2/2004 | Hess, Jr. et al. |
| 6,694,231 | B1 | 2/2004 | Rezk |
| 6,732,023 | B2 | 5/2004 | Sugita et al. |
| 6,763,291 | B1 | 7/2004 | Houpt et al. |
| 6,768,944 | B2 | 7/2004 | Breed et al. |
| 6,789,005 | B2 | 9/2004 | Hawthorne |
| 6,810,312 | B2 | 10/2004 | Jammu et al. |
| 6,824,110 | B2 | 11/2004 | Kane et al. |
| 6,845,953 | B2 | 1/2005 | Kane et al. |
| 6,853,888 | B2 | 2/2005 | Kane et al. |
| 6,856,865 | B2 | 2/2005 | Hawthorne |
| 6,863,246 | B2 | 3/2005 | Kane et al. |
| 6,865,454 | B2 | 3/2005 | Kane et al. |
| 6,903,658 | B2 | 6/2005 | Kane et al. |
| 6,915,191 | B2 | 7/2005 | Kane et al. |
| 6,922,619 | B2 | 7/2005 | Baig et al. |
| 6,957,131 | B2 | 10/2005 | Kane et al. |
| 6,978,195 | B2 | 12/2005 | Kane et al. |
| 6,980,894 | B1 | 12/2005 | Gordon et al. |
| 6,996,461 | B2 | 2/2006 | Kane et al. |
| 7,021,588 | B2 | 4/2006 | Hess, Jr. et al. |
| 7,021,589 | B2 | 4/2006 | Hess, Jr. et al. |
| 7,024,289 | B2 | 4/2006 | Kane et al. |
| 7,036,774 | B2 | 5/2006 | Kane et al. |
| 7,079,926 | B2 | 7/2006 | Kane et al. |
| 7,092,800 | B2 | 8/2006 | Kane et al. |
| 7,092,801 | B2 | 8/2006 | Kane et al. |
| 7,359,770 | B2 | 4/2008 | Cole |
| 7,703,563 | B2 * | 4/2010 | Aldrich et al. ............ 180/65.265 |
| 7,974,760 | B2 * | 7/2011 | Rowley et al. .................. 701/70 |
| 2002/0059075 | A1 | 5/2002 | Schick et al. |
| 2002/0096081 | A1 | 7/2002 | Kraft |
| 2003/0213875 | A1 | 11/2003 | Hess, Jr. et al. |
| 2004/0133315 | A1 | 7/2004 | Kumar et al. |
| 2004/0245410 | A1 | 12/2004 | Kisak et al. |
| 2005/0065674 | A1 | 3/2005 | Houpt et al. |
| 2005/0120904 | A1 | 6/2005 | Kumar et al. |
| 2005/0274553 | A1 | 12/2005 | Salman et al. |
| 2006/0005736 | A1 | 1/2006 | Kumar |
| 2007/0219680 | A1 | 9/2007 | Kumar et al. |

FOREIGN PATENT DOCUMENTS

| | | |
|---|---|---|
| EP | 0 391 047 | 2/1990 |
| EP | 1 245 431 | 10/2002 |
| EP | 1 297 982 | 4/2003 |
| EP | 1 522 480 | 10/2004 |
| WO | WO 01/92076 | 5/2001 |
| WO | WO 2007/095401 | 1/2007 |

* cited by examiner

SYSTEM AND METHOD FOR OPTIMIZING A BRAKING SCHEDULE OF A POWERED SYSTEM TRAVELING ALONG A ROUTE

CROSS-REFERENCE TO RELATED APPLICATIONS

This application claims priority to and is a Continuation-In-Part of U.S. application Ser. No. 12/183,310 filed Jul. 31, 2008, which claims the benefit of U.S. Provisional No. 60/988,605 filed Nov. 16, 2007. U.S. application Ser. No. 12/183,310 is also a Continuation-In-Part of U.S. application Ser. No. 11/739,864 filed Apr. 25, 2007, now U.S. Pat. No. 7,715,958 and incorporated herein by reference in its entirety.

BACKGROUND OF THE INVENTION

A powered system traveling along a route, such as a train traveling along a railway, for example, will typically need to slow down and stop at some upcoming stop point. For example, a train may be traveling in a first block section of a railway which features a yellow signal, and subsequently into a second block section of the railway which features a red signal, in which the train must stop. Thus, the operator of the train needs to know when to begin activating a braking system of the train and/or at what level to activate the braking system, such that the train slows and stops at the red signal in the second block section.

Conventional systems have been proposed to assist the operator in slowing and stopping a train prior to a stop point. These conventional systems typically utilize braking tables, which may illustrate a projected speed of the train over a projected time or distance leading up to the stop point. Thus, based on the braking tables, the operator can selectively activate the braking system such that the actual speed of the train tracks the projected speed, until the train stops at the stop point. However, use of these conventional braking tables has several shortcomings.

Some conventional braking tables do not consider the actual train parameters, which may significantly impact its braking performance, such as mass, for example. Instead, the conventional braking tables presume conservative parameters of a hypothetical train, such as a maximum mass, in order to maintain a conservative speed projection. The conventional braking tables may presume other conservative factors which minimize braking performance, and maintain the conservative speed projection, such as a maximum length of the train, a wet weather condition, and/or minimal rail braking adhesion, for example. Although these conventional braking tables presume conservative factors in order to ensure that the train does not pass the stop point, the actual train parameters may provide a far greater braking performance, which would allow the train to delay braking for a later time/distance, and thus improve its overall efficiency. Although other conventional braking tables have been proposed which attempt to consider the actual train parameters, these braking tables merely consider estimates of the actual train parameters, which may have large magnitudes of error. Since the braking curve is only as accurate as the accuracy of the inputted train parameters, these conventional braking tables may convey inaccurate information to the train operator.

Accordingly, there is a need in the industry to optimize these braking tables, such that they are not overly conservative and thus not causing the train to commence braking at a premature time or distance, to thereby improve the operating efficiency of the train. Additionally, there is a need to optimize the braking tables, such that the actual train parameters used to determine the braking tables are verified, and thus the braking table accurately reflects the actual braking capability of the train.

BRIEF DESCRIPTION OF THE INVENTION

In one embodiment of the present invention, an optimization system is provided for a braking schedule of a powered system traveling along a route. The braking schedule is based on at least one predetermined characteristic of the powered system and is configured to be enacted in a braking region along the route. The optimization system includes a sensor configured to measure a parameter related to the operation of the powered system. Additionally, the system includes a processor coupled to the sensor, to receive data of the parameter. The processor compares the measured parameter with an expected parameter, which is based on the at least one predetermined characteristic of the powered system. The processor adjusts the at least one predetermined characteristic based on the comparison, and adjusts the braking schedule based on the adjustment to the at least one predetermined characteristic. ("Predetermined characteristic" refers to an aspect of the powered system, such as a physical or operational aspect, that relates to braking of the powered system, which is determined in advance of enacting a braking plan, and which may be estimated, approximated, or otherwise designated in an initial instance.)

In another embodiment of the present invention, an optimization system is provided for a braking schedule of a powered system. The optimization system includes the powered system configured to travel along a route. The braking schedule is based on at least one predetermined characteristic of the powered system and is configured to be enacted in a braking region along the route. Additionally, the optimization system includes a sensor configured to measure a parameter related to the operation of the powered system. The measured parameter is compared with an expected parameter, which is based on the at least one predetermined characteristic of the powered system. The at least one predetermined characteristic is adjusted, based on the comparison. Additionally, the braking schedule is adjusted, based on the adjustment to the at least one predetermined characteristic.

In another embodiment of the present invention, a method is provided for optimizing a braking schedule of a powered system traveling along a route. The braking schedule is based on at least one predetermined characteristic of the powered system and is configured to be enacted in a braking region along the route. The method includes measuring a parameter related to the operation of the powered system. Additionally, the method includes comparing the measured parameter with an expected parameter, where the expected parameter is based on the at least one predetermined characteristic of the powered system. The method further includes adjusting the at least one predetermined characteristic based on the comparing step. Additionally, the method includes adjusting the braking schedule, based on the adjusting to the at least one predetermined characteristic.

BRIEF DESCRIPTION OF THE DRAWINGS

A more particular description of the invention briefly described above will be rendered by reference to specific embodiments thereof that are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Though exemplary embodiments of the present invention are described with respect to rail vehicles, specifically trains and locomotives having diesel engines, embodiments of the invention are also applicable for use in other powered systems, including, but not limited to, off-highway vehicles (such as mine trucks and other mining or construction vehicular equipment), marine vessels, and other transport vehicles such as transport buses and agricultural vehicles.

Figure 1:
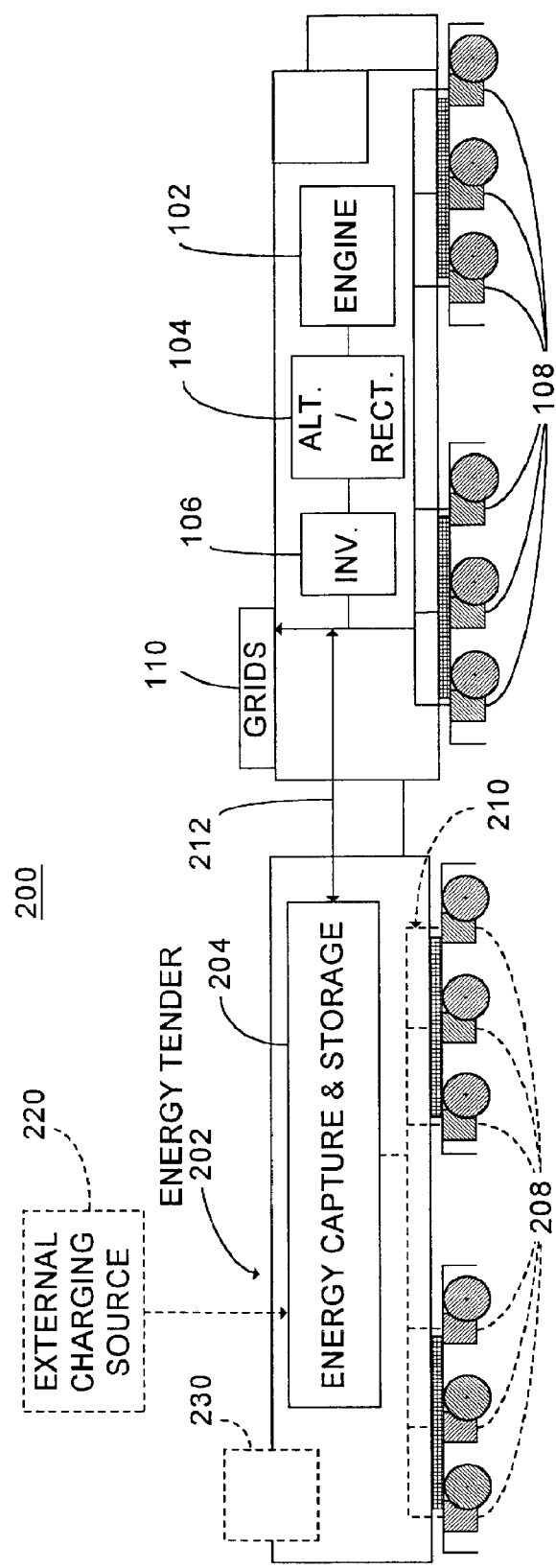
FIG. 1 is a block diagram of one embodiment of a hybrid energy locomotive system having a separate energy tender vehicle in accordance with aspects of the present invention.

FIG. 1 is a block diagram of one embodiment of a hybrid energy locomotive system 200. In this embodiment, the hybrid energy locomotive system includes an energy tender vehicle 202 for capturing and regenerating at least a portion of the dynamic braking electric energy generated when the locomotive traction motors operate in a dynamic braking mode. The energy tender vehicle 202 is constructed and arranged to be coupled to the locomotive in a consist configuration, and includes an energy capture and storage system 204 (sometimes referred to as an energy storage medium or an energy storage). It should be understood that it is common to use two or more locomotives in a consist configuration (the term "consist" usually referring to two or more locomotives in a train) and that FIG. 1 illustrates a single locomotive for convenience.

In one embodiment, the energy capture and storage system 204 selectively receives electrical power generated during the dynamic braking mode of operation and stores it for later regeneration and use. In the alternative or in addition to receiving and storing dynamic braking power, energy capture and storage system 204 can also be constructed and arranged to receive and store power from other sources. For example, excess prime mover power from engine 102 can be transferred and stored. Similarly, when two or more locomotives are operating in a consist, excess power from one of the locomotives can be transferred and stored in energy capture and storage system 204. Also, a separate power generator (e.g., diesel generator) can be used to supply a charging voltage (e.g., a constant charging voltage) to the energy capture and storage system. Still another source of charging is an optional off-train charging source 220. For example, energy capture and storage system 204 can be charged by external sources such as a battery charger in a train yard or at a wayside station.

The energy capture and storage system 204 includes at least one of the following storage subsystems for storing the electrical energy generated during the dynamic braking mode: a battery subsystem, a flywheel subsystem, and/or an ultra-capacitor subsystem. Other storage subsystems are possible. Ultra-capacitors are available from Maxwell Technologies. These storage subsystems may be used separately or in combination. When used in combination, these storage subsystems can provide synergistic benefits not realized with the use of a single energy storage subsystem. A flywheel subsystem, for example, typically stores energy relatively fast but may be relatively limited in its total energy storage capacity. A battery subsystem, on the other hand, often stores energy relatively slowly but can be constructed to provide a relatively large total storage capacity. Hence, a flywheel subsystem may be combined with a battery subsystem wherein the flywheel subsystem captures the dynamic braking energy that cannot be timely captured by the battery subsystem. The energy thus stored in the flywheel subsystem may be thereafter used to charge the battery. Accordingly, the overall capture and storage capabilities are preferably extended beyond the limits of either a flywheel subsystem or a battery subsystem operating alone. Such synergies can be extended to combinations of other storage subsystems, such as a battery and ultra-capacitor in combination where the ultra-capacitor supplies the peak demand needs.

It should be noted at this point that, when a flywheel subsystem is used, a plurality of flywheels may be arranged to limit or eliminate the gyroscopic effect each flywheel might otherwise have on the locomotive and load vehicles. For example, the plurality of flywheels may be arranged on a six-axis basis to greatly reduce or eliminate gyroscopic effects. It should be understood, however, that reference herein to a flywheel embraces a single flywheel or a plurality of flywheels.

Referring still to FIG. 1, the energy capture and storage system 204 not only captures and stores electric energy generated in the dynamic braking mode of the locomotive, it also supplies the stored energy to assist the locomotive effort (e.g., to supplement and/or replace prime mover power). For example, energy tender vehicle 202 optionally includes a plurality of energy tender traction motors 208 mounted on the trucks supporting the energy tender vehicle 202. The electrical power stored in energy capture and storage system 204 may be selectively supplied (e.g., via lines 210) to the energy tender traction motors 208. Thus, during times of increased demand, energy tender traction motors 208 augment the tractive power provided by locomotive traction motors 108. As another example, during times when it is not possible to store more energy from dynamic braking (e.g., energy storage system 204 is charged to capacity), efficiency considerations may suggest that energy tender traction motors 208 also augment the locomotive traction motors 108.

It should be appreciated that when energy capture and storage system 204 drives energy tender traction motors 208, additional circuitry will likely be required. For example, if energy capture and storage system 204 comprises a battery storing and providing a DC voltage, one or more inverter drives may be used to convert the DC voltage to a form suitable for use by the energy tender traction motors 208. Such drives are preferably operationally similar to those associated with the main locomotive.

Rather than (or in addition to) using the electrical power stored in energy capture and storage system 204 for powering separate energy tender traction motors 208, such stored energy may also be used to augment the electrical power supplied to locomotive traction motors 108 (e.g., via line 212).

Other configurations are also possible. For example, the locomotive itself may be constructed and arranged (e.g., either during manufacturing or as part of a retrofit program) to capture, store, and regenerate excess electrical energy, such as dynamic braking energy or excess motor power. In another embodiment, a locomotive may be replaced with an autonomous tender vehicle. In still another embodiment, similar to the embodiment illustrated in FIG. 1, the separate energy tender vehicle is used solely for energy capture, storage, and regeneration—the tender does not include the optional traction motors 208. In yet another embodiment, a separate tender vehicle is replaced with energy capture and storage subsystems located on some or all of the load units attached to the locomotive. Such load units may optionally include separate traction motors. In each of the foregoing embodiments, the energy capture and storage subsystem can include one or more of the subsystems previously described.

When a separate energy tender vehicle (e.g., energy tender vehicle 202) is used, the tender vehicle 202 and the locomotive are preferably coupled electrically (e.g., via line 212) such that dynamic braking energy from the locomotive traction motors and/or from optional energy tender traction motors 208 is stored in energy storage means on board the tender. During motoring operations, the stored energy is selectively used to propel the locomotive traction motors 108 and/or optional traction motors 208 of tender vehicle 202. Similarly, when the locomotive engine produces more power than required for motoring, the excess prime mover power can be stored in energy capture and storage for later use.

If energy tender vehicle 202 is not electrically coupled to the locomotive (other than for standard control signals), traction motors 208 on the tender vehicle can also be used in an autonomous fashion to provide dynamic braking energy to be stored in energy capture and storage system 204 for later use. One advantage of such a configuration is that tender vehicle 202 can be coupled to a wide variety of locomotives, in almost any consist.

It should be appreciated that when energy tender traction motors 208 operate in a dynamic braking mode, various reasons may counsel against storing the dynamic braking energy in energy capture and storage system 204 (e.g., the storage may be full). Thus, some or all of such dynamic braking energy be dissipated by resistive grids associated with the energy tender vehicle 202 (not shown), or transferred to braking grids 110 (e.g., via line 212).

The embodiment of FIG. 1 will be further described in terms of one possible operational example. It is to be understood that this operational example does not limit the invention. The locomotive system 200 is configured in a consist including a locomotive, an energy tender vehicle 202, and at least one load vehicle. The locomotive may be, for example, an AC diesel-electric locomotive. Tractive power for the locomotive is supplied by a plurality of locomotive traction motors 108. In one embodiment, the locomotive has six axles, each axle includes a separate locomotive traction motor, and each traction motor is an AC traction motor. The locomotive includes a diesel engine 102 that drives an electrical power system. More particularly, the diesel engine drives an alternator/rectifier that comprises a source of prime mover electrical power (sometimes referred to as traction power or primary power). In this particular embodiment, the prime mover electrical power is DC power that is converted to AC power for use by the traction motors. More specifically, one or more inverters (e.g., inverter 106) receive the prime mover electrical power and selectively supply AC power to the plurality of locomotive traction motors 108 to propel the locomotive. Thus, locomotive traction motors 108 propel the locomotive in response to the prime mover electrical power.

Each of the plurality of locomotive traction motors 108 is operable in at least two operating modes, a motoring mode and a dynamic braking mode. In the motoring mode, the locomotive traction motors 108 receive electrical power (e.g., prime mover electrical power via inverters) to propel the locomotive. As described elsewhere herein, when operating in the dynamic braking mode, the traction motors generate electricity. In the embodiment of FIG. 1, energy tender vehicle 202 is constructed and arranged to selectively capture and store a portion of the electricity generated by the traction motors during dynamic braking operations. This is accomplished by energy capture and storage system 204. The captured and stored electricity is selectively used to provide a secondary source of electric power. This secondary source of electric power may be used to selectively supplement or replace the prime mover electrical power (e.g., to help drive one or more locomotive traction motors 108) and/or to drive one or more energy tender traction motors 208. In the latter case, energy tender traction motors 208 and locomotive traction motors 108 cooperate to propel the consist.

Advantageously, tender capture and storage system 204 can store dynamic braking energy without any electrical power transfer connection with the primary locomotive. In other words, energy capture and storage system 204 can be charged without a connection such as line 212. This is accomplished by operating the locomotive engine 102 to provide motoring power to locomotive traction motors 108 while operating the tender vehicle 202 in a dynamic braking mode. For example, the locomotive engine 102 may be operated at a relatively high notch setting while tender vehicle traction motors 208 are configured for dynamic braking. Energy from the dynamic braking process can be used to charge energy capture and storage system 204. Thereafter, the stored energy can be used to power energy tender traction motors 208 to provide additional motoring power to the train. One of the advantages of such a configuration is that the tender vehicle 202 can be placed anyway in the train. For example, in one wireless embodiment, the tender vehicle 202 provides its own local power (e.g., for controls or lighting) and communicates via a radio link with other vehicles in the train, as necessary. An air brake connection would likely also be connected to tender vehicle 202. Of course, minimal wiring such as standard lighting wiring and control wiring could be optionally routed to the tender vehicle 202, if so desired.

It is known in the art that diesel-electric locomotives are often loud and the vibrations associated with the engine make the environment uncomfortable for train operators. Accordingly, in one embodiment, the tender vehicle 202 is modified to include an operator compartment such that the train engineer can operate the train from the relative comfort of the tender, rather than from the locomotive. FIG. 1 reflects this schematically at the aft end of tender with reference character 230.

Figure 2:
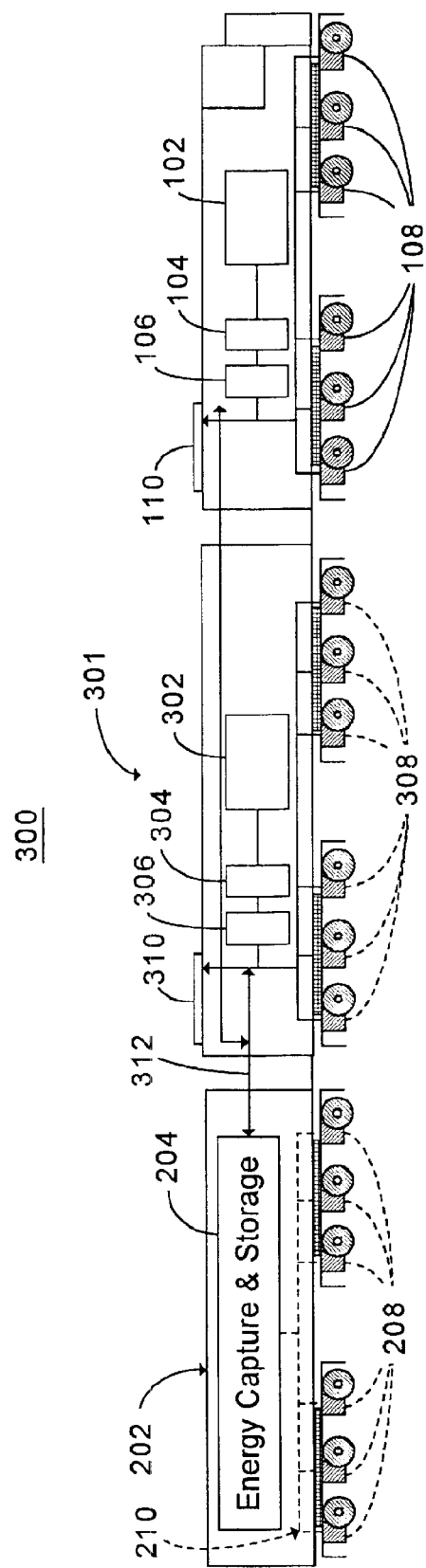
FIG. 2 is a block diagram of one embodiment of a hybrid energy locomotive system having a second engine for charging an energy storage system, including an energy storage system associated with an energy tender vehicle.

FIG. 2 is a block diagram of another embodiment of a hybrid energy locomotive system 300. This embodiment includes a second engine vehicle 301 for charging the energy tender vehicle 202. The second engine vehicle 301 comprises a diesel engine 302 that is preferably smaller than the main locomotive engine 102, but which otherwise operates according similar principles. For example, second engine vehicle 301 comprises an alternator/rectifier 304 (driven by the second engine 302), one or more inverters 306, and a plurality of braking grids 310. In one embodiment, second engine 302 runs at a constant speed to provide a constant charging source (e.g., 200-400 hp) for energy tender vehicle 202. Thus, when a hybrid energy locomotive system is configured as shown in FIG. 2, energy capture and storage system 204 preferably receives charging energy from one or both of the primary locomotive (e.g., dynamic braking energy), and second engine vehicle 301 (e.g., direct charging) via line 312. It should be understood that, although second engine vehicle 301 is shown as a separate vehicle, it could also be included, for example, as an integral part of energy tender vehicle 202 or a load vehicle. Also, dynamic braking generators (e.g., via traction motors 308) could be optionally included with second engine vehicle 301 thereby providing an additional source of power for storage in energy capture and storage system 204.

Figure 3:
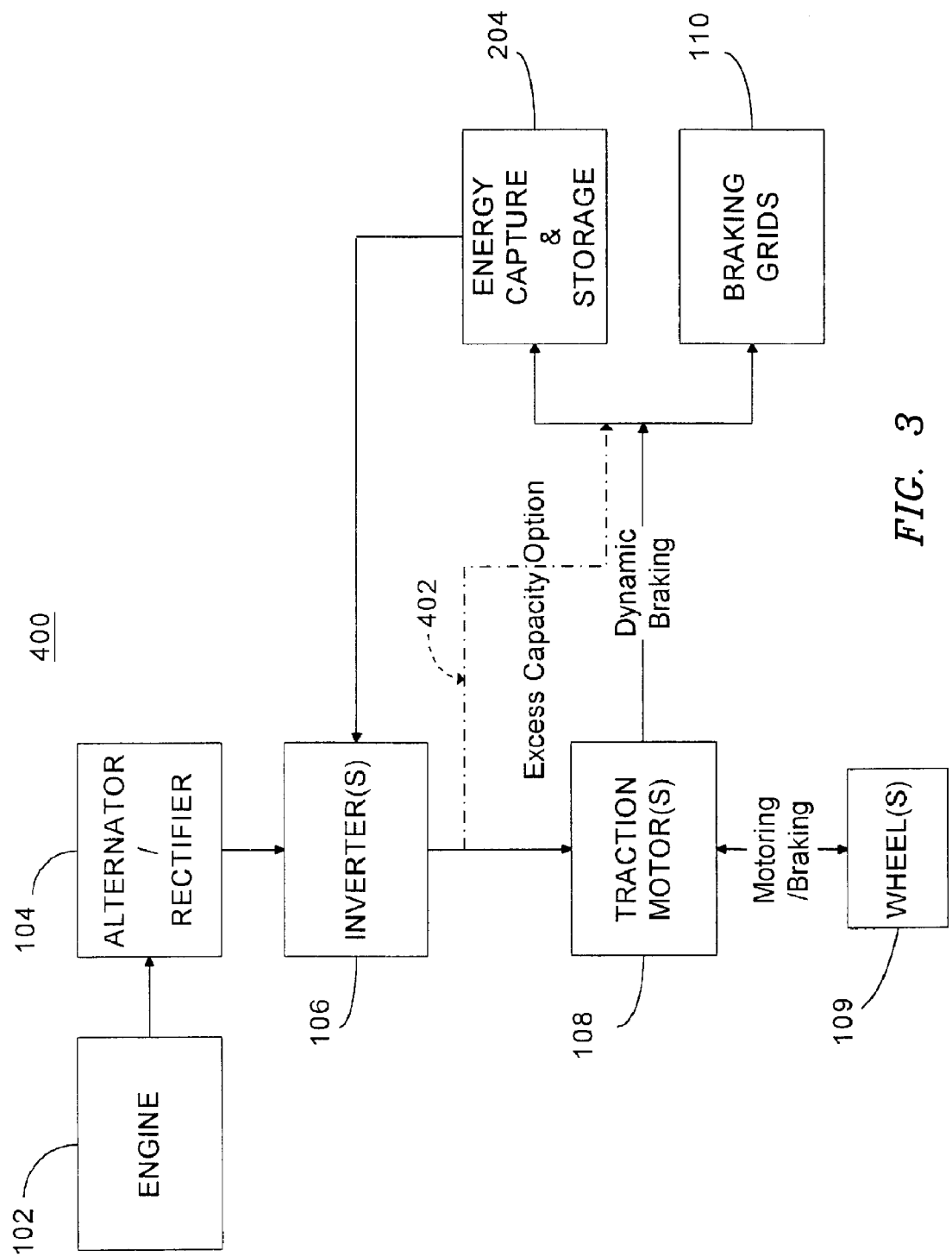
FIG. 3 is a block diagram illustrating an embodiment of an energy storage and generation system suitable for use in connection with a hybrid energy locomotive system.

FIG. 3 is a system-level block diagram that illustrates aspects of one embodiment of an energy storage and generation system. In particular, FIG. 3 illustrates an energy storage and generation system 400 suitable for use with a hybrid energy locomotive system, such as hybrid energy locomotive system 200 or system 300 (FIGS. 1 and 2). Such an energy storage and generation system 400 could be implemented, for example, as part of a separate energy tender vehicle (e.g., FIGS. 1 and 2) and/or incorporated into a locomotive.

As illustrated in FIG. 3, a diesel engine 102 drives a primary mover power source 104 (e.g., an alternator/rectifier converter). The primary mover power source 104 supplies DC power to an inverter 106 that provides three-phase AC power to a locomotive traction motor 108. It should be understood, however, that the system 400 illustrated in FIG. 3 can be modified to operate with DC traction motors as well. Typically, there is a plurality of traction motors (e.g., one per axle), and each axle is coupled to a plurality of locomotive wheels. In other words, each locomotive traction motor includes a rotatable shaft coupled to the associated axle for providing tractive power to the wheels. Thus, each locomotive traction motor 108 provides the necessary motoring force to an associated plurality of locomotive wheels 109 to cause the locomotive to move.

When the traction motors 108 are operated in a dynamic braking mode, at least a portion of the generated electrical power is routed to an energy storage medium such as an energy storage system 204. To the extent that the energy storage system 204 is unable to receive and/or store all of the dynamic braking energy, the excess energy is routed to braking grids 110 for dissipation as heat energy. Also, during periods when engine 102 is being operated such that it provides more energy than is needed to drive the traction motors 108, the excess capacity (also referred to as excess prime mover electric power) may be optionally stored in an energy storage system 204. Accordingly, the energy storage system 204 can be charged at times other than when the traction motors 108 are operating in the dynamic braking mode. This aspect of the system is illustrated in FIG. 3 by a dashed line 402.

The energy storage system 204 of FIG. 3 is constructed and arranged to selectively augment the power provided to the traction motors 108 or, optionally, to power separate traction motors associated with a separate energy tender vehicle (see FIG. 1 above) or a load vehicle. Such power may be referred to as secondary electric power and is derived from the electrical energy stored in an energy storage system 204. Thus, the system 400 illustrated in FIG. 3 is suitable for use in connection with a locomotive having an on-board energy storage medium and/or with a separate energy tender vehicle.

Figure 4:
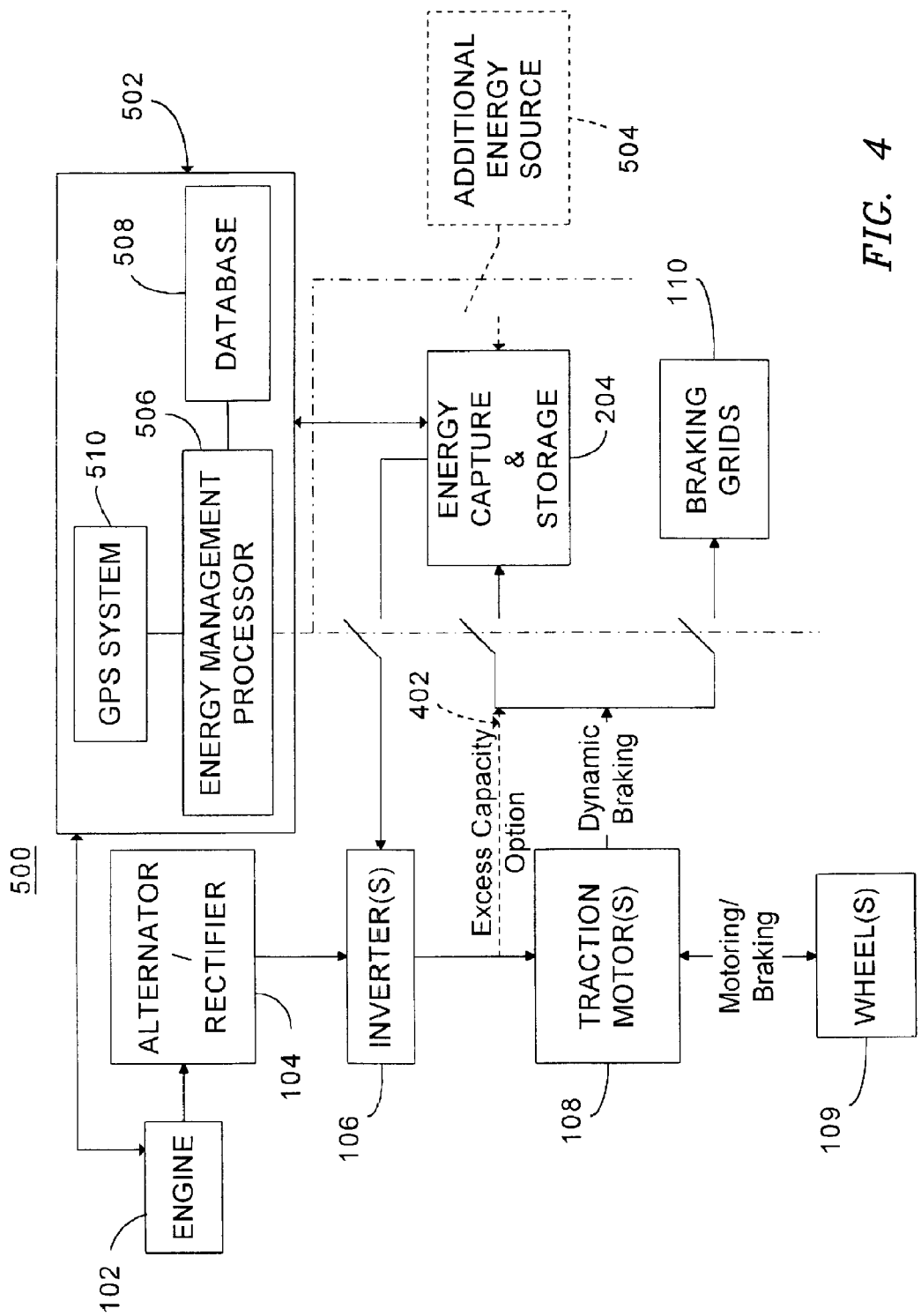
FIG. 4 is a block diagram illustrating an energy storage and generation system suitable for use in a hybrid energy locomotive system, including an energy management system for controlling the storage and regeneration of energy.

FIG. 4 is a block diagram that illustrates aspects of one embodiment of an energy storage and generation system 500 suitable for use with a hybrid energy locomotive system. The system 500 includes an energy management system 502 for controlling the storage and regeneration of energy. It should be understood, however, that the energy management system 502 illustrated in FIG. 4 is also suitable for use with other large, off-highway vehicles that travel along a relatively well-defined course. Such vehicles include, for example, large excavators, excavation dump trucks, and the like. By way of further example, such large excavation dump trucks may employ motorized wheels such as the GEB23™ AC motorized wheel employing the GE150AC™ drive system (both of which are available from the assignee of the present invention). Therefore, although FIG. 4 is generally described with respect to a locomotive system, the system 500 illustrated therein is not to be considered as limited to locomotive applications.

Referring still to the exemplary embodiment illustrated in FIG. 4, system 500 operates in the same general manner as system 400 of FIG. 3; the energy management system 502 provides additional intelligent control functions. FIG. 4 also illustrates an optional energy source 504 that is controlled by the energy management system 502. The optional energy source 504 may be a second engine (e.g., the charging engine illustrated in FIG. 2 or another locomotive in the consist) or a completely separate power source (e.g., a wayside power source such as a battery charger) for charging the energy storage system 204. In one embodiment, such a separate charger includes an electrical power station for charging an energy storage medium associated with a separate energy tender vehicle (e.g., tender vehicle 202 of FIG. 1) while stationary, or a system for charging the energy storage medium while the tender vehicle is in motion. In one embodiment, optional energy source 504 is connected to a traction bus (not illustrated in FIG. 4) that also carries primary electric power from primary mover power source 104.

As illustrated, in this embodiment the energy management system 502 includes an energy management processor 506, a database 508, and a position identification device 510, such as, for example, a global positioning system (GPS) receiver. The energy management processor 506 determines present and anticipated train position information via the position identification device 510. In one embodiment, energy management processor 506 uses this position information to locate data in the database 508 regarding present and/or anticipated track topographic and profile conditions, sometimes referred to as track situation information. Such track situation information may include, for example, track grade, track elevation (e.g., height above mean sea level), track curve data, tunnel information, speed limit information, and the like. It is to be understood that such database information could be provided by a variety of sources including: an onboard database associated with the processor 506, a communication system (e.g., a wireless communication system) providing the information from a central source, manual operator input(s), via one or more wayside signaling devices, a combination of such sources, and the like. Finally, other vehicle information such as the size and weight of the vehicle, a power capacity associated with the prime mover, efficiency ratings, present and anticipated speed, present and anticipated electrical load, and so on may also be included in a database (or supplied in real or near real time) and used by energy management processor 506. It should be appreciated that, in an alternative embodiment, energy management system 502 could be configured to determine power storage and transfer requirements associated with the energy storage system 204 in a static fashion. For example, energy management processor 506 could be preprogrammed with any of the above information, or could use look-up tables based on past operating experience (e.g., when the vehicle reaches a certain point, it is nearly always necessary to store additional energy to meet an upcoming demand).

The energy management processor 506 uses the present and/or upcoming track situation information, along with vehicle status information, to determine power storage and power transfer requirements. Energy management processor 506 also determines possible energy storage opportunities based on the present and future track situation information. For example, based on the track profile information, energy management processor 506 may determine that it is more efficient to completely use all of the stored energy, even though present demand is low, because a dynamic braking region is coming up (or because the train is behind schedule and is attempting to make up time). In this way, the energy management system 502 improves efficiency by accounting for the stored energy before the next charging region is encountered. As another example, energy management processor 506 may determine not to use stored energy, despite present demand, if a heavier demand is upcoming. Advantageously, energy management system 502 may also be configured to interface with engine controls. Also, as illustrated in FIG. 4, the energy storage system 204 may be configured to provide an intelligent control interface with energy management system 502.

In operation, energy management processor 506 determines a power storage requirement and a power transfer requirement. An energy storage system 204 stores electrical energy in response to the power storage requirement. The energy storage system 204 provides secondary electric power (e.g., to a traction bus connected to inverters 106 to assist in motoring) in response to the power transfer requirement. The secondary electric power is derived from the electrical energy stored in the energy storage system 204.

As explained above, energy management processor 506 determines the power storage requirement based, in part, on a situation parameter indicative of a present and/or anticipated track topographic characteristic. Energy management processor 506 may also determine the power storage requirement as a function of an amount of primary electric power available from the primary mover power source 104. Similarly, energy management processor 506 may determine the power storage requirement as function of a present or anticipated amount of primary electric power required to propel the locomotive system.

Also, in determining the energy storage requirement, energy management processor 506 considers various parameters related to the energy storage system 204. For example, the energy storage system 204 will have a storage capacity that is indicative of the amount of power that can be stored therein and/or the amount of power that can be transferred to the energy storage system 204 at any given time. Another similar parameter relates to the amount of secondary electric power that the energy storage system 204 has available for transfer at a particular time.

As explained above, system 500 includes a plurality of sources for charging the energy storage system 204. These sources include dynamic braking power, excess prime mover electric power, and external charging electric power. The energy management processor 506 determines which of these sources should charge the energy storage system 204. In one embodiment, present or anticipated dynamic braking energy is used to charge the energy storage system 204, if such dynamic braking energy is available. If dynamic braking energy is not available, either excess prime mover electric power or external charging electric power is used to charge the energy storage system 204.

In the embodiment of FIG. 4, energy management processor 506 determines the power transfer requirement as a function of a demand for power. In other words, the energy storage system 204 does not supply secondary electric power unless the traction motors 108 are operating in a power consumption mode (e.g., a motoring mode, as opposed to a dynamic braking mode). In one form, energy management processor 506 permits the energy storage system 204 to supply secondary electric power to inverters 106 until either (a) the demand for power terminates or (b) the energy storage system 204 is completely depleted. In another form, however, energy management processor 506 considers anticipated power demands and controls the supply of secondary electric power from the energy storage system 204 such that sufficient reserve power remains in the energy storage system 204 to augment prime mover power source during peak demand periods. This may be referred to as a "look ahead" energy management scheme.

In the look ahead energy management scheme, energy management processor 506 considers various present and/or anticipated track situation parameters, such as those discussed above. In addition, energy management processor may also consider the amount of power stored in the energy storage system 204, anticipated charging opportunities, and any limitations on the ability to transfer secondary electric power from the energy storage system 204 to inverters 106.

FIGS. 5A-D, 6A-D, and 7A-E illustrate, in graphic form, aspects of three different embodiments of energy management systems, suitable for use with a hybrid energy vehicle, that could be implemented in a system such as system 500 of FIG. 4. It should be appreciated that these figures are provided for exemplary purposes and that, with the benefit of the present disclosure, other variations are possible. It should also be appreciated that the values illustrated in these figures are included to facilitate a detailed description and should not be considered in a limiting sense. It should be further understood that, although the examples illustrated in these figures relate to locomotives and trains, the energy management system and methods identified herein may be practiced with a variety of large, off-highway vehicles that traverse a known course and which are generally capable of storing the electric energy generated during the operation of such vehicles (or with other powered systems). Such off-highway vehicles include vehicles using DC and AC traction motor drives and having dynamic braking/retarding capabilities.

There are four similar charts in each group of figures (FIGS. 5A-D, FIGS. 6A-D, and FIGS. 7A-D). The first chart in each group (i.e., FIGS. 5A, 6A, and 7A) illustrates the required power for both motoring and braking. Thus, the first chart graphically depicts the amount of power required by the vehicle. Positive values on the vertical axis represent motoring power (horsepower); negative values represent dynamic braking power. It should be understood that motoring power could originate with the prime mover (e.g., diesel engine in a locomotive), or from stored energy (e.g., in an energy storage medium in a separate energy tender vehicle or in a locomotive), or from a combination of the prime mover and stored energy. Dynamic braking power could be dissipated or stored in the energy storage medium.

The horizontal axis in all charts reflects time in minutes. The time basis for each chart in a given figure group are intended to be the same. It should be understood, however, that other reference bases are possible.

The second chart in each group of figures (i.e., FIGS. 5B, 6B, and 7B) reflects theoretical power storage and consumption. Positive values reflect the amount of power that, if power were available in the energy storage medium, could be drawn to assist in motoring. Negative values reflect the amount of power that, if storage space remains in the energy storage medium, could be stored in the medium. The amount of power that could be stored or drawn is partially a function of the converter and storage capabilities of a given vehicle configuration. For example, the energy storage medium will have some maximum/finite capacity. Further, the speed at which the storage medium is able to accept or supply energy is also limited (e.g., batteries typically charge slower than flywheel devices). Other variables also affect energy storage. These variables include, for example, ambient temperature, the size and length of any interconnect cabling, current and voltage limits on DC-to-DCDC-to-DC converters used for battery charging, power ratings for an inverter for a flywheel drive, the charging and discharging rates of a battery, or a motor/shaft limit for a flywheel drive. The second chart assumes that the maximum amount of power that could be transferred to or from the energy storage medium at a given time is 500 hp. Again, it should be understood that this 500 hp limit is included for exemplary purposes. Hence, the positive and negative limits in any given system could vary as a function of ambient conditions, the state and type of the energy storage medium, the type and limits of energy conversion equipment used, and the like.

The third chart in each figure group (i.e., FIGS. 5C, 6C, and 7C) depicts a power transfer associated with the energy storage medium. In particular, the third chart illustrates the actual power being transferred to and from the energy storage medium versus time. The third chart reflects limitations due to the power available for storage, and limitations due to the present state of charge/storage of the energy storage medium (e.g., the speed of the flywheel, the voltage in an ultra-capacitor, the charge in the battery, and the like).

The fourth chart in each figure group (i.e., FIGS. 5D, 6D, and 7D) depicts actual energy stored. In particular, the fourth chart illustrates the energy stored in the energy storage medium at any particular instant in time.

Referring first to FIGS. 5A-D, these figures reflect an energy management system that stores energy at the maximum rate possible during dynamic braking until the energy storage medium is completely full. In this embodiment, all energy transfers to the storage medium occur during dynamic braking. In other words, in the embodiment reflected in FIGS. 5A-D, no energy is transferred to the energy storage medium from excess prime mover power available during motoring, or from other energy sources. Similarly, energy is discharged, up to the maximum rate, whenever there is a motor demand (limited to and not exceeding the actual demand) until the energy storage medium is completely discharged/empty. FIGS. 5A-D assume that the energy storage medium is completely discharged/empty at time 0.

Figure 5A:
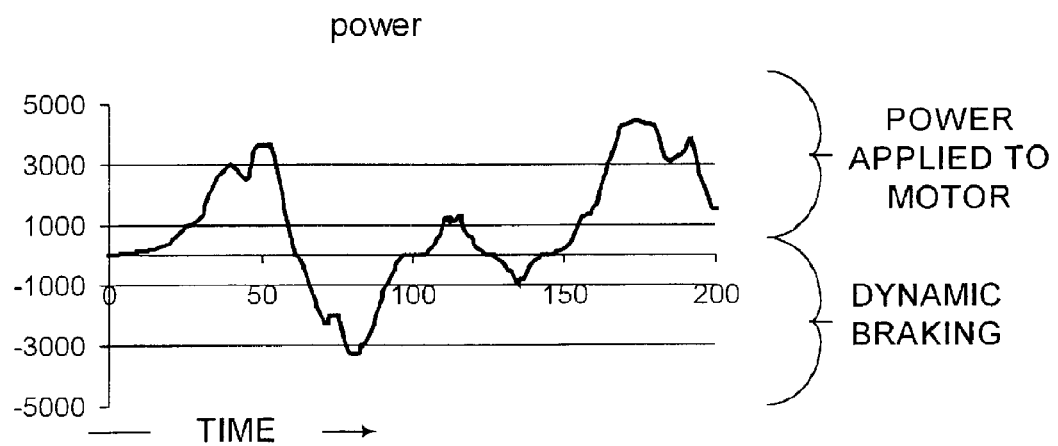
FIGS. 5A-5D are timing diagrams that illustrate one embodiment of an energy management system for controlling the storage and regeneration of energy, including dynamic braking energy.

Referring now specifically to FIG. 5A, as mentioned above, the exemplary curve identified therein illustrates the power required (utilized) for motoring and dynamic braking. Positive units of power reflect when motoring power is being applied to the wheels of the vehicle (e.g., one or more traction motors are driving locomotive wheels). Negative units of power reflect power generated by dynamic braking.

Figure 5B:
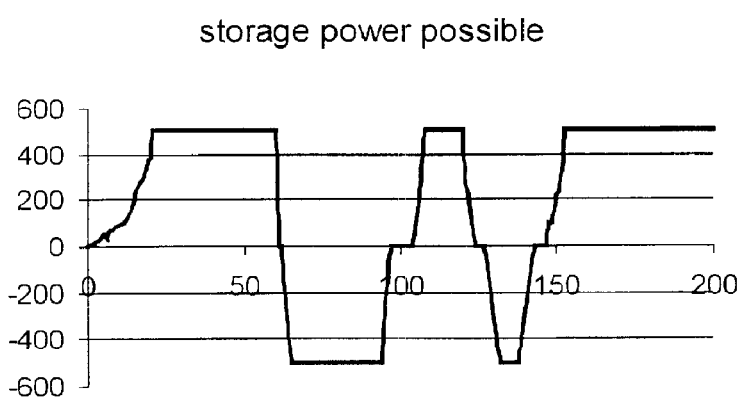

FIG. 5B is an exemplary curve that reflects power transfer limits. Positive values reflect the amount of stored energy that would be used to assist in the motoring effort, if such energy were available. Negative units reflect the amount of dynamic braking energy that could be stored in the energy storage medium if the medium were able to accept the full charge available. In the example of FIG. 5B, the energy available for storage at any given time is illustrated as being limited to 500 units (e.g., horsepower). As explained above, a variety of factors limit the amount of power that can be captured and transferred. Thus, from about 0 to 30 minutes, the locomotive requires less than 500 hp. If stored energy were available, it could be used to provide all of the motoring power. From about 30 minutes to about 65 or 70 minutes, the locomotive requires more than 500 hp. Thus, if stored energy were available, it could supply some (e.g., 500 hp) but not all of the motoring power. From about 70 minutes to about 75 minutes or so, the locomotive is in a dynamic braking mode and generates less than 500 hp of dynamic braking energy. Thus, up to 500 hp of energy could be transferred to the energy storage medium, if the medium retained sufficient capacity to store the energy. At about 75 minutes, the dynamic braking process generates in excess of 500 hp. Because of power transfer limits, only up to 500 hp could be transferred to the energy storage medium (again, assuming that storage capacity remains); the excess power would be dissipated in the braking grids. It should be understood that FIG. 5B does not reflect the actual amount of energy transferred to or from the energy storage medium. That information is depicted in FIG. 5C.

Figure 5C:
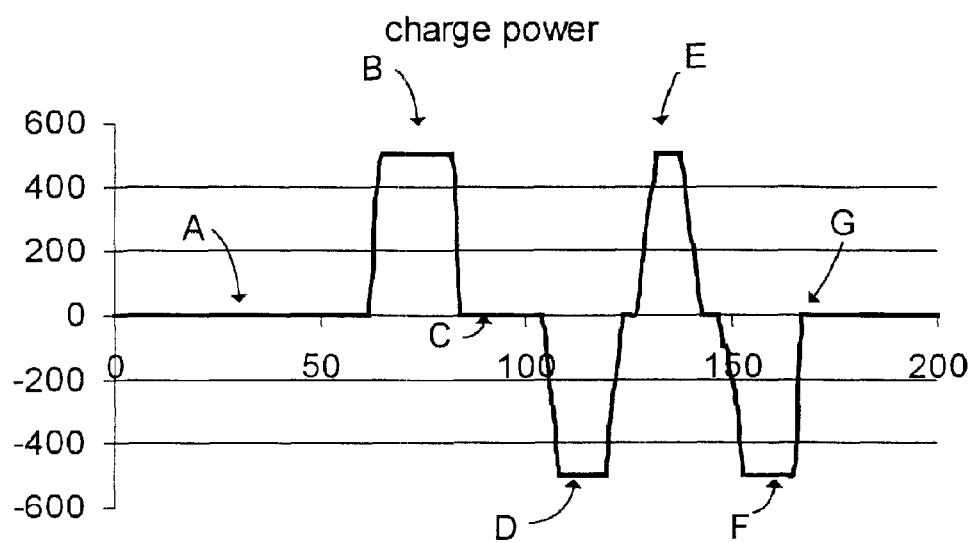

FIG. 5C is reflects the power transfer to/from the energy storage medium at any given instant of time. The example shown therein assumes that the energy storage medium is completely empty at time 0. Therefore, the system cannot transfer any power from the storage at this time. During a first time period A (from approximately 0-70 minutes), the vehicle is motoring (see FIG. 5A) and no power is transferred to or from the energy storage. At the end of the first time period A, and for almost 30 minutes thereafter, the vehicle enters a dynamic braking phase (see FIG. 5A). During this time, power from the dynamic braking process is available for storage (see FIG. 5B).

During a second time period B (from approximately 70-80 minutes), dynamic braking energy is transferred to the energy storage medium at the maximum rate (e.g., 500 units) until the storage is full. During this time there is no motoring demand to deplete the stored energy. Thereafter, during a third time period C (from approximately 80-105 minutes), the storage is full. Consequently, even though the vehicle remains in the dynamic braking mode or is coasting (see FIG. 5A), no energy is transferred to or from the energy storage medium during time period C.

During a fourth time period D (from approximately 105-120 minutes), the vehicle resumes motoring. Because energy is available in the energy storage medium, energy is drawn from the storage and used to assist the motoring process. Hence, the curve illustrates that energy is being drawn from the energy storage medium during the fourth time period D.

At approximately 120 minutes, the motoring phase ceases and, shortly thereafter, another dynamic braking phase begins. This dynamic braking phase reflects the start of a fifth time period E, which lasts from approximately 125-145 minutes. As can be appreciated by viewing the curve during the fifth time period E, when the dynamic braking phase ends, the energy storage medium is not completely charged.

Shortly before the 150-minute point, a sixth time period F begins which lasts from approximately 150-170 minutes. During this time period and thereafter (see FIG. 5A), the vehicle is motoring. From approximately 150-170 minutes, energy is transferred from the energy storage medium to assist in the motoring process. At approximately 170 minutes, however, the energy storage is completely depleted. Accordingly, from approximately 170-200 minutes (the end of the sample window), no energy is transferred to or from the energy storage medium.

Figure 5D:
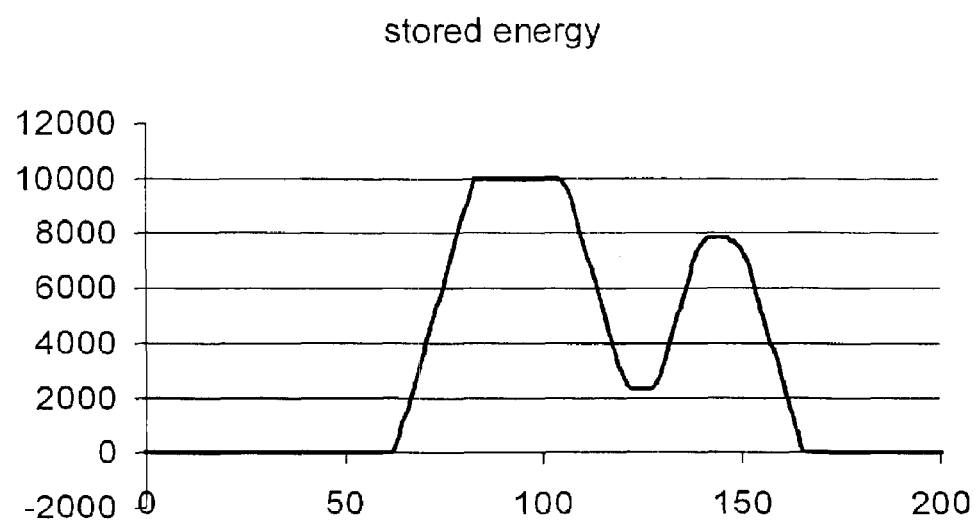

FIG. 5D illustrates the energy stored in the energy storage medium of the exemplary embodiment reflected in FIGS. 5A-D. Recall that in the present example, the energy storage medium is assumed to be completely empty/discharged at time 0. Recall also that the present example assumes an energy management system that only stores energy from dynamic braking. From approximately 0-70 minutes, the vehicle is motoring and no energy is transferred to or from the energy storage medium. From approximately 70-80 minutes or so, energy from dynamic braking is transferred to the energy storage medium until it is completely full. At approximately 105 minutes, the vehicle begins another motoring phase and energy is drawn from the energy storage medium until about 120 minutes. At about 125 minutes, energy from dynamic braking is again transferred to the energy storage medium during another dynamic braking phase. At about 145 minutes or so, the dynamic braking phase ends and storage ceases. At about 150 minutes, energy is drawn from the energy storage medium to assist in motoring until all of the energy has been depleted at approximately 170 minutes.

FIGS. 6A-D correspond to an energy management system that includes a "look ahead" or anticipated needs capability. Such a system is unlike the system reflected in FIGS. 5A-D, which simply stores dynamic braking energy when it can, and uses stored energy to assist motoring whenever such stored energy is available. The energy management system reflected by the exemplary curves of FIGS. 6A-D anticipates when the prime mover cannot produce the full required demand, or when it may be less efficient for the prime mover to produce the full required demand. As discussed elsewhere herein, the energy management system can make such determinations based on, for example, known present position, present energy needs, anticipated future track topography, anticipated future energy needs, present energy storage capacity, anticipated energy storage opportunities, and like considerations. The energy management system depicted in FIGS. 6A-D, therefore, preferably prevents the energy storage medium from becoming depleted below a determined minimum level required to meet future demands.

By way of further example, the system reflected in FIGS. 6A-D is premised on a locomotive having an engine that has a "prime mover limit" of 4000 hp. Such a limit could exist for various factors. For example, the maximum rated output could be 4000 hp, or operating efficiency considerations may counsel against operating the engine above 4000 hp. It should be understood, however, that the system and figures are intended to reflect an exemplary embodiment only, and are presented herein to facilitate a detailed explanation of aspects of an energy management system suitable for use with off-highway hybrid energy vehicles (or other powered systems) such as, for example, the locomotive system illustrated in FIG. 1.

Figure 6A:
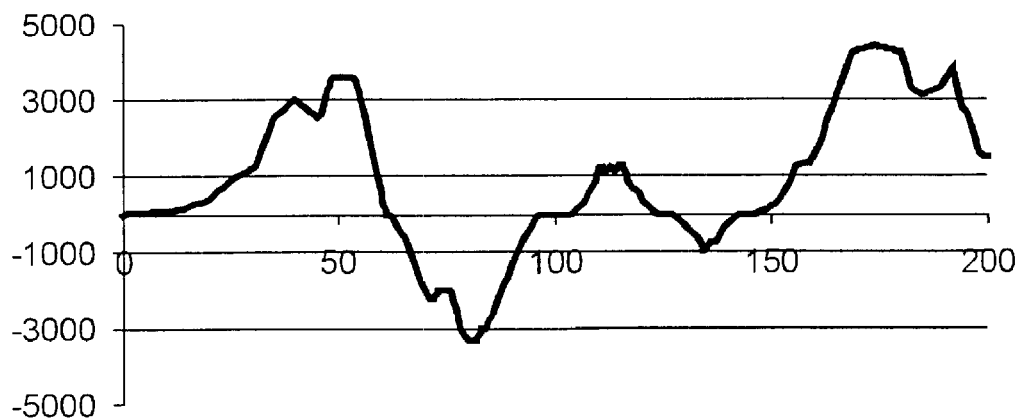
FIGS. 6A-6D are timing diagrams that illustrate another embodiment of an energy management system for controlling the storage and regeneration of energy, including dynamic braking energy.

Referring now to FIG. 6A, the exemplary curve illustrated therein depicts the power required for motoring (positive) and braking (negative). At approximately 180 minutes, the motoring demand exceeds 4000 hp. Thus, the total demand at that time exceeds the 4000 hp operating constraint for the engine. The "look ahead" energy management system reflected in FIGS. 6A-D, however, anticipates this upcoming need and ensures that sufficient secondary power is available from the energy storage medium to fulfill the energy needs.

One way for the energy management system to accomplish this is to look ahead (periodically or continuously) to the upcoming track/course profile (e.g., incline/decline, length of incline/decline, and the like) for a given time period (also referred to as a look ahead window). In the example illustrated in FIGS. 6A-D, the energy management system looks ahead 200 minutes and then computes energy needs/requirements backwards. The system determines that, for a brief period beginning at 180 minutes, the engine would require more energy than the preferred limit.

Figure 6B:
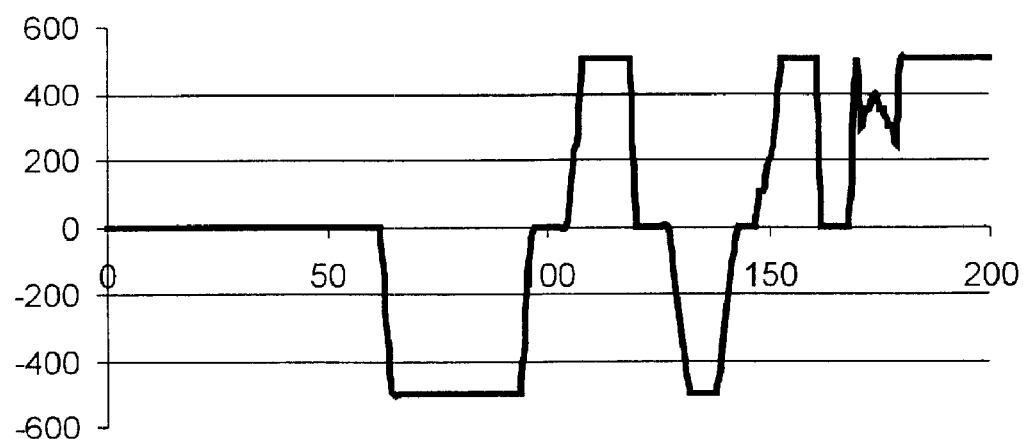

FIG. 6B is similar to FIG. 5B. FIG. 6B, however, also illustrates the fact that the energy storage medium is empty at time 0 and, therefore, there can be no power transfer from the energy storage medium unless and until it is charged. FIG. 6B also reflects a look ahead capability.

Figure 6C:
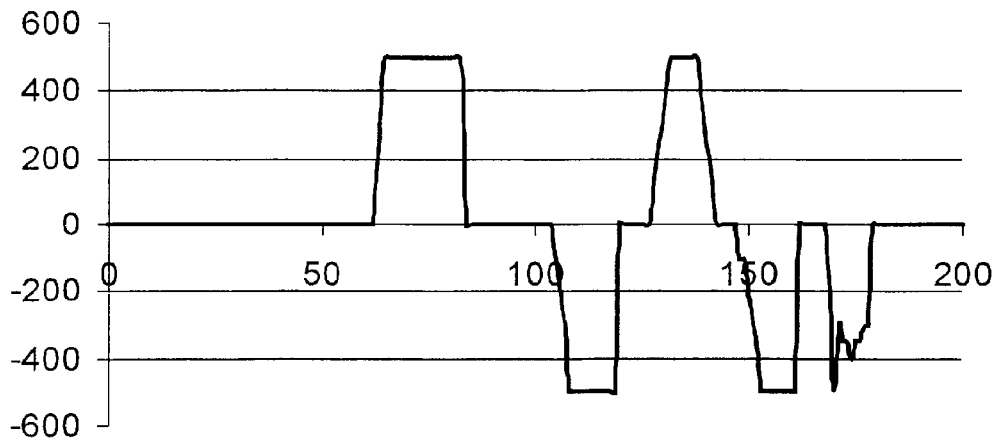
Figure 6D:
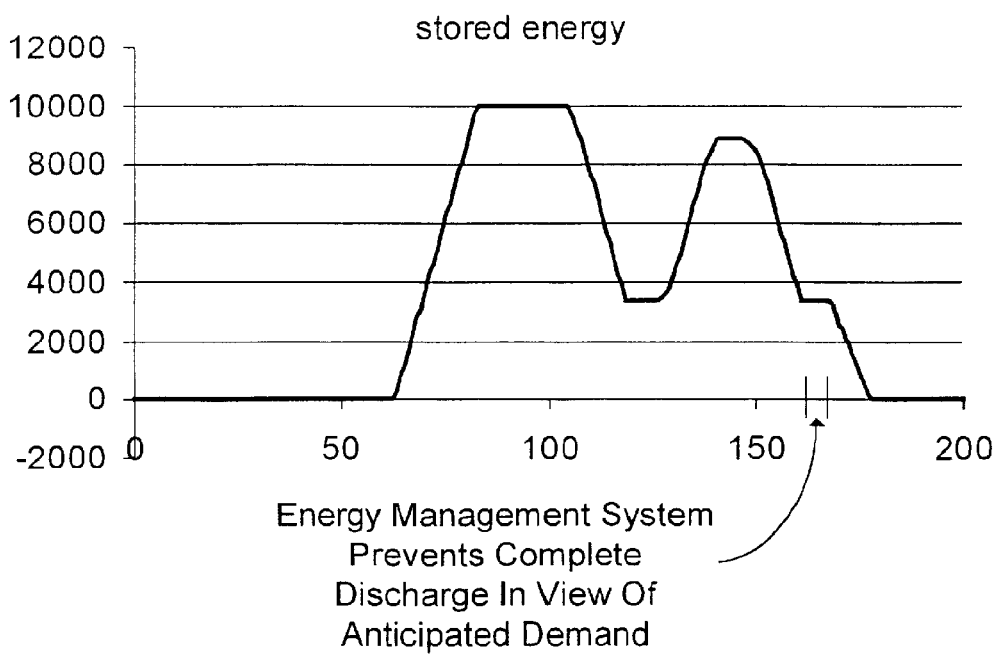

Comparing FIGS. 5A-D with FIGS. 6A-D, it is apparent how the systems respectively depicted therein differ. Although the required power is the same in both examples (see FIGS. 5A and 6A), the system reflected in FIGS. 6A-D prevents complete discharge of the energy storage medium prior to the anticipated need at 180 minutes. Thus, as can be seen in FIGS. 6C and 6D, prior to the 180-minute point, the system briefly stops transferring stored energy to assist in motoring, even though additional stored energy remains available. The additional energy is thereafter transferred, beginning at about 180 minutes, to assist the prime mover when the energy demand exceeds 4000 hp. Hence, the system effectively reserves some of the stored energy to meet upcoming demands that exceed the desired limit of the prime mover.

It should be understood and appreciated that the energy available in the energy storage medium could be used to supplement driving traction motors associated with the prime mover, or could also be used to drive separate traction motors (e.g., on a tender or load vehicle). With the benefit of the present disclosure, an energy management system accommodating a variety of configurations is possible.

FIGS. 7A-E reflect pertinent aspects of another embodiment of an energy management system suitable for use in connection with off-highway hybrid energy vehicles. The system reflected in FIGS. 7A-E includes a capability to store energy from both dynamic braking and from the prime mover (or another charging engine such as that illustrated in FIG. 2). For example, a given engine may operate most efficiently at a given power setting (e.g., 4000 hp). Thus, it may be more efficient to operate the engine at 4000 hp at certain times, even when actual motoring demand falls below that level. In such cases, the excess energy can be transferred to an energy storage medium.

Figure 7A:
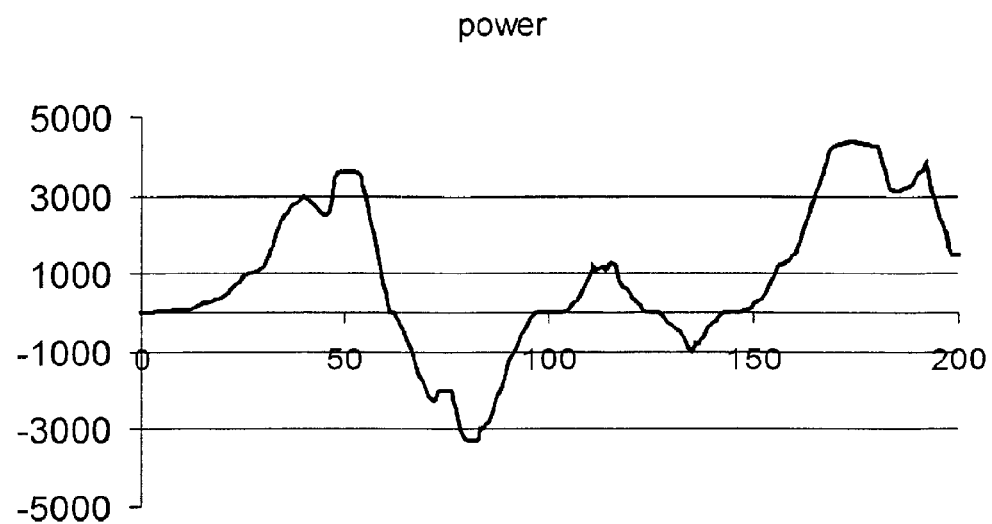
FIGS. 7A-7E are timing diagrams that illustrate another embodiment of an energy management system for controlling the storage and regeneration of energy, including dynamic braking energy.
Figure 7B:
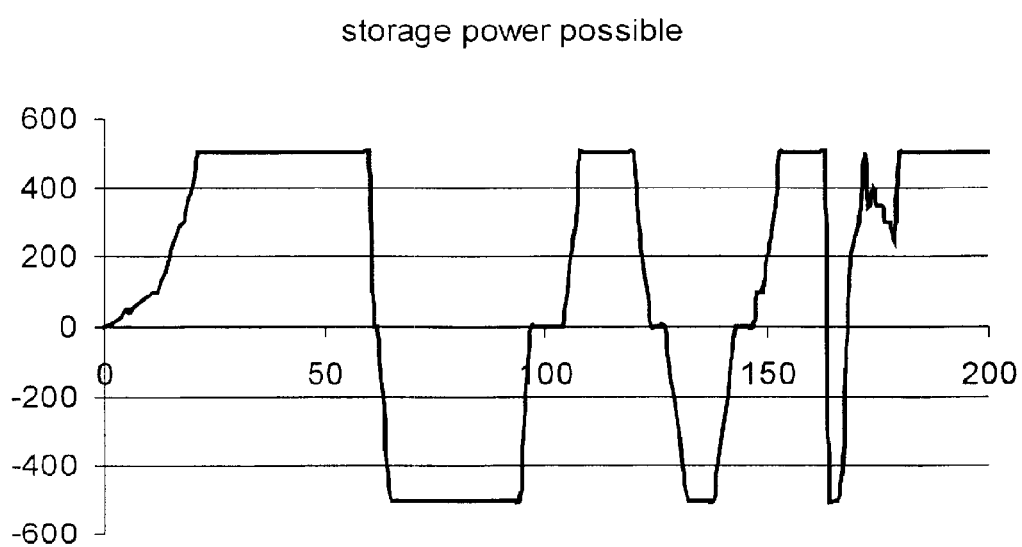
Figure 7C:
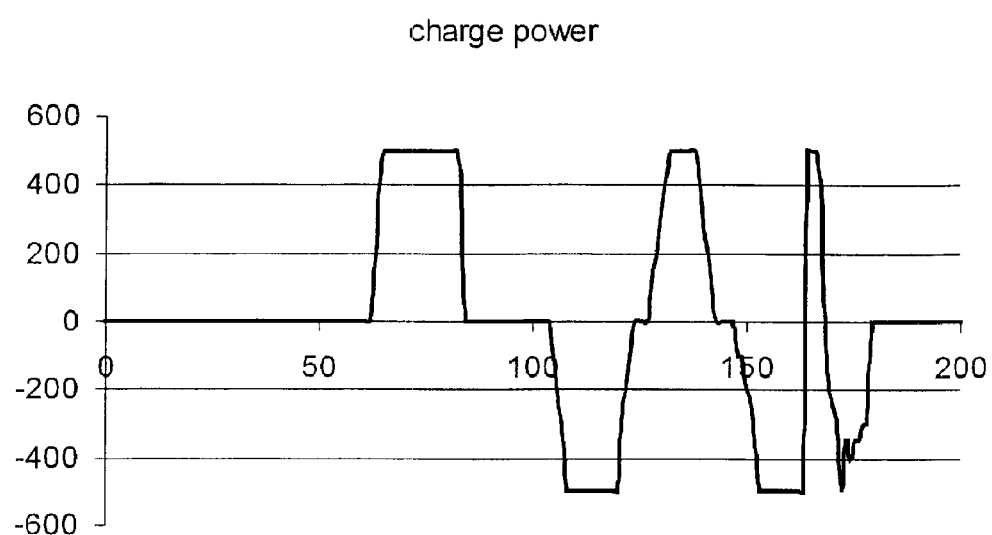
Figure 7D:
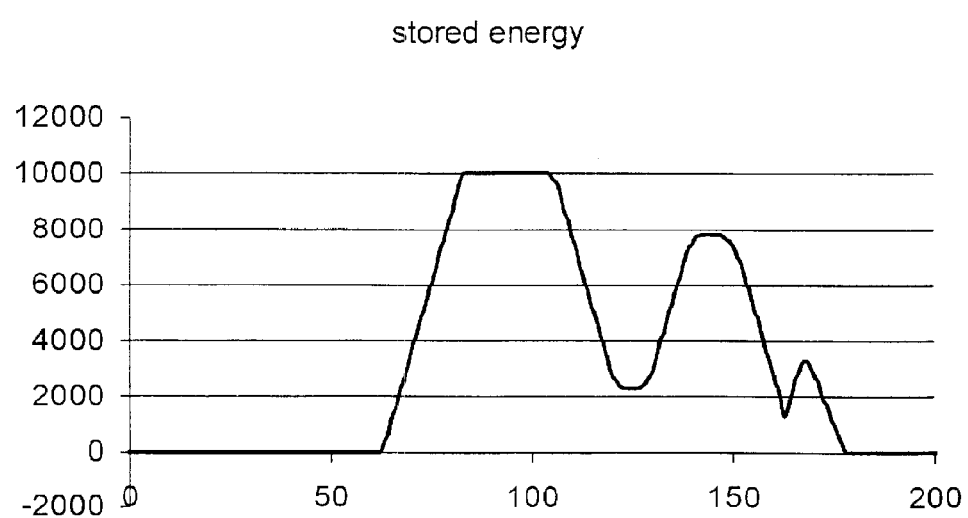

Thus, comparing FIGS. 7A-D with FIGS. 5A-D and 6A-D, the differences between the systems respectively depicted therein become apparent. Referring specifically to FIGS. 7A and 7D, from about 0-70 minutes, the motoring requirements (FIG. 7A) are less than the exemplary optimal 4000 hp setting. If desirable, the engine could be run at 4000 hp during this time and the energy storage medium could be charged. As illustrated, however, the energy management system determines that, based on the upcoming track profile and anticipated dynamic braking period(s), an upcoming dynamic braking process will be able to fully charge the energy storage medium. In other words, it is not necessary to operate the engine at 4000 hp and store the excess energy in the energy storage medium during this time because an upcoming dynamic braking phase will supply enough energy to fully charge the storage medium. It should be understood that the system could also be designed in other ways. For example, in another configuration the system always seeks to charge the storage medium whenever excess energy could be made available.

At approximately 180 minutes, power demands will exceed 4000 hp. Thus, shortly before that time (while motoring demand is less than 4000 hp), the engine can be operated at 4000 hp, with the excess energy used to charge the energy storage medium to ensure sufficient energy is available to meet the demand at 180 minutes. Thus, unlike the systems reflected in FIGS. 5D and 6D, the system reflected in FIG. 7D provides that, for a brief period prior to 180 minutes, energy is transferred to the energy storage medium from the prime mover, even though the vehicle is motoring (not braking).

Figure 7E:
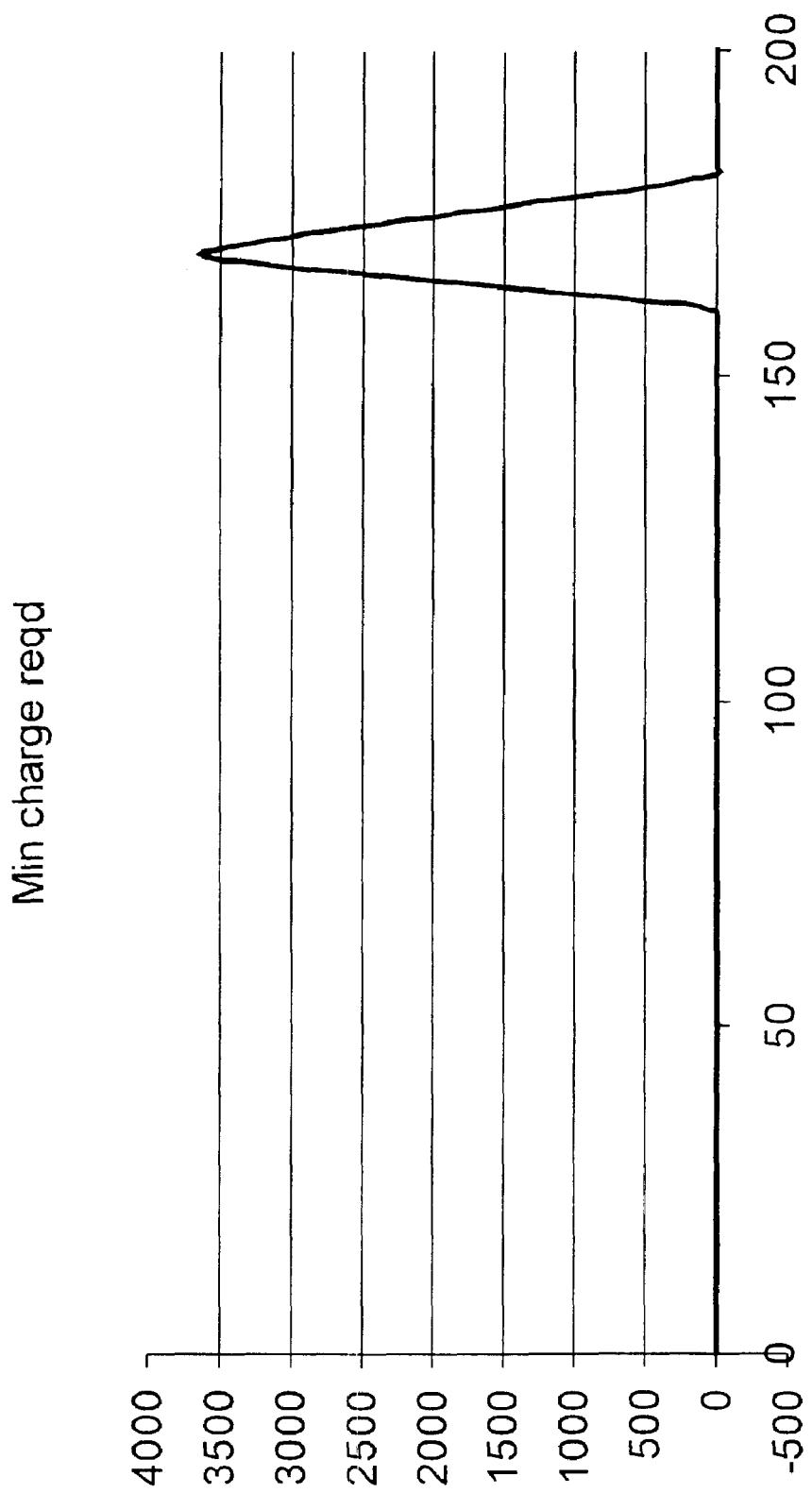

FIG. 7E illustrates one way that the energy management system can implement the look ahead capability to control energy storage and transfer in anticipation of future demands. FIG. 7E assumes a system having a 200-minute look ahead window. Such a look ahead window is chosen to facilitate an explanation of the system and should not be viewed in a limiting sense. Beginning at the end of the window (200 minutes), the system determines the power/energy demands at any given point in time. If the determined demand exceeds the prime mover's capacity or limit, the system continues back and determines opportunities when energy can be stored, in advance of the determined excess demand period, and ensures that sufficient energy is stored during such opportunities.

Although FIGS. 5A-D, 6A-D, and 7A-E have been separately described, it should be understood that the systems reflected therein could be embodied in a single energy management system. Further, the look ahead energy storage and transfer capability described above could be accomplished dynamically or in advance. For example, in one form, an energy management processor (see FIG. 4) is programmed to compare the vehicle's present position with upcoming track/course characteristics in real or near real time. Based on such dynamic determinations, the processor then determines how to best manage the energy capture and storage capabilities associated with the vehicle in a manner similar to that described above with respect to FIGS. 6A-D and 7A-E. In another form, such determinations are made in advance. For example, an off-vehicle planning computer may be used to plan a route and determine energy storage and transfer opportunities based on a database of known course information and projected conditions such as, for example, vehicle speed, weather conditions, and the like. Such pre-planned data would thereafter be used by the energy management system to manage the energy capture and storage process. Look ahead planning could also be done based on a route segment or an entire route.

It should further be understood that the energy management system and methods described herein may be put into practice with a variety of vehicle configurations. For example, such systems and methods could be practiced with a locomotive having a separate energy tender vehicle housing the energy capture and storage medium. As another example, the energy management systems and methods herein described could be employed with a locomotive having a separate energy tender vehicle that employs its own traction motors. In another example, the energy management systems and methods described herein may be employed as part of an off-highway vehicle, such as a locomotive, in which the energy storage medium is included as part of the vehicle itself. Other possible embodiments and combinations should be appreciated from the present disclosure and need not be recited in additional detail herein.

FIGS. 8A-8G are electrical schematics illustrating several different embodiments of an electrical system suitable for use in connection with a hybrid energy locomotive (or other vehicle or powered system). In particular, the exemplary embodiments illustrated in these figures relate to a hybrid energy diesel-electric locomotive system. It should be understood that the embodiments illustrated in FIGS. 8A-8G could be incorporated in a plurality of configurations, including those already discussed herein (e.g., a locomotive with a separate energy tender vehicle, a locomotive with a self-contained hybrid energy system, an autonomous tender vehicle, and the like).

Figure 8A:
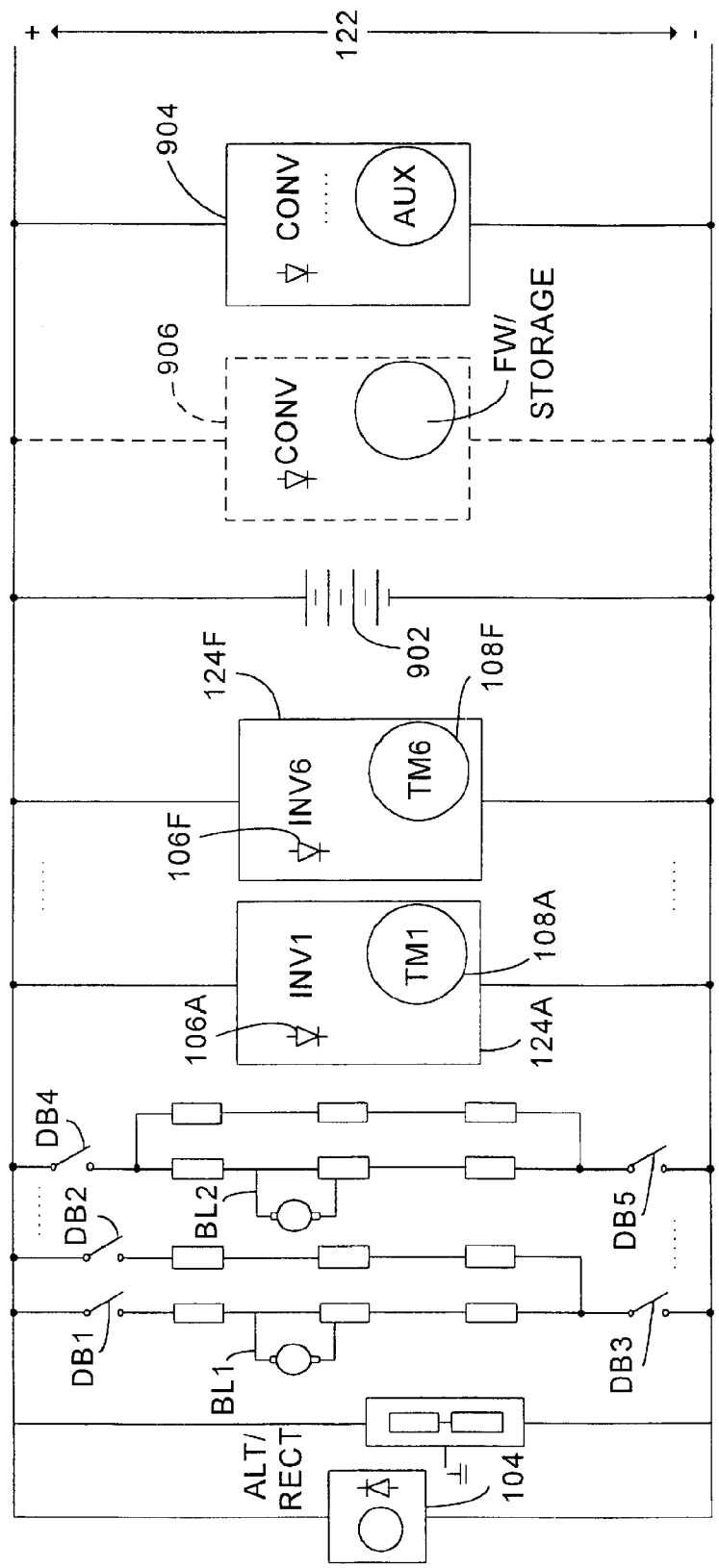
FIGS. 8A-8G are electrical schematics illustrating several embodiments of an electrical system suitable for use in connection with a hybrid energy off-highway vehicle, such as a diesel-electric locomotive.

FIG. 8A illustrates an electrical schematic of a locomotive electrical system having an energy capture and storage medium suitable for use in connection with aspects of the systems and methods disclosed herein. The particular energy storage element illustrated in FIG. 8A comprises a battery storage 902. The battery storage 902 is connected directly across the traction bus (DC bus 122). In this exemplary embodiment, an auxiliary power drive 904 is also connected directly across DC bus 122. The power for the auxiliaries is derived from DC bus 122, rather than a separate bus.

It should be appreciated that more than one type of energy storage element may be employed in addition to battery storage 902. For example, an optional flywheel storage element 906 ("FW/STORAGE") can also be connected in parallel with battery storage 902. The flywheel storage element 906 shown in FIG. 8A may be powered by an AC motor or generator connected to DC bus 122 via an inverter or converter. Other storage elements such as, for example, capacitor storage devices (including ultra-capacitors) and additional battery storages (not shown) can also be connected across the DC bus and controlled using choppers and/or converters and the like. It should be understood that although battery storage 902 is schematically illustrated as a single battery, multiple batteries or battery banks may likewise be employed.

In operation, the energy storage elements (e.g., battery storage 902 and/or any optional energy storage elements such as the flywheel storage element 906) are charged directly during dynamic braking operations. Recall that, during dynamic braking, one or more of the traction motor subsystems (e.g., 124A-124F) operate as generators and supply dynamic braking electric power that is carried on DC bus 122. Thus, all or a portion of the dynamic braking electric power carried on DC bus 122 may be stored in the energy storage element because the power available on the bus exceeds demand. When the engine is motoring, the battery (and any other optional storage element) is permitted to discharge and provide energy to DC bus 122 that can be used to assist in driving the traction motors. This energy provided by the storage element may be referred to as secondary electric power. Advantageously, because the auxiliaries are also driven by the same bus in this configuration, the ability to take power directly from DC bus 122 (or put power back into bus 122) is provided. This helps to minimize the number of power conversion stages and associated inefficiencies due to conversion losses. It also reduces costs and complexities.

It should be appreciated that the braking grids may still be used to dissipate all or a portion of the dynamic braking electric power generated during dynamic braking operations. For example, an energy management system may be used in connection with the system illustrated in FIG. 8A. Such an energy management system is configured to control one or more of the following functions: energy storage; stored energy usage; and energy dissipation using the braking grids. It should further be appreciated that the battery storage (and/or any other optional storage element) may optionally be configured to store excess prime mover electric power that is available on the traction bus.

Those skilled in the art should appreciate that certain circumstances preclude the operation of a diesel engine when the locomotive and/or train need to be moved. For example, the engine may not be operable. As another example, various rules and concerns may prevent the operation of the engine inside buildings, yards, maintenance facilities, or tunnels. In such situations, the train is moved using stored battery power. Advantageously, various hybrid energy locomotive configurations disclosed herein permit the use of stored power for battery jog operations directly. For example, the battery storage 902 of FIG. 8A can be used for battery jog operations. Further, the prior concept of battery jog operations suggests a relatively short time period over a short distance. The various configurations disclosed herein permit jog operations for much longer time periods and over much longer distances.

Figure 8B:
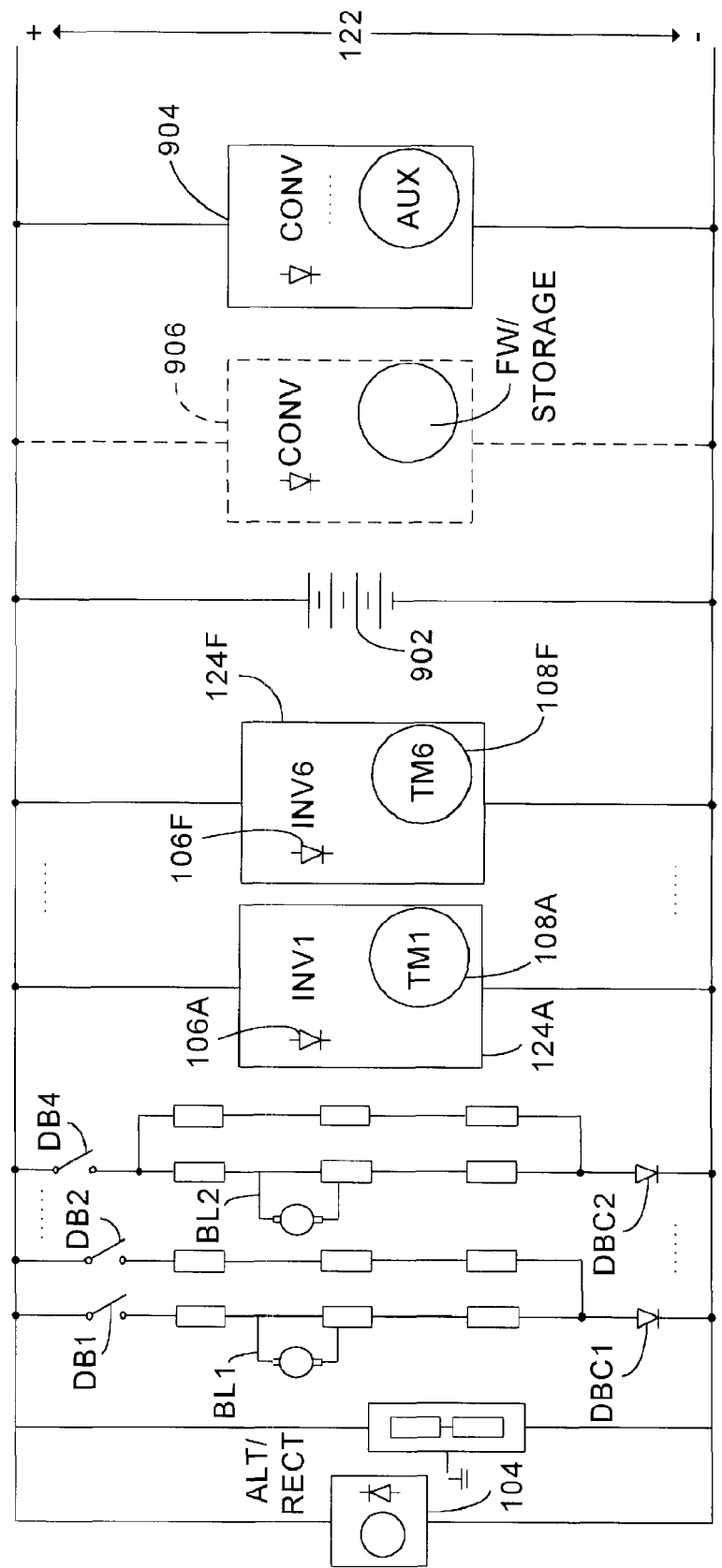

FIG. 8B illustrates a variation of the system of FIG. 8A. A primary difference between FIGS. 8A and 8B is that the system shown in FIG. 8B includes chopper circuits DBC1 and DBC2 connected in series with the braking grids. The chopper circuits DBC1 and DBC2 allow fine control of power dissipation through the grids that, therefore, provides greater control over the storage elements such as, for example, battery storage 902. In one embodiment, chopper circuits DBC1 and DBC2 are controlled by an energy management system (see FIG. 4). It should also be appreciated that chopper circuits DBC1 and DBC2, as well as any optional storage devices added to the circuit (e.g., flywheel storage element 906), could also be used to control transient power.

In the configuration of FIG. 8A, the dynamic braking contractors (e.g., DB1, DB2) normally only control the dynamic braking grids in discrete increments. Thus, the power flowing into the grids is also in discrete increments (assuming a fixed DC voltage). For example, if each discrete increment is 1000 hp, the battery storage capability is 2000 hp, and the braking energy returned is 2500 hp, the battery cannot accept all of the braking energy. As such, one string of grids is used to dissipate 1000 hp, leaving 1500 hp for storage in the battery. By adding choppers DBC1, DBC2, the power dissipated in each grid string can be more closely controlled, thereby storing more energy in the battery and improving efficiency. In the foregoing example, choppers DBC1 and DBC2 can be operated at complementary 50% duty cycles so that only 500 hp of the braking energy is dissipated in the grids and 200 hp is stored in the battery.

Figure 8C:
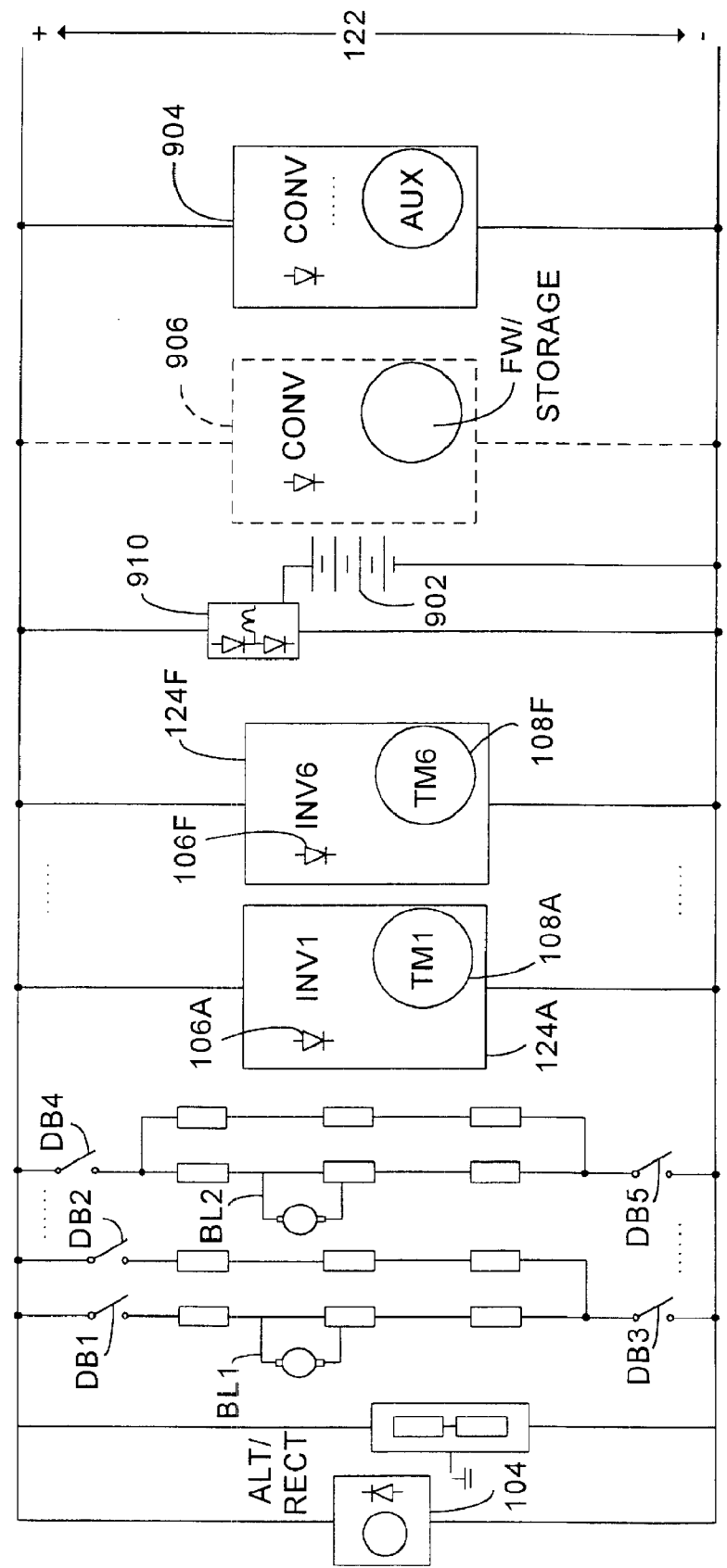

FIG. 8C is an electrical schematic of a locomotive electrical system illustrating still another configuration for implementing an energy storage medium. In contrast to the systems illustrated in FIGS. 8A and 8B, the battery storage 902 of FIG. 8C is connected to DC bus 122 by way of a DC-to-DC converter 910. Such a configuration accommodates a greater degree of variation between DC bus 122 voltage and the voltage rating of battery storage 902. Multiple batteries and/or DC storage elements (e.g., capacitors) could be connected in a similar manner. Likewise, chopper control, such as that illustrated in FIG. 8B could be implemented as part of the configuration of FIG. 8C. It should be further understood that the DC-to-DC converter 910 may be controlled via an energy management processor (see FIG. 4) as part of an energy management system and process that controls the storage and regeneration of energy in the energy storage medium.

In operation, the electric power carried on DC bus 122 is provided at a first power level (e.g., a first voltage level). The DC-to-DC converter 910 is electrically coupled to DC bus 122. The DC-to-DC converter 910 receives the electric power at the first power level and converts it to a second power level (e.g., a second voltage level). In this way, the electric power stored in battery storage 902 is supplied at the second power level. It should be appreciated that the voltage level on DC bus 122 and the voltage supplied to battery storage 902 via DC-to-DC converter 910 may also be at the same power level. The provision of DC-to-DC converter 910, however, accommodates variations between these respective power levels.

Figure 8D:
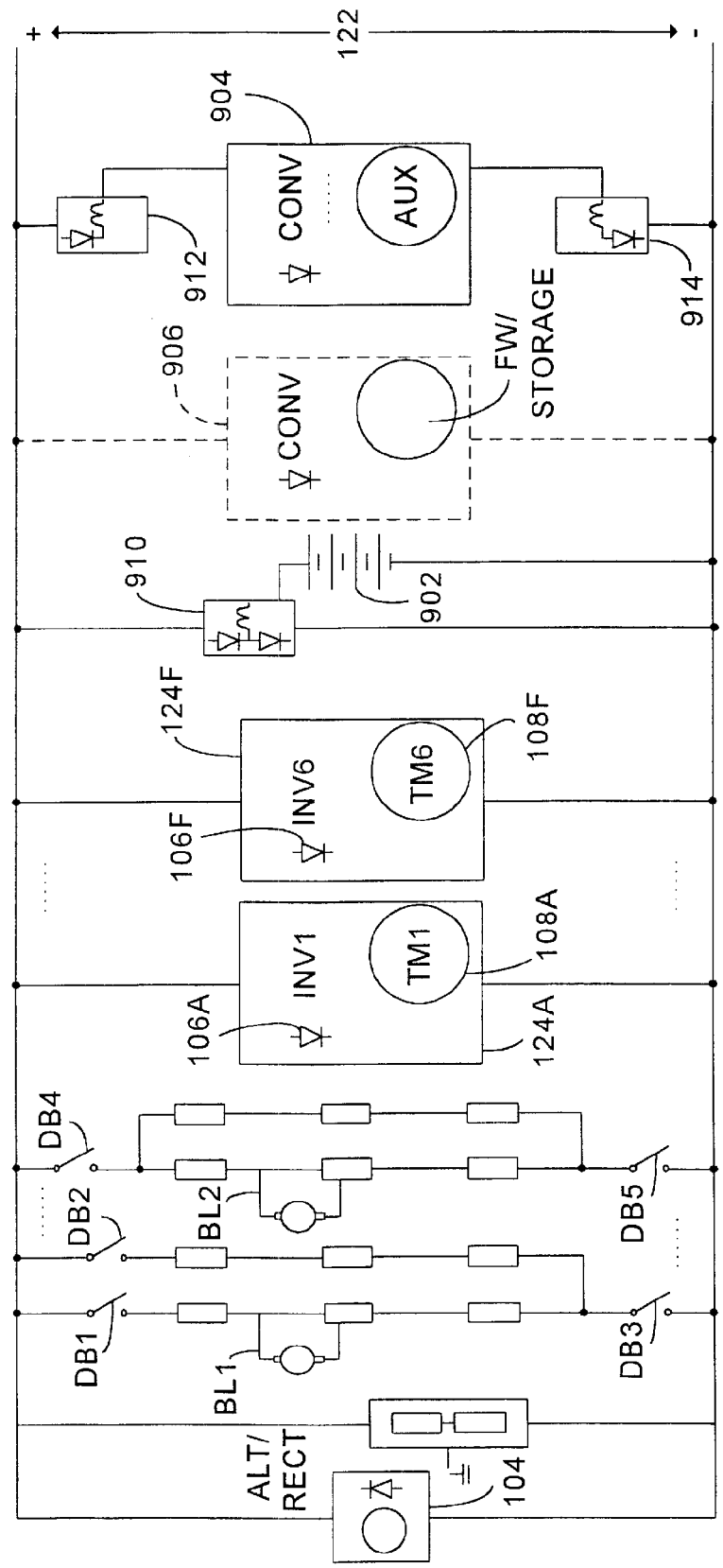

FIG. 8D is an electrical schematic of a locomotive electrical system that is similar to the system shown in FIG. 8C. One difference between these systems is that the auxiliary power drive 904 reflected in FIG. 8D is connected to DC bus 122 via a pair of DC-to-DC converters 912 and 914. Such a configuration provides the advantage of allowing the use of existing, lower voltage auxiliary drives and/or motor drives having low insulation. On the other hand, in this configuration, the auxiliary power traverses two power conversion stages. It should be understood that although FIG. 8D illustrates the auxiliaries as consuming power all of the time—not regenerating—bi-directional DC-to-DC converters can also be used in configurations in which it is desirable to have the auxiliaries regenerate power (see, for example, FIG. 8G). These DC-to-DC converters 912 and 914 are preferably controlled via an energy management system that controls the storage and regeneration of energy in the energy storage medium.

Figure 8E:
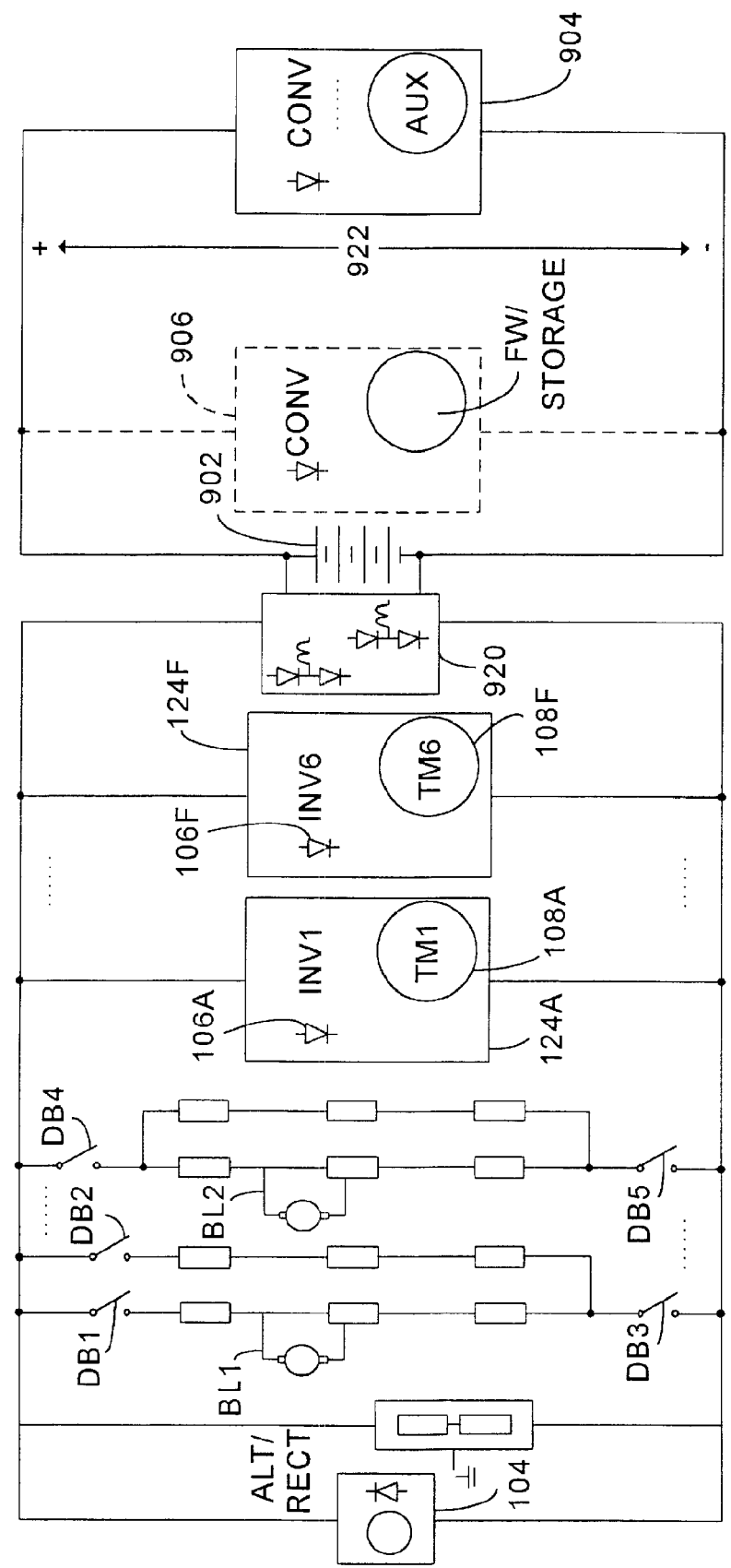

FIG. 8E illustrates, in electrical schematic form, still another configuration of an energy storage medium. Unlike the examples illustrated in FIGS. 8A-8D, however, the configuration of FIG. 8E includes a separate DC battery bus 922. The separate battery bus 922 is electrically isolated from main DC bus 122 (the traction bus) by a DC-to-DC converter 920 (also referred to as a two-stage converter). Accordingly, the power flow between the traction bus (DC bus 122), the energy storage elements, and the auxiliaries preferably passes through the bi-directional DC-to-DC converter 920. In the configuration of FIG. 8E, any additional storage elements (e.g., flywheels, capacitors, and the like) may be connected across the DC battery bus 922, rather than across the main DC bus 122. The DC-to-DC converter 920 may be controlled via an energy management system that controls the storage and regeneration of energy in the energy storage medium.

Figure 8F:
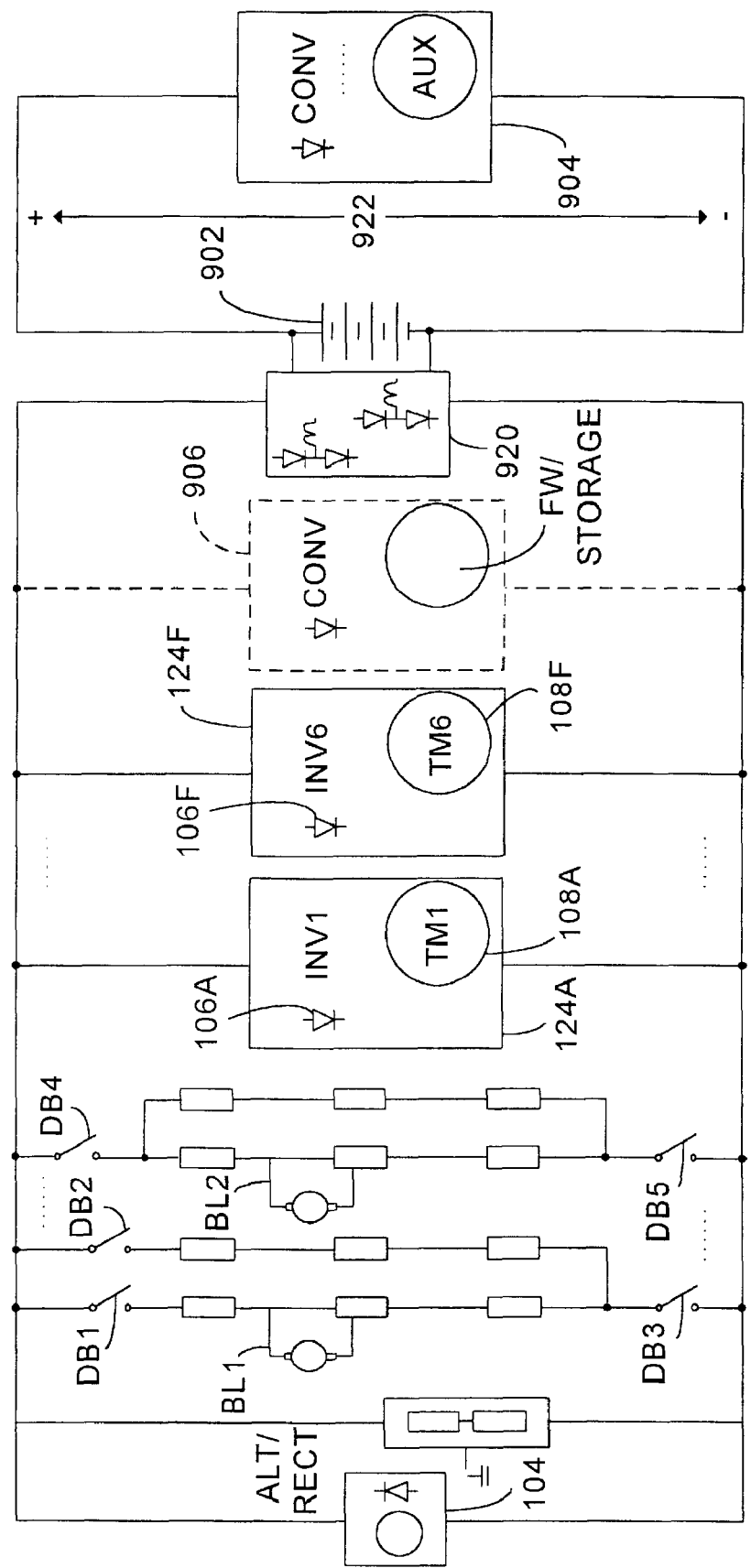

FIG. 8F reflects a variation of the configuration of FIG. 8E. In the configuration of FIG. 8F, any variable voltage storage elements (e.g., capacitors, flywheels, and the like) that are used in addition to a flywheel storage element 906, such as a battery, are connected directly across main DC bus 122 (the traction bus). However, the flywheel storage element 906, such as a battery remains connected across the isolated DC battery bus 922. Advantageously, in this configuration DC-to-DC converter 920 matches the voltage level of battery storage 902 but avoids two conversions of large amounts of power for the variable voltage storage elements. Like the other configurations, the configuration of FIG. 8F may be implemented in connection with an energy management system that oversees and controls the storage and regeneration of energy in the energy storage medium.

Figure 8G:
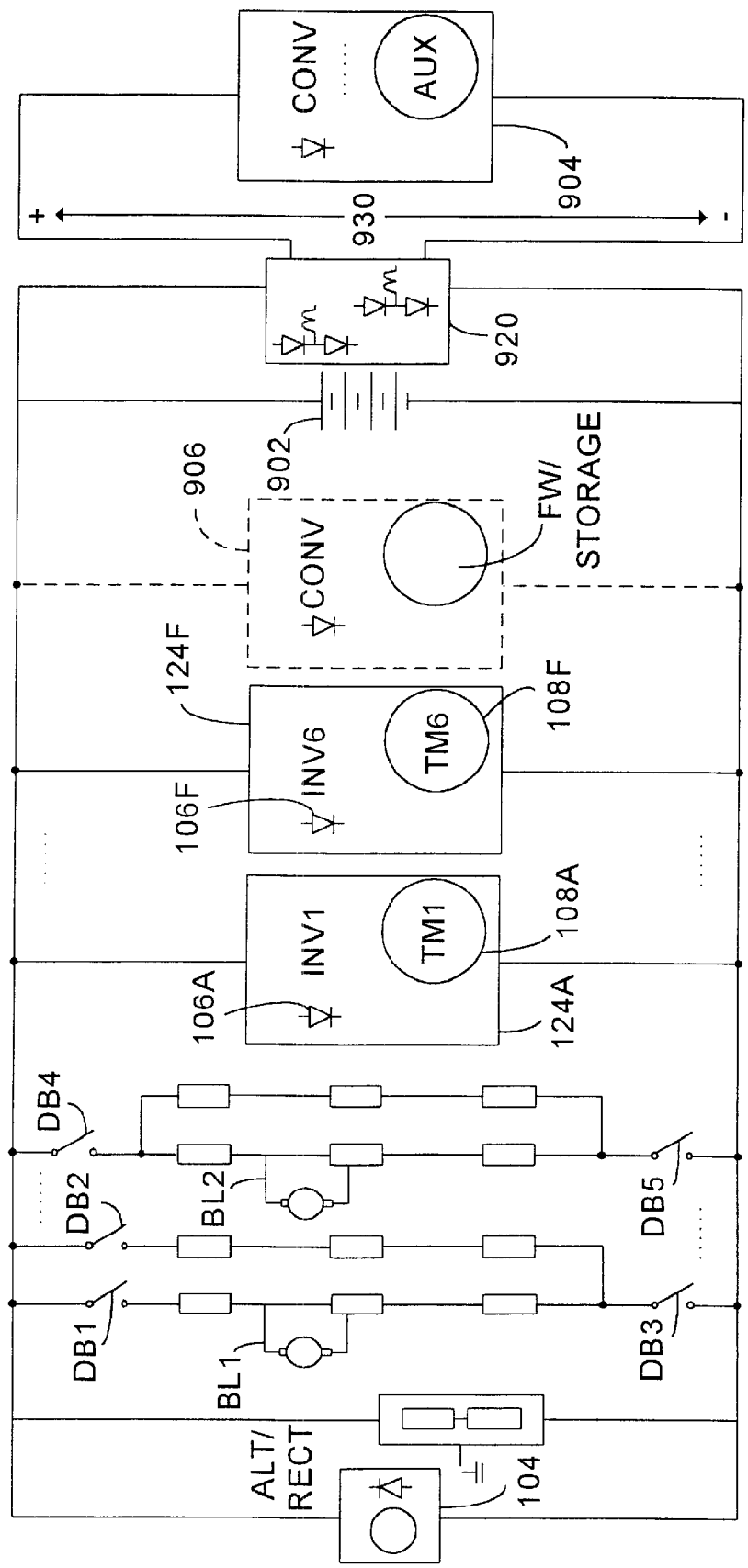

FIG. 8G reflects a variation of the configuration of FIG. 8F in which only the auxiliaries are connected to a separate auxiliary bus 930 through the DC-to-DC converter 920. Accordingly, electric power carried on DC bus 122 is provided at a first power level and power carried on the auxiliary bus 930 is provided at a second power level. The first and second power levels may or may not be the same.

Figure 9A:
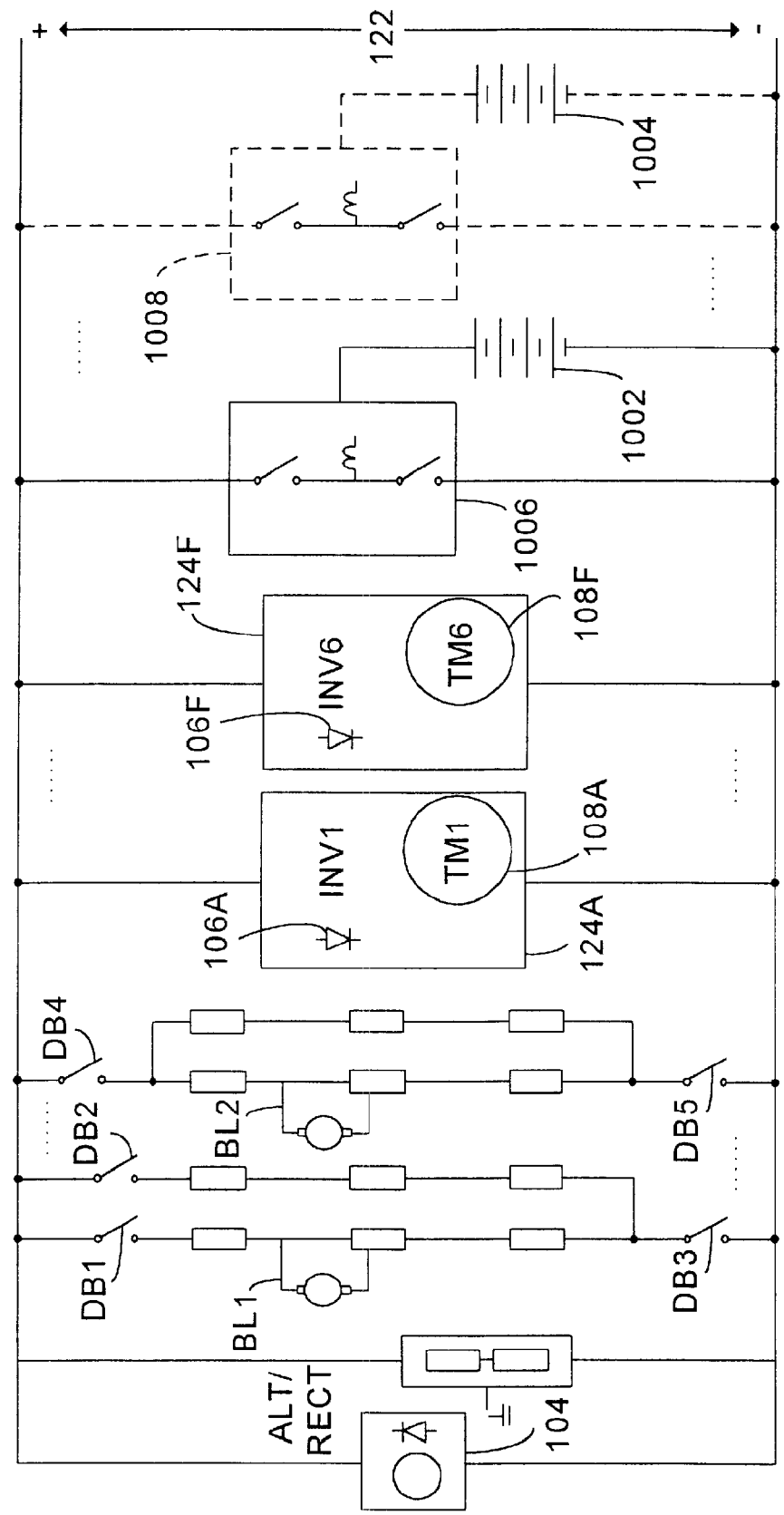
FIGS. 9A-9C are electrical schematics illustrating additional embodiments of an electrical system suitable for use in connection with a hybrid energy off-highway vehicle, such as a diesel-electric locomotive.
Figure 9B:
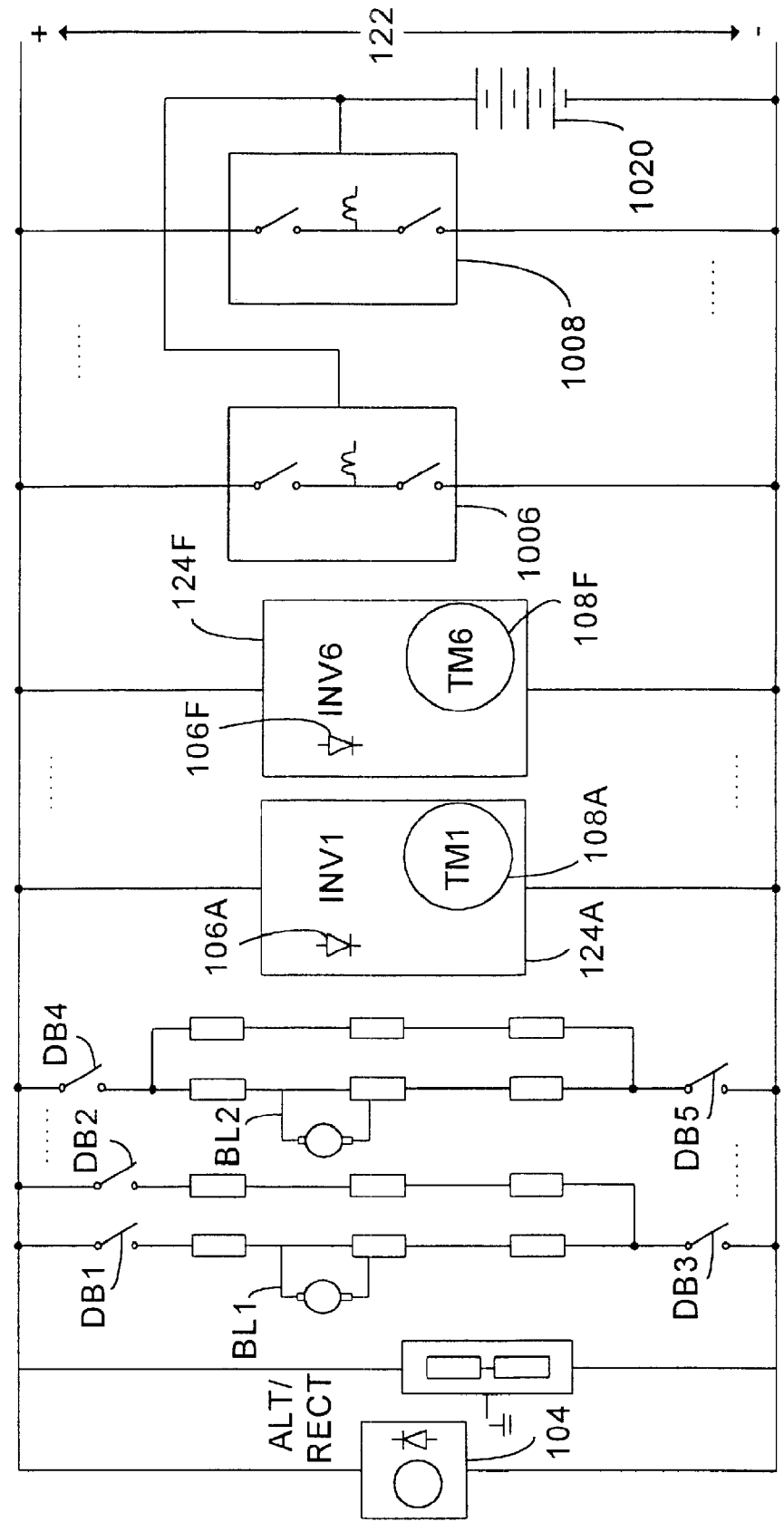
Figure 9C:
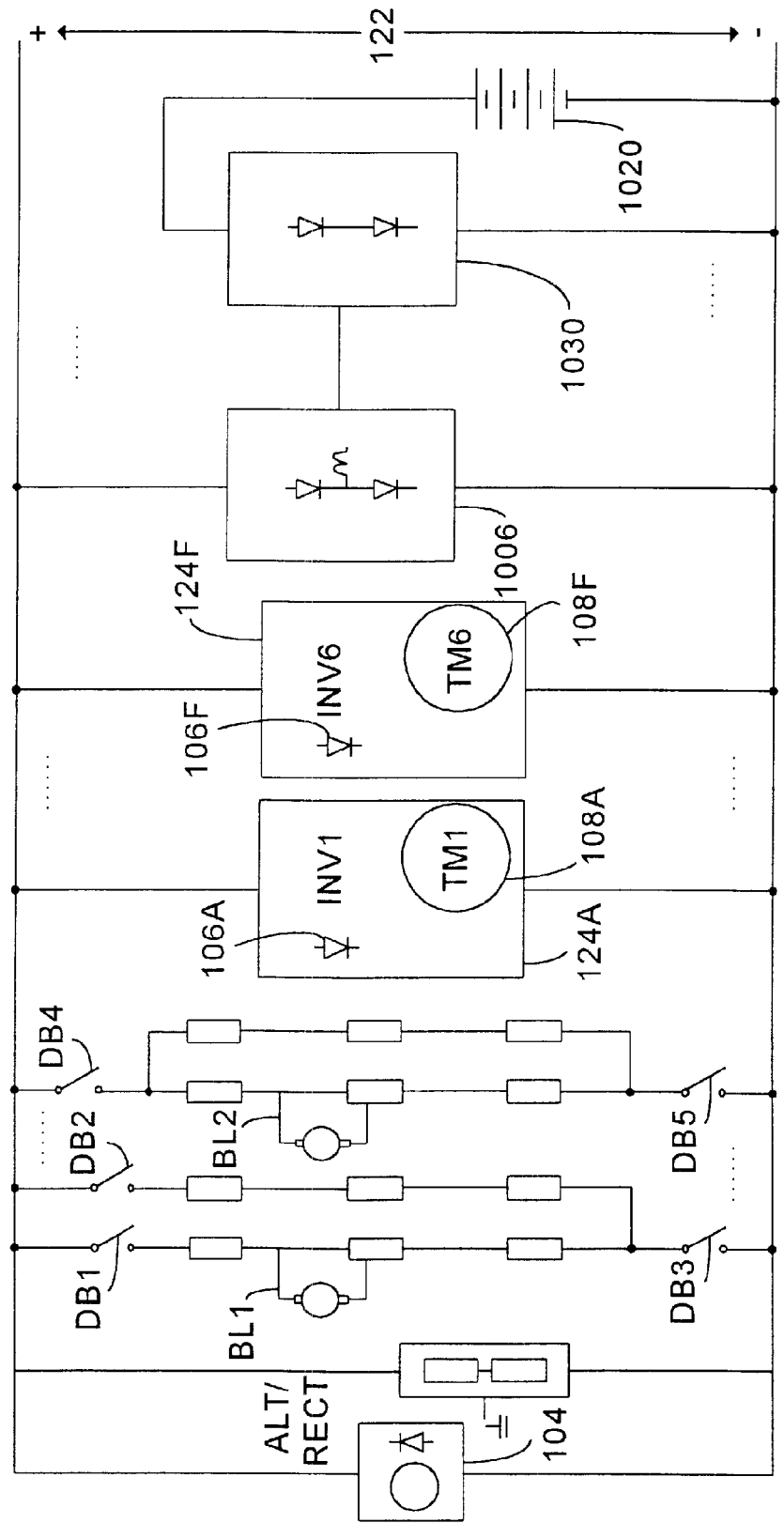

FIGS. 9A-9C are electrical schematics that illustrate additional embodiments, including embodiments particularly suited for modifying existing AC diesel-electric locomotives to operate in accordance with aspects of the present disclosure. It should be understood, however, that the configurations illustrated and described with respect to FIGS. 9A-9C are not limited to retrofitting existing diesel-electric locomotives.

FIG. 9A illustrates a variation of the embodiment illustrated in FIG. 8C. The embodiment of FIG. 9A uses only battery storage devices and does not include a non-battery storage, such as optional flywheel storage element 906. In particular, FIG. 9A illustrates an embodiment having a converter 1006 (e.g., a DC-to-DC converter) connected across DC bus 122. A battery storage element 1002 is connected to the converter 1006. Additional converters and battery storage elements may be added to this configuration in parallel. For example, another converter 1008 may be connected across DC bus 122 to charge another battery storage element 1004. One of the advantages of the configuration of FIG. 9A is that it facilitates the use of multiple batteries (or battery banks) having different voltages and/or charging rates.

In certain embodiments, power transfer between energy storage devices is facilitated. The configuration of FIG. 9A, for instance, allows for energy transfer between batteries 1002 and 1004 via the DC bus 122. For example, if, during motoring operations, the engine (prime mover) supplies 2000 hp of power to the DC traction bus, the traction motors consume 2000 hp, and battery 1002 supplies 100 hp to the traction bus (via converter 1006), the excess 100 hp is effectively transferred from battery 1002 to battery 1004 (less any normal losses).

The configuration illustrated in FIG. 9B is similar to that of FIG. 9A, except that it uses a plurality of converters (e.g., converters 1006, 1008) connected to the DC bus 122 to supply a common battery 1020 (or a common battery bank). One of the advantages of the configuration of FIG. 9B is that it allows the use of relatively smaller converters. This may be particularly advantageous when retrofitting an existing locomotive that already has one converter. A similar advantage of this configuration is that it allows the use of higher capacity batteries. Still another advantage of the configuration of FIG. 9B is that it permits certain phase shifting operations, thereby reducing the ripple current in the battery and allowing the use of smaller inductors (not shown). For example, if converters 1006 and 1008 are operated at 1000 Hz, 50% duty cycles, and the duty cycles are selected such that converter 1006 is on while converter 1008 is off, the converter effect is as if a single converter is operating at 2000 Hz, which allows the use of smaller inductors.

FIG. 9C an electrical schematic illustrating another embodiment that is particularly well-suited for retrofitting an existing diesel-electric locomotive to operate as a hybrid energy locomotive. The configuration of FIG. 9C uses a double set of converters 1006, 1030 and one or more batteries 1020 (of the same or different voltage levels). An advantage of the system depicted in FIG. 9C is that the battery 1020 can be at a higher voltage level than the DC bus 122. For example, if the converters 1006, 1008 illustrated in FIGS. 9A and 9B are typical two quadrant converters, they will also have freewheeling diodes associated therewith (not illustrated). If the voltage of battery 1002, 1004 (FIG. 9A), or 1020 (FIG. 9B) exceeds the DC bus voltage, the battery will discharge through the freewheeling diode. A double converter, such as that illustrated in FIG. 9C, avoids this situation. One advantage of this capability is that the voltage level on the DC bus can be modulated to control power to the dynamic braking grids independently.

Figure 10:
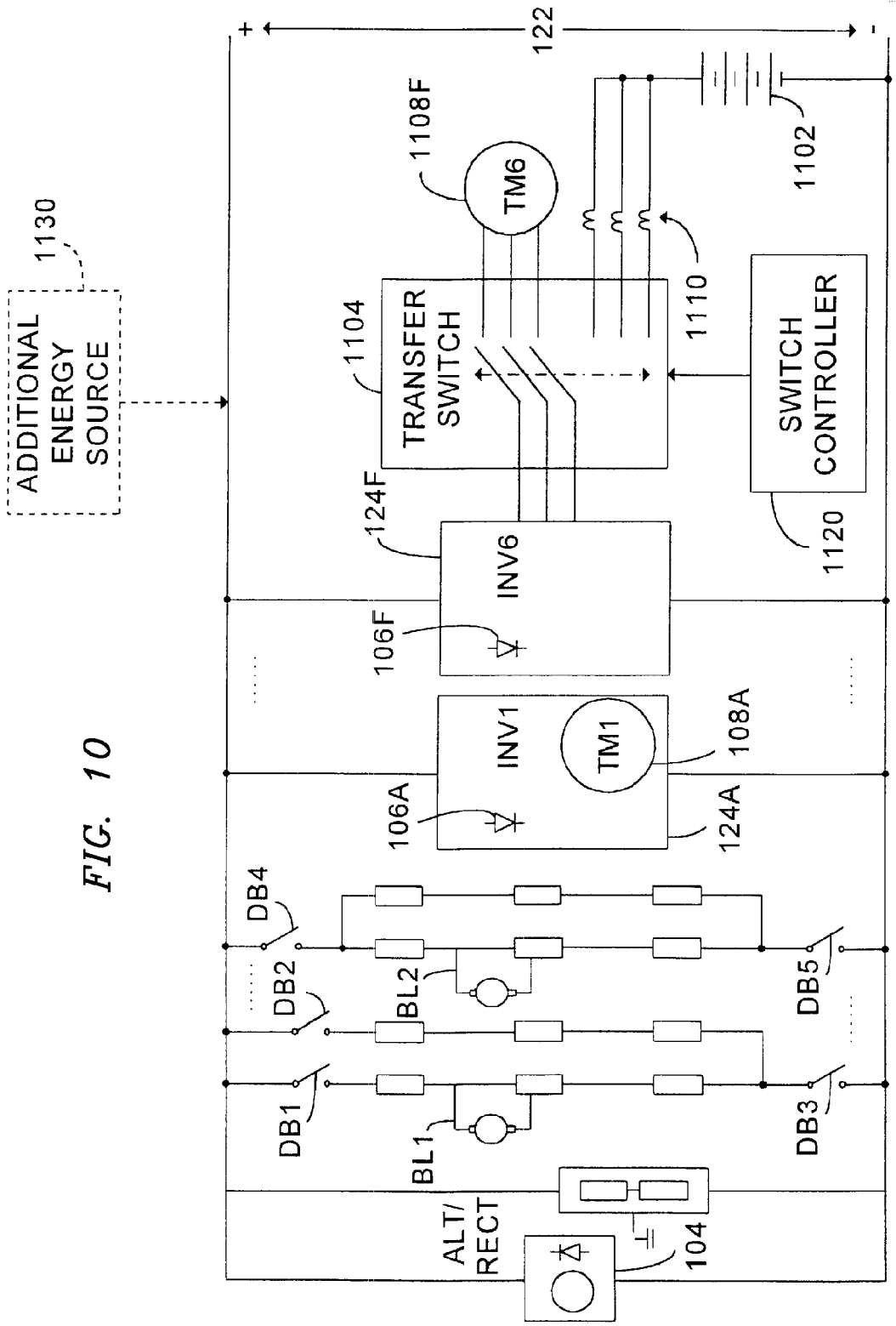
FIG. 10 is an electrical schematic that illustrates one embodiment of a way of connecting electrical storage elements.

FIG. 10 is an electrical schematic that illustrates one embodiment of an arrangement for connecting electrical storage elements. In particular, FIG. 10 illustrates an electrical schematic of a system that may be used for retrofitting a prior art diesel-electric locomotive to operate as a hybrid energy locomotive, or for installing a hybrid energy system as part of the original equipment during the manufacturing process. The embodiment illustrated assumes an AC diesel-electric locomotive with six axles. Each axle is driven by an individual traction motor subsystem. One such AC locomotive is the AC4400, available from the assignee of the present invention.

Typically, the converter/motor system has extra capability (e.g., power capacity) available in the majority of operating conditions. Such extra capability may be due to lower actual ambient conditions, as compared with the design criteria. For example, some locomotives are designed to operate in ambient temperatures of up to 60 degrees Celsius, which is well above typical operating conditions. Considerations other than thermal conditions may also result in extra capacity during significant operating periods. In a typical diesel-electric locomotive, for instance, the use of all of the traction motors may only be required for low speed and when the locomotive operates in an adhesion limited situation (poor rail conditions). In such case, the weight on the driven axles determines the pulling power/tractive effort. Hence, all axles/motors need to be driven to obtain maximum tractive effort. This can be especially true if the train is heavily loaded during poor rail conditions (snowy or slippery). Such conditions are normally present for only a fraction of the locomotive operating time. During the majority of the operating time, all of the traction motors/inverters are not fully utilized to supply tractive effort. Thus, for example, when retrofitting an existing prior art locomotive, or manufacturing a new locomotive, it is possible to take advantage of this partial underutilization of the traction motors/inverters.

By way of a specific example, the embodiment of FIG. 10 is configured such that one of the six traction motor subsystems is connected to the battery 1102, through a transfer switch 1104 and a plurality of inductors 1110. More particularly, the traction motor subsystem 124F includes an inverter 106F and a traction motor 1108F. Such a configuration is suited for retrofitting a single axle of an existing prior art diesel-electric locomotive. It should be understood that retrofitting a typical prior art diesel-electric locomotive requires the addition of power conversion equipment and associated cooling devices. The space available for installing the retrofit equipment, however, is generally limited. Therefore, one of the advantages of the "single-axle" configuration of FIG. 10 is that it tends to minimize impacts and makes retrofitting a more viable option. Similar advantages, however, may also be enjoyed when the hybrid energy system is installed as original equipment during manufacturing.

The transfer switch 1104 is a three-phase set of contractors or a set of motorized contacts (e.g., bus bars) that connect the inverter 106F to traction motor 1108F when all of the axles are needed, and connects inverter 106F to inductors 1110 and battery 1102 when battery charging or discharging is desired. Thus, transfer switch 1104 has a first connection state and a second connection state. In the first connection state, transfer switch 1104 connects inverter 106F to traction motor 1108F. In the second connection state, transfer switch connects inverter 106F to battery 1102.

Transfer switch 1104 is controlled by a switch controller 1120. In one form, the switch controller 1120 is a manual operator-controlled switch that places transfer switch 1104 into the first or the second connection state. In another form, the switch controller reflects control logic that controls the connection state of transfer switch 1104 in accordance with a designated operating scheme. Table I (below) is indicative of one such operating scheme. Other schemes are possible.

TABLE I

| Five Axles | Six Axles |
|---|---|
| Low Speed And Low Tractive Effort Settings | Battery Fully Charged & Dynamic Braking |
| High Speed Motoring | No Battery Charging & Motoring |
| Battery Discharged & Motoring | |
| Very High Speed Dynamic Braking | |

Although FIG. 10 illustrates a three-phase connection between battery 1102 and transfer switch 1104, it is not necessary that all three phases be used. For example, if the power requirement is relatively low, only one or two phases may be used. Similarly, three separate batteries could be independently connected (one to each phase), or one large battery could be connected to two phases, with a relatively smaller battery connected to the third phase. Further, power transfer between multiple batteries having different voltage potentials and/or capacities is also possible.

The configuration of FIG. 10 is especially advantageous in the context of retrofitting existing locomotives because transfer switch 1104 is believed to be much less expensive than adding additional inverters and/or DC-to-DC converters. Such advantage, however, is not limited to the retrofit context. Also, it should be understood that the configuration of FIG. 10 is not limited to a single inverter per transfer switch configuration.

FIG. 10 further illustrates an optional charging source 1130 that may be electrically connected to DC traction bus 122. The optional charging source 1130 may be, for example, another charging engine (see FIG. 2) or an external charger, such as that discussed in connection with FIG. 4.

The general operation of the configuration of FIG. 10 will be described by reference to the connection states of transfer switch 1104. When transfer switch 1104 is in the first switch state, the sixth axle is selectively used to provide additional motoring or braking power. In this switch state, battery 1102 is effectively disconnected and, therefore, neither charges nor discharges.

When the sixth axle is not needed, switch controller 1120 places transfer switch 1104 in the second connection state, wherein battery 1102 is connected to inverter 106F. If, at this time, the other traction motors (e.g., traction motor 108A) are operating in a dynamic braking mode, electrical energy is generated and carried on DC traction bus 122, as described in greater detail elsewhere herein. Inverter 106F transfers a portion of this dynamic braking electrical energy to battery 1102 for storage. If, on the other hand, the other traction motors are operating in a motoring mode, inverter 106F transfers any electrical energy stored in battery 1102 onto DC traction bus 122 to supplement the primary electric power supplied by primary mover power source 104. Such electrical energy transferred from battery 1102 to DC traction bus 122 may be referred to as secondary electric power. In one embodiment, inverter 106F comprises a chopper circuit for controlling the provision of secondary electric power to DC traction bus 122 from battery 1102.

It should be understood, however, that battery 1102 can also be charged when the other traction motors are not operating in a dynamic braking mode. For example, the battery can be charged when transfer switch 1104 is in the second connection state (battery 1102 is connected to inverter 106F) and the other traction motors are motoring or idling if the amount of power drawn by the other traction motors is less than the amount of primary electric power carried on DC traction bus 122.

Advantageously, battery 1102 can also be charged using charging electric power from the optional charging source 1130, such as an optional energy source. As illustrated in FIG. 10, the optional charging source 1130, such as an optional energy source is connected such that it provides charging electric power to be carried on DC traction bus 122. When the optional charging source 1130, such as an optional energy source is connected and providing charging electric power, switch controller 1120 places transfer switch 1104 in the second connection state. In this configuration, inverter 106F transfers a portion of the electric power carried on DC traction bus 122 to battery 1102 for storage. As such, battery 1102 may be charged from the optional charging source 1130, such as an optional energy source.

In summary, in the embodiment of FIG. 10, when transfer switch is in the second connection state, battery 1102 may be charged from dynamic braking energy, from excess locomotive energy (e.g., when the other traction motors draw less power than the amount of primary electric power carried on DC traction bus 122), and/or from charging electric power from optional charging source 1130. When transfer switch 1104 is in the second connection state and the other traction motors draw more power than the amount of primary electric power carried on DC traction bus 122, inverter 106F transfers secondary electric power from battery 1102 to DC traction bus 122 to supplement the primary electric power. When transfer switch 1104 is in the first connection state, battery 1102 is disconnected and traction motor 1108F is operable to assist in motoring and/or dynamic braking. Table I summarizes one set of operating modes of the embodiment of FIG. 10.

While FIG. 10 illustrates an energy storage device in the form of a battery, other energy storage devices, such as flywheel systems or ultra-capacitors, may also be employed instead of or in addition to battery 1102. Further, it should be understood that the configuration of FIG. 10 may be scaled. In other words, the configuration can be applied to more than one axle.

Figure 11:
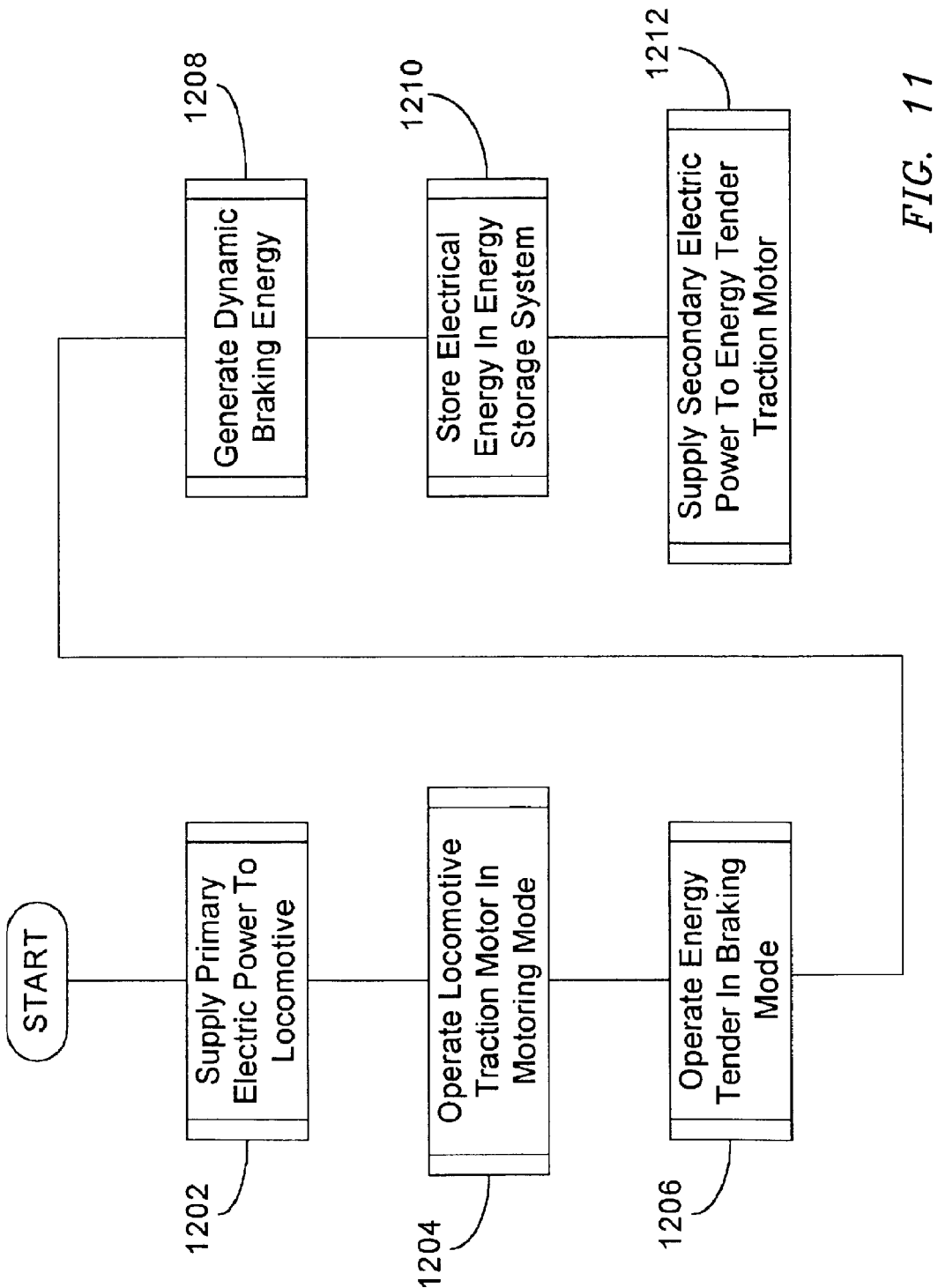
FIG. 11 is a flow chart that illustrates one method of operating a hybrid energy locomotive system, according to an embodiment of the invention.

FIG. 11 is a flow chart that illustrates one method of operating a hybrid energy locomotive system. The particular method illustrated relates to a system including a locomotive vehicle and an energy tender vehicle. The locomotive includes a diesel-electric prime mover power source that supplies primary electric power to a plurality of traction motor systems associated with the locomotive. As explained elsewhere herein, the traction motor systems operate the locomotive in a motoring mode in response to the primary electric power. In this particular example, the energy tender also includes a plurality of traction motor systems (see FIG. 1). The energy tender traction motor systems are operable in both a motoring mode and a dynamic braking mode. The energy tender vehicle also includes an energy storage system for capturing at least a portion of the electrical energy generated when the energy tender traction motors operate in the dynamic braking mode.

While supplying 1202 primary electric power to the locomotive, and operating 1204 the locomotive traction motor in the motoring mode, primary electric power is supplied to one or more of the locomotive traction motor systems, thereby causing the locomotive to operate in a motoring mode. When the locomotive traction motor systems operate in the motoring mode, it is possible to operate 1206 one or more of the energy tender traction motor systems in a dynamic braking mode. Of course, the energy tender traction motor systems can be operated in the dynamic braking mode at other times such as, for example, when the locomotive traction motor systems operate in the dynamic braking mode. When one or more of the energy tender traction motor systems operate in the dynamic braking mode, electrical energy is generated 1208. Some of the dynamic braking energy is preferably stored 1210 in the energy storage system for later use. For example, such stored power may be converted and supplied 1212 as secondary electric power for use by the energy tender traction motor systems to assist in motoring.

Advantageously, the method of FIG. 11 permits locating the energy tender vehicle anywhere in the train because the energy tender vehicle can capture dynamic braking energy from its own traction motor systems. In other words, the energy capture system need not be electrically connected to the locomotive in order to store energy for later use.

Although the foregoing descriptions have often referred to AC diesel-electric locomotive systems to describe several pertinent aspects of the disclosure, the present invention should not be interpreted as being limited to such locomotive systems. For example, aspects of the present disclosure may be employed with "all electric" locomotives powered by electric "third rails" or overhead power systems. Further, aspects of the hybrid energy locomotive systems and methods described herein can be used with diesel-electric locomotives using a DC generator rather than an AC alternator and combinations thereof. Also, the hybrid energy locomotive systems and methods described herein are not limited to use with AC traction motors. As explained elsewhere herein, the energy management system disclosed herein may be used in connection with non-locomotive off-highway vehicles such as, for example, large excavators, and other vehicles and powered systems.

As can now be appreciated, the hybrid energy systems and methods herein described provide substantial advantages over the prior art. Such advantages include improved fuel efficiency, increased fuel range, and reduced emissions such as transient smoke. Other advantages include improved speed by the provision of an on-demand source of power for a horsepower burst. Such a system also provides improved tunnel performance such as, for example, improved immunity to oxygen and/or temperature derations in tunnels. Also among the advantages are reduced noise and vibration conditions, which may be particularly beneficial to personnel who work on the train. Significantly, the hybrid energy locomotive system herein described may also be adapted for use with existing locomotive systems.

Figure 12:
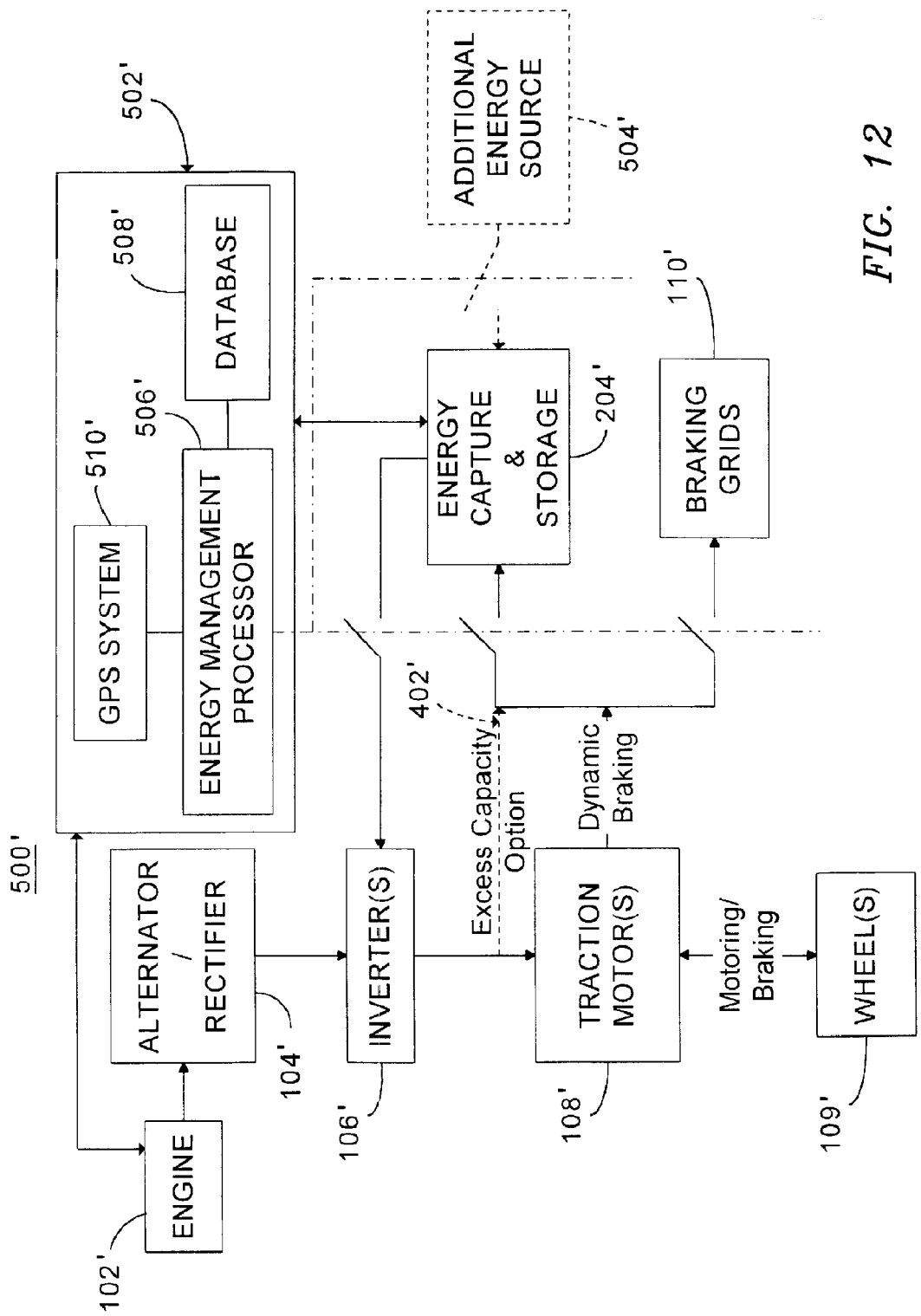
FIG. 12 is a block diagram illustrating an exemplary embodiment of an energy storage and generation system suitable for use in a hybrid energy locomotive system, including an energy management system for controlling the storage and regeneration of energy.

FIG. 12 illustrates an exemplary embodiment of an energy management system 502' for use with one of a plurality of hybrid energy diesel electric locomotives 500'. Each locomotive 500' includes an engine 102' and a primary mover power source 104', 106' (e.g., alternator and rectifier combination) to provide primary electric power. Additionally, the locomotive 500' illustratively includes a traction bus coupled to the primary mover power source 104', 106' to carry the primary electric power, and a traction motor 108' connected to the traction bus. The traction motor 108' includes a motoring mode responsive to the primary electric power to propel one of a plurality of locomotives 500' on one of the plurality of routes. Additionally, the traction motor 108' includes a dynamic braking mode to generate dynamic braking electrical energy on the traction bus.

As illustrated in the exemplary embodiment of FIG. 12, the energy management system 502' includes a position identification device 510', such as a GPS-based system, for example, to provide position information for one of the plurality of locomotives 500' at incremental positions 518' along one of the plurality of routes. Additionally, the exemplary embodiment of the energy management system 502' illustratively includes a database 508' to store historical data of a traction and/or auxiliary energy demand for a plurality of locomotives 500' at each of the incremental positions 518' along each of the plurality of routes. Each of the locomotives 500', whose previous traction and/or auxiliary energy demand along each of the plurality of routes is stored in the database 508', may differ in size, length, engine horsepower output, in addition to other operating characteristics. Additionally, each of the plurality of routes may differ substantially in their path or may include substantially common paths.

Figure 13:
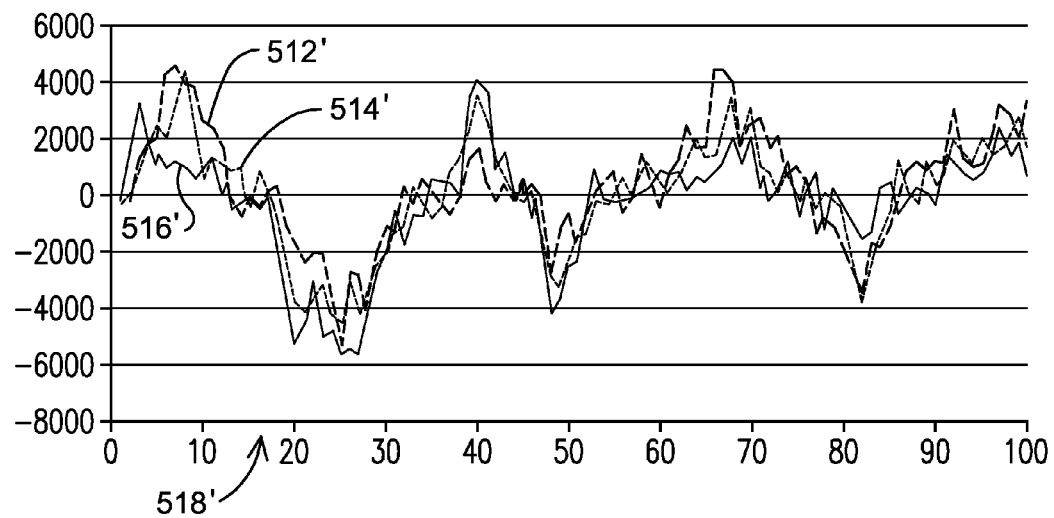
FIG. 13 is a spatial diagram illustrating a plurality of data sets each relating to historical traction and/or auxiliary energy demand versus incremental position along one of a plurality of routes.
Figure 16:
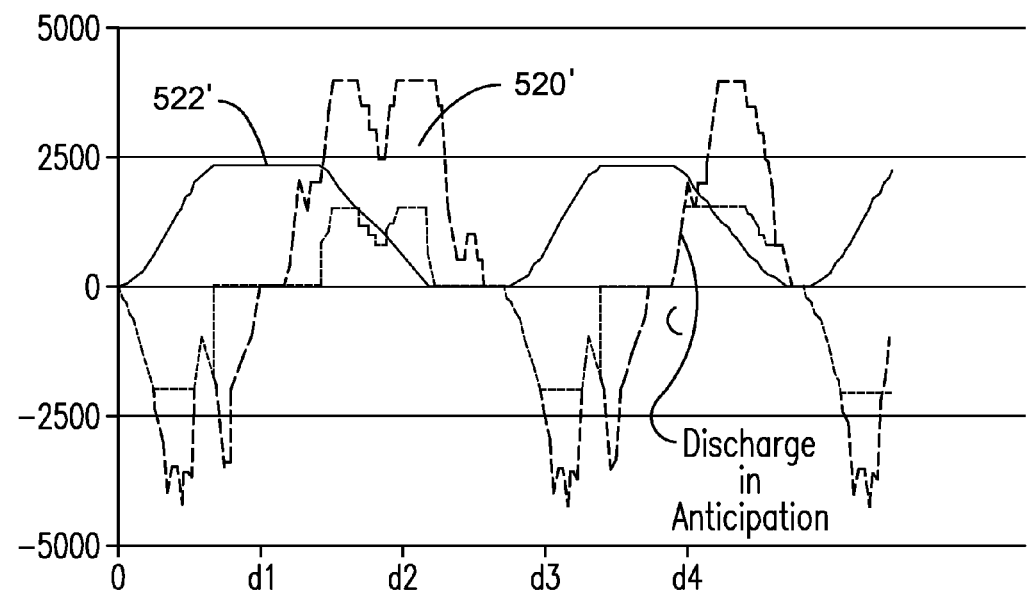
FIG. 16 is a spatial diagram of an anticipated traction energy, energy storage device energy, and energy storage device power utilizing an exemplary embodiment of an energy management system versus incremental position along one of a plurality of routes.

More particularly, the energy management system 502' includes an energy management processor 506' coupled to the position identification device 510' and the database 508' to retrieve historical data 512', 514', 516' for a plurality of locomotives 500' at each of the incremental positions 518' along one of a plurality of routes. The historical data 512', 514', 516' illustrated in the exemplary embodiment of FIG. 13 may represent three independent historical data sets of the traction and/or auxiliary energy demand for the same locomotive traveling over the same route, or alternatively may represent three independent historical data sets of the traction and/or auxiliary energy demand for three distinct locomotives traveling over the same route. The energy management processor 506' retrieves the historical data 512', 514', 516' of traction and/or auxiliary energy demand to estimate an anticipated traction and/or auxiliary energy demand 520' (FIG. 16) for one of the plurality of locomotives 500' at each of the incremental positions 518' along the same route over which the historical data was obtained. FIG. 16 illustrates an exemplary embodiment of an anticipated traction and/or auxiliary energy demand 520' obtained using the historical data 512', 514', 516' of traction and/or auxiliary energy demand, with FIG. 16 illustrating a portion of the incremental positions of FIG. 13 approximately between positions 10 and 80, for example. The energy management processor 506' utilizes the historical data 512', 514', 516' with a variety of different methods to determine an anticipated traction and/or auxiliary energy demand for one of the plurality of locomotives 500' to travel over the same route, as discussed in further detail below. Although FIG. 13 illustrates three sets of historical data utilized to obtain the anticipated traction and/or auxiliary energy demand of the locomotive to travel on a route, less than three or more than three sets of historical data may be utilized to obtain the anticipated traction and/or auxiliary energy demand at each fixed location along the route, and to estimate the storage and transfer parameters, as discussed below.

As further illustrated in the exemplary embodiment of FIG. 12, the energy management system 502' illustratively includes an energy storage system 204' connected to the traction bus. The energy storage system 204' is responsive to the energy management processor 506' at each incremental position 518' along each route based upon the position information from the position identification device 510', to store electrical energy generated by the traction motor 108' based upon a storage parameter. Additionally, the energy storage system 204' is responsive to the energy management processor 506' at each incremental position 518' to supply secondary electric power from the stored electrical energy to the traction bus to augment the primary electric power based upon a transfer parameter so to enhance a performance parameter of one of the plurality of locomotives 500' over one of the plurality of routes. In one embodiment of the energy management system 502', the storage parameters and transfer parameters are communicated from the energy management processor 506' to the energy storage system 204' at each incremental position 518' along each of the plurality of routes. In one embodiment of the energy management system 502', the energy storage system 204' supplies secondary electric power based upon the transfer parameter so to maximize a fuel efficiency of one of the plurality of locomotives 500' over one of the plurality of routes. However, the energy management system 502' may include the energy storage system 204' to supply secondary electric power to enhance a performance parameter of one of the plurality of locomotives other than maximizing the fuel efficiency over one of the plurality of routes, for example.

The energy management processor 506' utilizes the anticipated traction and/or auxiliary energy demand of one of the plurality of locomotives 500' at each of the incremental positions 518', determined using the historical data 512', 514', 516', with a current status 522' (FIG. 16) of the energy storage system at each of the incremental positions to estimate a storage and transfer parameter at each of incremental positions. FIG. 16 illustrates an example of a current status or battery energy, for example, of the energy storage system versus incremental position along the route. The energy management processor 506' will determine whether to increase or decrease the storage/transfer parameter from the initial current status 522' of the energy storage system 204' at an initial incremental position of the route using the anticipated traction and/or auxiliary energy demand, as discussed below.

Figure 14:
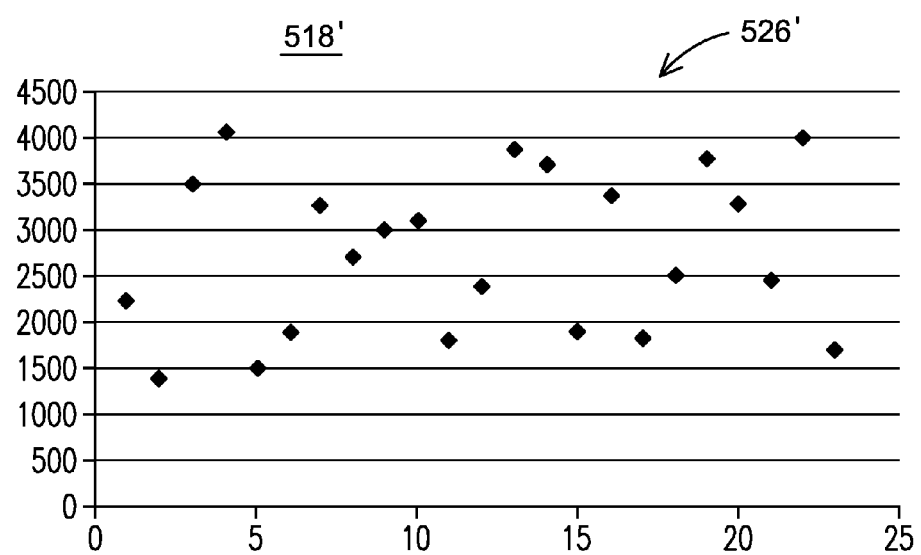
FIG. 14 is a spatial diagram illustrating a plurality of data sets each relating to historical traction and/or auxiliary energy demand values at a fixed location along one of a plurality of routes versus each trial along the one of a plurality of routes.

Upon retrieving the traction and/or auxiliary energy demand of each locomotive 500' at each incremental position 518' along each route, the energy management processor 506' segregates the traction and/or auxiliary energy demand values for the plurality of locomotives 500' into a plurality of groups 526' (FIG. 14) based upon one fixed location corresponding to incremental positions 518' along each route. In the exemplary embodiment of FIG. 14, the energy management processor has segregated twenty-three traction and/or auxiliary energy demand values for the plurality of locomotives at mile marker 70, for example, of one particular route of the plurality of routes. Although FIG. 14 illustrates twenty-three traction and/or auxiliary energy demand values for a plurality of locomotives at mile marker 70 of a particular route, the energy management processor may segregate more or less than twenty-three traction and/or auxiliary energy demand values. Additionally, it may segregate traction and/or auxiliary energy demand values for the same locomotive at a fixed location along the same route, and it may store, retrieve and segregate traction and/or auxiliary energy demand values at various incremental positions, such as every 10-mile (16.09 kilometers) marker, or at any other varying incremental positions. In addition, although the energy management processor segregates the traction motor energy values based upon a fixed location of the locomotives along the route, it may segregate the traction motor energy values based upon fixed time increments. In an exemplary embodiment of the energy management system, FIG. 13 may represent the traction and/or auxiliary energy values at each one of a fixed time increment, such as every 10 minute increment from the commencement of a trip, for example. In this exemplary embodiment, FIG. 14 correspondingly illustrates the segregation of the traction and/or auxiliary energy values by the energy management processor at each fixed time increment, such as 70 minutes from commencement of the trip, for example, and the twenty-three traction and/or auxiliary energy values at each of the respective twenty-three runs, for example.

The energy management processor 506' estimates an anticipated traction and/or auxiliary energy demand 520' of one of the plurality of locomotives 500' at each incremental positions 518', such as fixed locations along the route based upon each of the groups 526' of the traction and/or auxiliary energy demand values of the plurality of locomotives 500'. Additionally, the energy management processor 506' determines the anticipated traction and/or auxiliary energy demand of one of plurality of locomotives 500' at each of the fixed locations, based upon one or more operating characteristics of the locomotive 500' at each of the incremental positions 518', such as fixed locations. Upon originally storing each of the historical data 512', 514', 516' of the traction and/or auxiliary energy demand of each locomotive 500' along each route, the database 508' may store the operating characteristics, including weight, speed, and length, for example, of each locomotive at each incremental position. This historical data 512', 514', 516', which may include the operating characteristics of each locomotive at each incremental position, in addition to the traction and/or auxiliary energy demand, may be used by the energy management processor 506' to derive a mathematical relationship between the anticipated traction and/or auxiliary energy demand 520' of one of the plurality of locomotives 500' along the route at each incremental positions 518', such as fixed locations, and one or more operating characteristics, including but not limited to weight, speed and length of the locomotive, for example. The energy management processor 506' may utilize the known operating characteristics and/or projected operating characteristics, such as speed, for example, to determine an anticipated traction and/or auxiliary energy demand 520' at each incremental positions 518', such as fixed locations along the route. In an exemplary embodiment, such a mathematical relationship may be:

$$ED=(1.1*W)+(23*S)+\{207,392,-102\}(170*L)+R$$

where ED is the anticipated traction and/or auxiliary energy demand at the fixed location (or fixed time) when the weight, speed and length measurements were taken, W is the weight of the locomotive (in tons), S is the speed of the locomotive (in miles per hour), L is the length of the locomotive (in feet), and R is a residual term. The type of locomotive will determine the term {207, 392, −107} to be used, based upon on one of an intermodal (or high speed freight) type locomotive corresponding to 207, a coal (or low speed freight) type locomotive corresponding to 392 and a manifest (or passenger) type locomotive corresponding to −102. The first four terms of the above equation consider the current weight, speed, type and length of the locomotive (i.e., static conditions), and the residual R factor considers previous history of the locomotive operation in performing future calculations of anticipated traction and/or auxiliary energy demand values at fixed location increments or fixed time increments. In an exemplary embodiment, the residual factor R is determined based upon the energy management processor evaluating the relative magnitude of the anticipated traction and/or auxiliary energy demand for previous fixed location increments or fixed time increments as compared to the historic data of traction and/or auxiliary energy demand at those fixed location increments or fixed time increments. For example, if the energy management processor determines that the anticipated traction and/or auxiliary energy demand for the previous two 10-mile (16.09 kilometers) marker increments was 50% of the maximum historic data of traction and/or auxiliary energy demand for those previous two 10-mile (16.09 kilometers) maker increments, the energy management processor may derive a residual factor R to adjust the anticipated traction and/or auxiliary energy demand to correspond to 50% of the maximum historic data for future increment positions. In an additional exemplary embodiment, the energy management processor may derive the residual factor R based upon comparing previously anticipated traction and/or auxiliary energy demands with actual measured traction and/or auxiliary energy demands at previous fixed location increments or fixed time increments. For example, if the energy management processor determines that the anticipated traction and/or auxiliary energy demands for the previous three 10-mile (16.09 kilometers) marker increments were 30% higher than the actual traction and/or auxiliary energy demands measured as the locomotive traversed through those previous three 10-mile (16.09 kilometers) marker increments, the energy management process may derive a residual factor R to scale down future anticipated traction and/or auxiliary energy demands to more closely approximate the actual traction and/or auxiliary energy demands. Various mathematical relationships between the anticipated traction and/or auxiliary energy demand of one of the plurality of locomotives 500' and one or more operating characteristics other than the mathematical relationship above may be utilized.

In addition, the energy management processor 506' may utilize the groups 526' of traction and/or auxiliary energy demand values at each incremental positions 518', such as fixed locations to determine the anticipated traction and/or auxiliary energy demand for one of a plurality of locomotives 500' at each incremental positions 518', such as fixed locations. The energy management processor 506' may perform a statistical computation of each group 526' of traction and/or auxiliary energy demand values at each incremental positions 518', such as fixed locations along the route for the plurality of locomotives 500'. In an exemplary embodiment of the energy management system, such statistical computations may include an average, mean and range of each group 526' of traction and/or auxiliary energy demand values at each incremental positions 518', such as fixed locations along the route for the plurality of locomotives 500'. For example, in an exemplary embodiment, for a group of traction and/or auxiliary energy demand values ranging from 1000-4000 hp, the average may be 2300 hp, the mean may be 2400 hp and the range of 3000 hp may be utilized by halving it (1500) and adding this to the minimum value (1000), to obtain 2500 hp. Thus, in an exemplary embodiment, the energy management processor 506' may utilize any of these statistical computations (in addition to others) in order to determine an anticipated traction and/or auxiliary energy demand for that particular incremental positions 518', such as fixed locations. As stated above, the energy management processor 506' may alternatively derive a mathematical relationship involving the operating characteristics of the locomotive to determine an anticipated traction and/or auxiliary energy demand for that each particular fixed location along the route.

Figure 15:
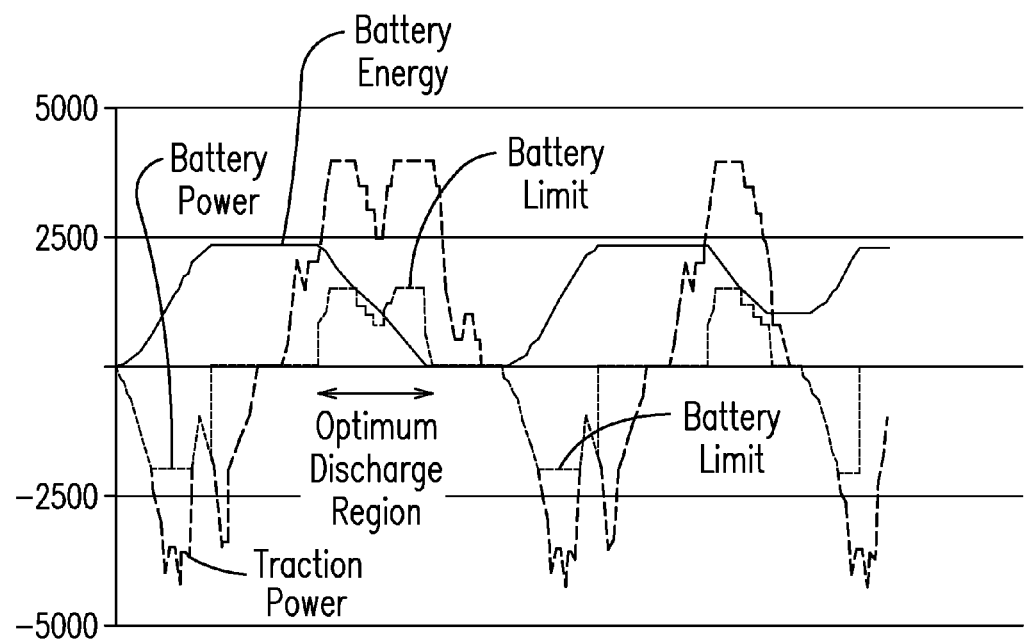
FIG. 15 is a spatial diagram of a currently anticipated traction energy, energy storage device energy, and energy storage device power versus incremental position along one of a plurality of routes.

The exemplary embodiment of FIG. 15 illustrates an anticipated traction and/or auxiliary energy demand at incremental positions along a route, as determined by a conventional system, through analyzing track topographic information, for example. FIG. 16 shows an example traction and/or auxiliary energy demand curve 520' determined by an energy management system including an energy management processor 506' based upon a statistical computation at each incremental positions 518', such as fixed locations.

After determining an anticipated traction and/or auxiliary energy demand 520' for one of the plurality of locomotives 500' at each incremental positions 518', such as fixed locations along the route, utilizing one of the mathematical relationship with the operating characteristics or the statistical computations, as discussed above, the energy management processor 506' estimates the storage parameter and transfer parameter at each incremental positions 518', such as fixed locations. The energy management processor 506' estimates the storage parameter and transfer parameter at each incremental positions 518', such as fixed locations along the route, by utilizing the anticipated traction and/or auxiliary energy demand 520' at each fixed location and monitoring a current status 522' of the energy storage system 204' at each fixed location along the route. As illustrated in the exemplary embodiment of FIG. 16, the energy management processor 506' estimates a storage parameter at a fixed location d1 due to an upcoming anticipated traction and/or auxiliary energy demand at fixed location d2 which exceeds the maximum primary energy of the locomotive engine. The storage parameter is reflected in FIG. 16 at fixed distance d1 by the increase in the energy of the energy storage system 204', in anticipation of a future energy need based upon the anticipated traction and/or auxiliary energy demand at fixed location d2. For example, if the maximum primary energy from the locomotive engine is 2000 hp and an upcoming anticipated traction and/or auxiliary energy demand is 2500 hp, the energy management processor 506' will estimate a storage parameter to ensure that the energy storage system 204' has adequate secondary stored energy so that the locomotive can meet this anticipated traction and/or auxiliary energy demand. Additionally, the energy management processor 506' may estimate a transfer parameter at a fixed location d3 where an upcoming dynamic braking mode region is anticipated. For example, the energy management processor 506' may anticipate an upcoming negative traction and/or auxiliary energy demand (e.g., dynamic braking region, or energy storage system charging region), indicative of an upcoming charging region and thereby estimate a transfer parameter, so that the energy storage system efficiently transfers all of its stored energy prior to entering the charging region.

As the locomotive 500' travels across the route, the energy management processor 506' continuously compares the estimated storage parameter and transfer parameter with an actual storage parameter and actual transfer parameter at each incremental position 518' along the route. In the event that the actual storage and transfer parameters and the estimated storage and transfer parameters differ by greater than a predetermined threshold at each of the incremental positions along the one of a plurality of routes, the energy management processor 506' switches into a default mode such that a locomotive operator manually controls the storage and transfer of electrical energy to the energy storage system. Additionally, if the energy management processor 506' determines that there is no historic data available for an upcoming route, and thus no anticipated traction and/or auxiliary energy demand may be constructed, the energy management processor similarly switches to a default mode.

Figure 17:
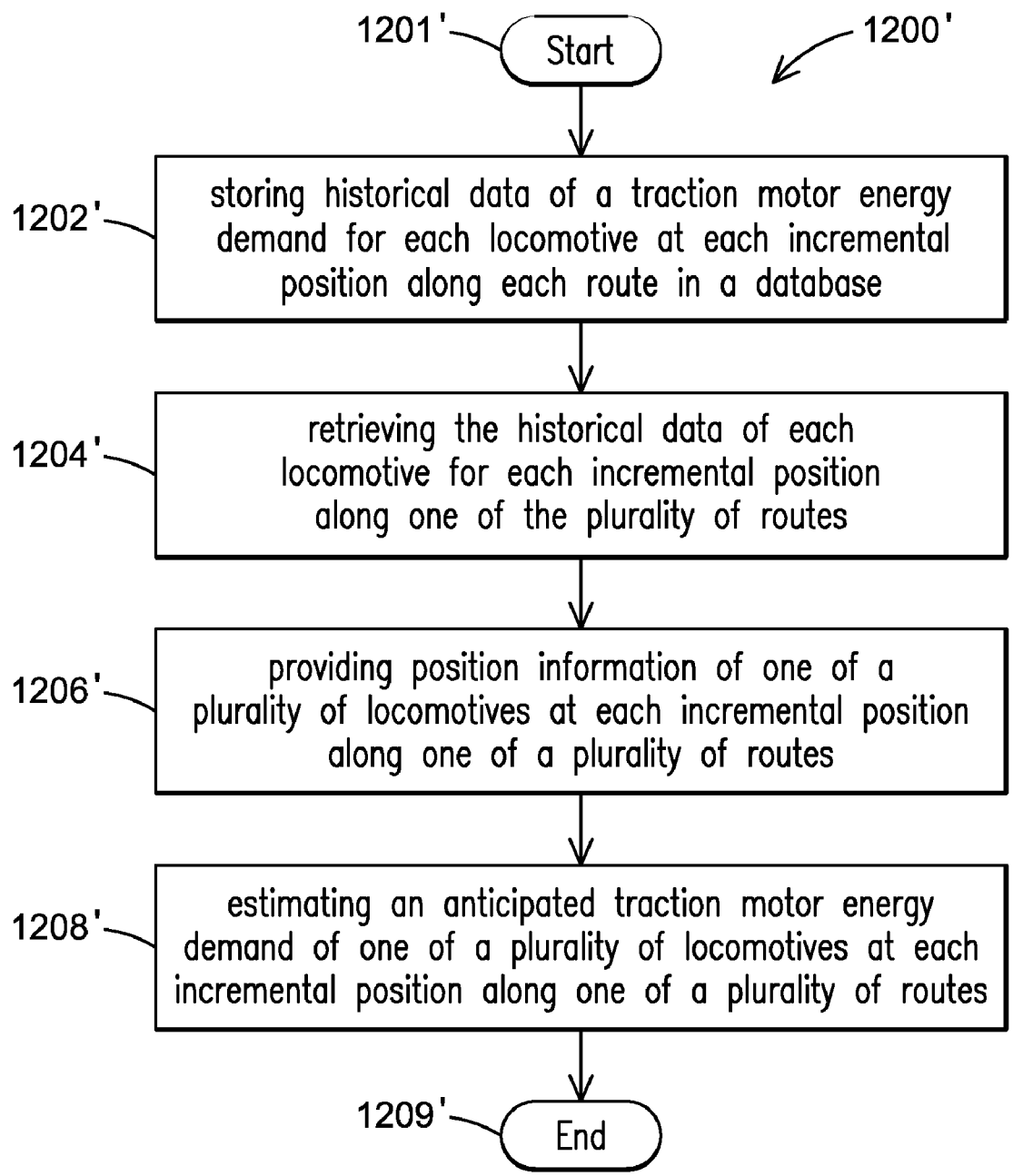
FIG. 17 is a flow chart illustrating an exemplary embodiment of a method carried out by or in the system illustrated in FIG. 12.

FIG. 17 illustrates an exemplary energy management method 1200' for use with one of a plurality of hybrid energy diesel electric locomotives 500'. Each locomotive 500' has an engine 102' and a primary mover power source 104', 106' providing primary electric power, and a traction bus coupled to the power converter to carry the primary electric power. A traction motor 108' is connected to the traction bus, and has a motoring mode responsive to the primary electric power to propel the one of a plurality of locomotives 500' on one of a plurality of routes. Additionally, the traction motor 108' has a dynamic braking mode to generate dynamic braking electrical energy on the traction bus. The energy management method 1200' begins at 1201' by storing 1202' historical data of a traction and/or auxiliary energy demand for each locomotive 500' at each incremental position along each route in a database. Additionally, the method includes retrieving 1204' the historical data 512', 514', 516' of each locomotive 500' for each of the incremental positions 518' along one of the plurality of routes. The method 1200' further includes providing 1206' position information of one of a plurality of locomotives 500' at incremental positions 518' along one of a plurality of routes. Additionally, the method includes estimating 1208' an anticipated traction and/or auxiliary energy demand 520' of one of a plurality of locomotives 500' at each of the incremental positions 518' along one of a plurality of routes, before ending at 1209'.

Figure 18:
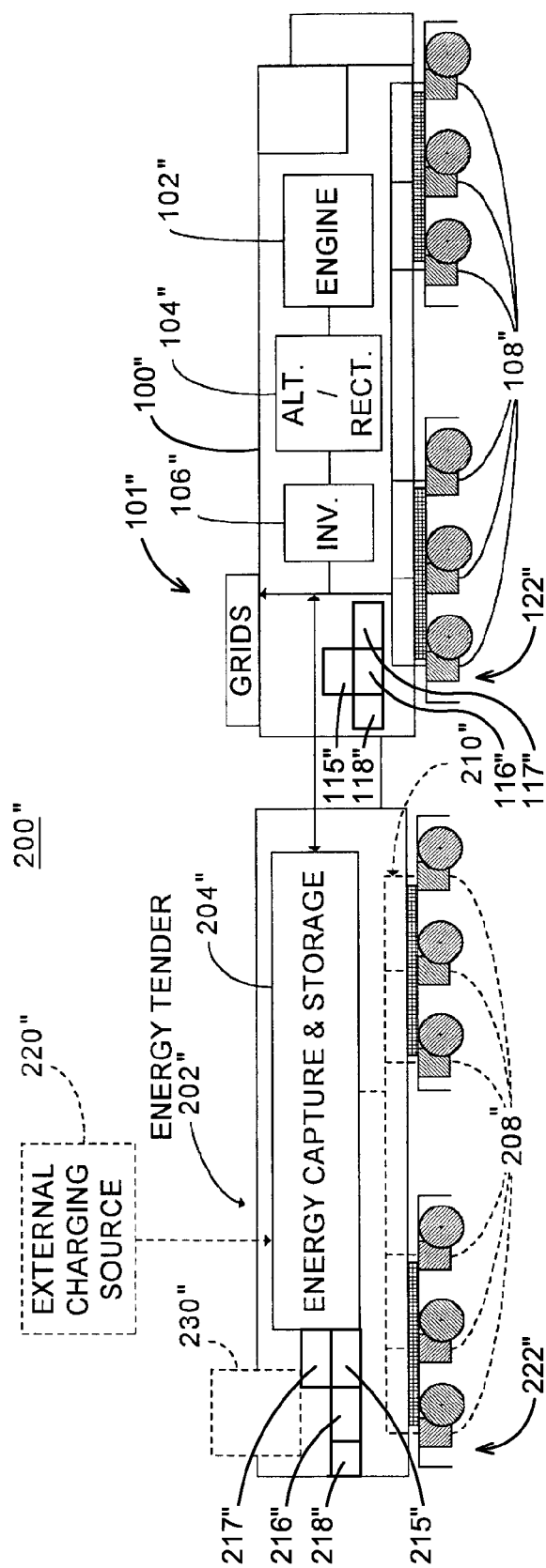
FIG. 18 is an exemplary embodiment of a system for monitoring the effectiveness of a braking function in a powered system in accordance with the present invention.

FIG. 18 is a block diagram of one embodiment of a system 200" for monitoring the effectiveness of a braking function 122", 222", such as the dynamic braking system in a powered system, such as a train 101", for example. The system 200" includes an energy storage system 204" positioned within an energy tender vehicle 202" of the train 101", and configured to store energy upon activation of the braking function 122", 222". The system 200" includes a locomotive 100" and the energy tender vehicle 202" for capturing and regenerating at least a portion of the dynamic braking electric energy generated when the locomotive traction motors 108" operate in a dynamic braking mode. The energy tender vehicle 202" is constructed and arranged to be coupled to the locomotive 100" in a consist configuration, and includes the energy capture and storage system 204" (sometimes referred to as an energy storage medium or an energy storage). It should be understood that it is common to use two or more locomotives in a consist configuration and that FIG. 18 illustrates a single locomotive for convenience. As further illustrated in the exemplary embodiment of FIG. 18, the locomotive 100" and the energy tender vehicle 202" have a respective plurality of traction motors 108", 208" coupled to a respective plurality of wheels. The energy is generated by the respective plurality of traction motors 108", 208" in the locomotive 100" and energy tender vehicle 202". Subsequent to the generation of the energy, the energy is stored within the respective energy storage system 204" on the energy tender vehicle 202".

In one embodiment, the energy storage system 204" selectively receives electrical power generated during the dynamic braking mode of operation and stores it for later regeneration and use. In the alternative or in addition to receiving and storing dynamic braking power, the energy storage system 204" can also be constructed and arranged to receive and store power from other sources. For example, excess prime mover power from the engine 102" can be transferred and stored. Similarly, when two or more locomotives are operating in a consist, excess power from one of the locomotives can be transferred and stored in the energy storage system 204". Also, a separate power generator (e.g., diesel generator) can be used to supply a charging voltage (e.g., a constant charging voltage) to the energy storage system 204". Still another source of charging is an optional off-train charging source 220". For example, the energy storage system 204" can be charged by external sources such as a battery charger in a train yard or at a wayside station.

The energy storage system 204" may include at least one of the following storage subsystems for storing the electrical energy generated during the dynamic braking mode: a battery subsystem, a flywheel subsystem, or an ultra-capacitor subsystem. Other storage subsystems are possible. Ultra-capacitors are available from Maxwell Technologies. These storage subsystems may be used separately or in combination. When used in combination, these storage subsystems can provide synergistic benefits not realized with the use of a single energy storage subsystem. A flywheel subsystem, for example, typically stores energy relatively fast but may be relatively limited in its total energy storage capacity. A battery subsystem, on the other hand, often stores energy relatively slowly but can be constructed to provide a relatively large total storage capacity. Hence, a flywheel subsystem may be combined with a battery subsystem wherein the flywheel subsystem captures the dynamic braking energy that cannot be timely captured by the battery subsystem. The energy thus stored in the flywheel subsystem may be thereafter used to charge the battery. Accordingly, the overall capture and storage capabilities are preferably extended beyond the limits of either a flywheel subsystem or a battery subsystem operating alone. Such synergies can be extended to combinations of other storage subsystems, such as a battery and ultra-capacitor in combination where the ultra-capacitor supplies the peak demand needs.

As illustrated in the exemplary embodiment of FIG. 18, the system 200" includes a sensor 115", 215" positioned on a respective locomotive 100" and energy tender vehicle 202" of the train 101". Each sensor 115", 215" is configured to measure an operating parameter of the respective locomotive 100" and energy tender vehicle 202", such as speed, acceleration, topography, ambient temperature, and electrical charge/power stored within the energy storage system 204" attributed to the braking function 122", 222", such as the dynamic braking system, for example. The sensors 115", 215" may be configured to measure operating parameters other than those listed above. The sensors 215" are coupled to the energy storage system 204" to measure the stored electrical charge/power within the energy storage system 204" attributed to the braking function 122", 222", such as the dynamic braking system, for example. As discussed below, each respective parameter of the locomotive 100" and energy tender vehicle 202" may vary by a respective predetermined threshold over a fixed time or a fixed distance, which is indicative of an effectiveness of the braking function 122", 222", such as the braking system, for example. The predetermined threshold for a particular parameter depends upon the particular parameter (e.g., speed, acceleration, or the like), the extent of the fixed time or fixed distance over which the particular parameter varies, and the initial value of the other parameters at an initial time or initial distance of the respective fixed time or fixed distance.

As further illustrated in the exemplary embodiment of FIG. 18, the system 200" includes a respective processor 116", 216" coupled to the sensor 115", 215" on the locomotive 100" and energy tender vehicle 202". The respective processor 116", 216" receives data of the respective locomotive 100" and energy tender vehicle 202" parameters from the sensors 115", 215". The processor 116", 216" determines the effectiveness of the braking function 122", 222", such as the braking system of the locomotive 100" and the energy tender vehicle 202", based upon whether the locomotive 100" and the energy tender vehicle 202" parameter data varies by the predetermined threshold (mentioned above) within a fixed time or a fixed distance, for example. The sensors 215" are coupled to the processor 216", and transmit the sensed energy tender vehicle parameters to the processor 216". The processor 216" determines an effectiveness and/or an availability of the braking function 222", such as a dynamic brake system, on the energy tender vehicle 202". Additionally, the sensors 115" of the locomotive 100" are coupled to the processor 116", which is used to determine an effectiveness and/or an availability of the braking function 122", such as the dynamic braking function on the locomotive 100", for example.

The topography of the current location of the energy tender vehicle 202" and the locomotive 100" may be determined based on a position determination device 118", 218", such as a transceiver in communication with a plurality of GPS satellites, for example. The position determination device 118", 218" is respectively positioned on the locomotive 100" and the energy tender vehicle 202". Upon conveying the location information of the respective vehicle to the respective processor 116", 216", the processor 116", 216" retrieves a track parameter from memory (e.g., the track parameter may be stored as pre-stored data in the memory). The track parameter may be, for example, the topography of the current location of the train 101", as determined based on the location information provided by the position determination device 118", 218". The processor 116", 216" may monitor the track parameter along the fixed time or fixed distance, and compare this variation to a predetermined threshold for a variation of the track parameter over the fixed time or fixed distance which would be indicative of an effectiveness of the braking function 122", 222", such as the braking system, for example. (In other words, the processor determines the value of a track parameter at each of a plurality of successive locations and/or times of the locomotive, as stored in memory and retrieved based on the location information, and assesses braking function based on whether the track parameter has varied by a predetermined threshold.) However, in an exemplary embodiment, the processor 116", 216" may merely utilize the track parameter at an initial time or initial location to determine a predetermined threshold for the variation of a locomotive 100" or energy tender vehicle 202" parameter over the fixed time or fixed distance, for example. Although the locomotive 100" and energy tender vehicle 202" in FIG. 18 include respective processors 116", 216", a common/shared processor may be used which receives the sensed operating parameters of each vehicle and determines the effectiveness and/or availability of the braking function 122", 222", such as the dynamic braking system in each vehicle, for example, or in one of the vehicles.

The processor 116", 216" includes a memory to store the predetermined threshold by which a first parameter (of a plurality of parameters of the locomotive 100" and energy tender vehicle 202") should vary during the fixed time or fixed distance from an initial value at a respective initial time or an initial location, for indicating braking effectiveness. The predetermined threshold for the first parameter over the fixed time or fixed distance is based upon the plurality of parameters at the initial time or initial location. In order to determine the effectiveness and/or availability of the braking function 222", such as a dynamic brake system on the energy tender vehicle 202", the processor 216" receives measured operating parameters from the sensors 215" and determines a change in an operating parameter of the vehicle, such as speed, over a fixed time or distance, based on other operating parameters of the vehicle over that fixed time or distance. The processor 216" then compares the determined change in the operating parameter with an acceptable change in the operating parameter (i.e., the predetermined threshold), which is pre-stored in a memory of the processor 216", for the fixed time or distance and the operating parameters of the vehicle over that distance. For example, for specific operating parameters of an ambient temperature of 20 degrees Celsius, a downhill topography, and zero notch engine throttle, an acceptable change (i.e., predetermined threshold) in the speed of the energy tender vehicle 202" over a fixed 30 second period of applying the dynamic brakes may be from 50 mph (80.47 kilometers/hour) to 20 mph (32.19 kilometers/hour) ((i.e., −30 mph (−48.28 kilometers/hour)). However, for these same operating parameters (20 degrees Celsius, downhill topography, zero notch engine throttle), the sensors 215" measure a respective speed of 50 mph (80.47 kilometers/hour) and 32 mph (51.5 kilometers/hour) at the beginning and end of the fixed 30-second period when the dynamic brakes are applied. The processor 216" then determines that the determined change in the speed of the energy tender vehicle ((−18 mph (−28.97 kilometers/hour)) falls outside the minimum acceptable change in the speed of the energy tender vehicle stored in memory ((−30 mph (−48.28 kilometers/hour)). Based on this, the processor determines that the braking function 222", such as a dynamic brake system of the energy tender vehicle 202" is not effective and/or available. If the above example involved a level topography, as oppose to a downhill topography, the acceptable change in speed may be lower, for example.

In another example, for the same operating parameters of an ambient temperature of 20 degrees Celsius, a downhill topography, and a zero notch level throttle, an acceptable change in the stored electrical power within the energy capture and storage system 204" attributable to the braking function 222", such as a dynamic brake system over a fixed 1 mile (1.609 kilometers) distance may be from 2000 W to 5000 W (i.e., +3000 W). For these same operating parameters (20 degrees Celsius, downhill topography, zero notch engine throttle), the sensors 215" measure a stored electrical power of 2000 W and 5500 W at the end of the fixed 1 mile (1.609 kilometers) distance when the braking function 222", such as a dynamic brake system are applied. The processor 216" then determines that the determined change in stored electrical power of the energy tender vehicle (+3500 W) falls within the minimum acceptable change in the stored electrical power of the energy tender vehicle 202" stored in memory (+3000 W), and accordingly, determines that the braking function 222", such as a dynamic brake system of the energy tender vehicle 202" is effective and/or available. The processor 116" of the locomotive 100" would make a determination of the effectiveness and/or availability of the braking function 122", such as the dynamic braking system of the locomotive 100" in a similar manner as the processor 216" above for the braking function 222", such as a dynamic brake system of the energy tender vehicle 202".

These embodiments solve a longstanding problem with train control enforcement for freight trains. In an additional exemplary embodiment, a method may be provided to enable a safety critical train control system to rely on a portion or all of dynamic braking capability on a train for enforcement. Using a dynamic braking system in lieu of or in addition to the train line air braking system may significantly decrease the stopping distance of a train within the positive train control enforcement system. Additionally, the use of a dynamic braking system within the positive train control enforcement system may provide an improved stopping distance to accommodate the driver with more time to act before a penalty is activated. The exemplary embodiments of the present invention provide the necessary assurance of braking availability to utilize dynamic braking in penalty braking situations.

In one embodiment, the processor 116", 216" is configured to initiate a corrective action upon determining that the braking function 122", 222", such as the braking system of the locomotive 100" and energy tender vehicle 202" is ineffective based on the locomotive or energy tender vehicle parameter having varied by less than the predetermined threshold within the fixed time or fixed distance. The corrective action includes, but is not limited to, activating an alternate braking system, activating an alarm, and/or reconfiguring the braking system. In an exemplary embodiment, the processor 116", 216" is configured to switch to a positive control enforcement mode, and upon switching to the positive control enforcement mode, the processor 116", 216" receives location information from the position determination device 118", 218" and speed information of the train from a speed sensor. Once the train 101" passes a predetermined location, the processor 116", 216" stops the train 101" within a maximum distance based on the speed information. The processor 116", 216" in the positive control enforcement mode is configured to stop the train 101" by activating the alternate braking system, such as locomotive air brakes or an emergency hand brake, for example, upon determining that the braking function 122", 222", such as the braking system, is ineffective. Those elements of the system 200" not specifically discussed herein, are similar to elements of the embodiments of the present invention discussed above, with double prime notation, and require no further discussion herein.

Figure 19:
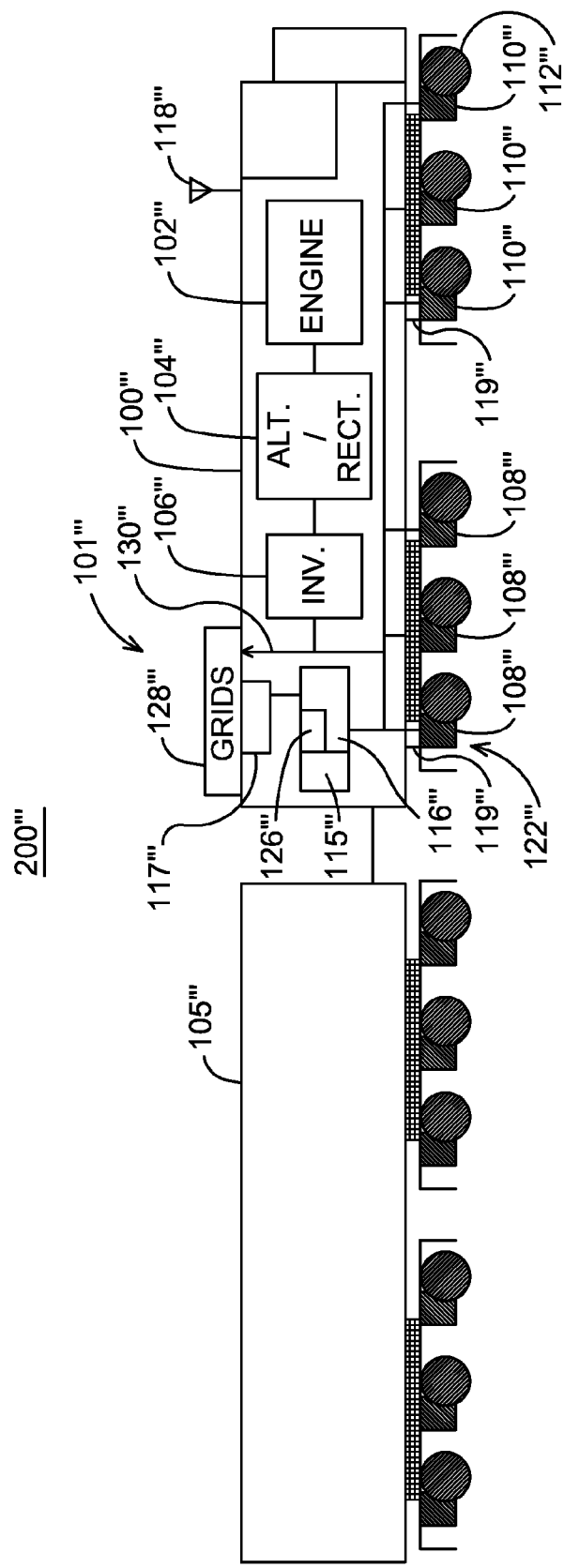
FIG. 19 is an exemplary embodiment of a system for monitoring the effectiveness of a braking function in a powered system in accordance with the present invention.

FIG. 19 illustrates an exemplary embodiment of a system 200''' for monitoring the effectiveness of a braking function 122''' in a powered system, such as a train 101''', for example. As illustrated in the exemplary embodiment of FIG. 19, the train 101''' includes a front locomotive 100''' and a trailing car 105'''. The system 200''' further includes a plurality of sensors 115''', 117''', 118''', 119''' to measure a parameter related to the operation of the train 101'''. As further illustrated in the exemplary embodiment of FIG. 19, the system 200''' further includes a processor 116''' which is coupled to the sensors 115''', 117''', 118''', 119''', in order to receive data of the measured parameters. Upon activating the braking function 122''', the processor 116''' is configured to determine the effectiveness of the braking function 122''' of the train 101''' based upon whether the parameter data varies by a predetermined threshold within a predetermined time or a predetermined distance, as discussed in further detail below.

The sensors 115''', 117''', 118''', 119''' may measure parameters related to the overall performance of the train 101''', such as the speed, acceleration, or total tractive effort of the train 101''', for example. As illustrated in the exemplary embodiment of FIG. 19, a speed sensor 115''' is provided to measure the speed of the train 101''', and to provide speed data to the processor 116'''. Upon receiving the speed data, the processor 116''' may compute the time-derivative of this data, in order to obtain the acceleration data of the train 101'''. Alternatively, the system 200''' may include an acceleration sensor which internally computes the train acceleration data and provides this acceleration data to the processor 116'''.

Figure 20:
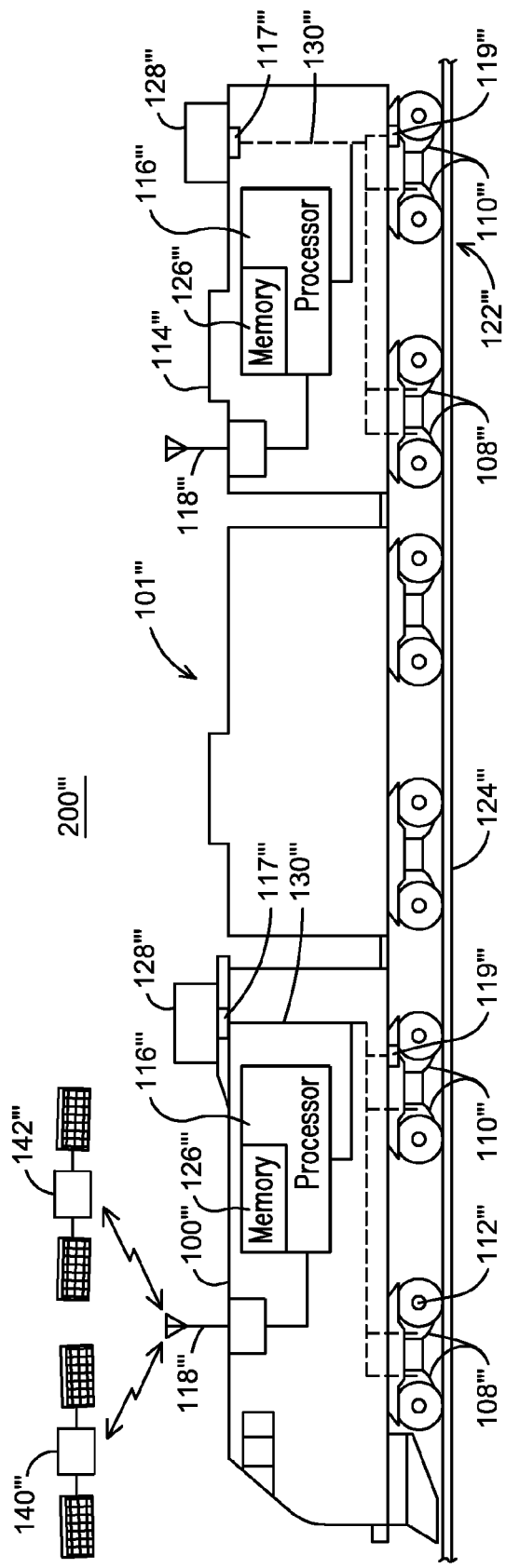
FIG. 20 is an exemplary embodiment of a system for monitoring the effectiveness of a braking function in a powered system in accordance with the present invention.

In an exemplary embodiment, upon activating the braking function 122''', the processor 116''' is configured to determine the effectiveness of the braking function 122''' of the train 101''' based upon whether parameter data related to the overall performance of the train 101''' varies by a predetermined threshold within a fixed time or a fixed distance. The memory 126" of the processor 116''' is configured to store the predetermined threshold to vary a first parameter during a fixed time or a fixed distance from a respective initial value at an initial time or an initial location. The predetermined threshold for variation of the first parameter over the fixed time or the fixed distance is based upon a plurality of secondary parameters at the initial time or initial location. In an example, as discussed above, upon activating the braking function 122''', the processor 116''' determines the acceleration data from the speed parameter data provided by the speed sensor 115''' as the train 101''' travels along a track 124''' (FIG. 20). A predetermined threshold, such as a minimum deceleration, for example, is stored in the memory 126''' of the processor 116''' and is compared with the actual acceleration data. The minimum deceleration may be based on an initial value of one or more secondary parameters, such as an ambient temperature, the type of locomotive (AC or DC), physical characteristics of the locomotive, and a topography at the initial time or initial location of the train 101''', for example. The processor 116''' determines the effectiveness and/or the availability of the braking function 122''' based upon whether the actual acceleration data complies with the minimum deceleration stored in the memory 126''', for example.

In another example, upon activating the braking function 122''', the processor 116''' determines a total tractive effort produced by the traction motors 108''', 110''' based upon current data measured by a sensor 119''' such as a current meter positioned to measure a current passing through the traction motors 108''', 110''' upon activation of the braking function 122'''. A predetermined threshold for the tractive effort, such as a minimum total tractive effort, may be stored in the memory 126''' of the processor 116''' and is retrieved to be compared with the actual tractive effort based upon the current data. The minimum total tractive effort may be based upon an initial value of one or more secondary parameters at the respective initial time or initial location, for example.

In another example, a position determination device 118''', such as a transceiver, is positioned on the external surface of the locomotive 100''' and is configured to be in wireless communication with a plurality of satellites 140''', 142''' (FIG. 20) such as GPS satellites, for example, to determine the location of the train 101'''. The position determination device 118''', such as the transceiver, is coupled to the processor 116''', and conveys the location information of the train 101''' to the processor 116". A memory 126''' of the processor 116" retrieves a track parameter, such as a track position or a topography, for example, of the current location of the train 101" from pre-stored data of the track parameter based on the location information provided by the position determination device 118". Additionally, the memory 126''' of the processor 116''' may store a predetermined threshold for varying the current location of the train 101''' over the fixed time, which is then compared with the current location information of the train 101'''.

The sensors 115''', 117''', 118''', 119''' may also measure parameters related to the operation of individual components of the train 101''', such as a plurality of grids 128''' used to dissipate electrical energy passed from the traction motors 108''', 110''' along a DC traction bus 130''' during the braking function 122'''. In an exemplary embodiment, the sensors which measure parameters related to individual components of the train 101''' may measure those parameters which relate to the generation of electrical energy by the traction motors 108''', 110''' to a DC traction bus 130''' and/or the dissipation of the electrical energy delivered from the DC traction bus 130''' through the grids 128''' during the braking function 122''', such as a dynamic braking function, for example. As illustrated in the exemplary embodiment of FIG. 19, a sensor 117''' such as a voltmeter is coupled to the grids 128''' to measure the voltage difference across the grids 128''', and is also coupled to the processor 116''' to communicate this voltage difference data to the processor 116'''. Additionally, the sensors 115''', 117''', 118''', 119''' may measure parameters related to the traction motors 108''', 110''' which generate electrical energy during the braking function, and transmit this electrical energy to the DC traction bus 130''', for example. As illustrated in the exemplary embodiment of FIG. 19, a sensor 119''' such as a current meter is coupled to the traction motors 110''' and is configured to measure the current passing through the traction motors 110''', and is coupled to the processor 116''' to communicate this current data to the processor 116'''.

Upon activating the braking function, the processor 116''' is configured to determine the effectiveness of the braking function 122''' of the train 101''' based upon whether parameter data related to an individual component of the train 101''' utilized during the braking function 122''' varies by a predetermined threshold within a momentary time period. In an exemplary embodiment, the momentary time period may be less than one second, and the processor 116''' may be configured to activate the braking function 122''' and evaluate the components discussed above on a random basis, such as for one momentary time period during one long time period. In one example, the processor 116''' may be configured to activate the braking function 122''' to evaluate the components discussed below for one momentary time period (e.g., less than one second) every thirty minutes, and is further configured to randomly evaluate each component. Such individual components include those discussed above, such as the traction motors 108''', 110''' which generate electrical energy during the braking function 122''' and transmit the electrical energy to the DC traction bus 130''', and the grids 128''' which receive the electrical energy from the DC traction bus 130''' during the braking function 122''' and dissipate the electrical energy. However, the embodiments of the present invention are not limited to evaluating parameters in connection with those components discussed above, and may include any component involved in the braking function 122'''.

In one example, the sensor 117''', such as the voltmeter, provides the voltage difference data across the grids 128''' during the braking function 122''' to the processor 116''', as discussed above. Upon activating the braking function 122''', the processor 116''' is configured to determine the effectiveness of the braking function 122''' based upon whether the voltage difference varies by a predetermined threshold within the momentary time period. The predetermined threshold variation of the voltage difference during the momentary time period may be based on an initial value of one or more secondary parameters of components of the train 101''', for example.

In another example, the sensor 119''', such as the current meter, provides current data passing through the traction motors 108''', 110''' to the processor 116''' during the braking function 122''', as discussed above. Upon activating the braking function 122''', the processor 116''' is configured to determine the effectiveness of the braking function 122''' based upon whether the current data varies by a predetermined threshold within the momentary time period. The predetermined threshold variation for the current data during the momentary time period may be based on an initial value of one or more secondary parameters of the components of the train 101''', for example.

In another example, a pair of power sensors may be positioned to electrically couple the traction motors 108''', 110''' to the DC traction bus 130''' and the plurality of grids 128''' to the dc traction bus 130'''. Upon activating the braking function 122''', the power sensors are configured to measure the electrical power delivered from the traction motors 108''', 110''' to the DC traction bus 130''' within the momentary time period and the power received by the grids 128''' from the DC traction bus 130''' within the momentary time period. The processor 116''' is configured to determine the effectiveness of the braking function 122''' based upon the delivered power and the received power, more specifically, whether the delivered power and the received power are greater than a predetermined power stored in the memory 126'''. The predetermined power may be based on an initial value of secondary parameters of the components of the train 101''' prior to initiation of the braking function 122'''.

FIG. 20 illustrates an additional embodiment of the present invention, including a train 101''' having two locomotives 100''', 114''', where each locomotive 100''', 114''' has a plurality of traction motors 108''', 110''' coupled to a respective plurality of wheels 112''' of the locomotives 100''', 114'''. The train operator switches the train 101''' into an idle mode, in which case the processor 116''' of the first locomotive 100''' is switched into a motoring mode such that an engine (and other related components) of the first locomotive 100''' is responsible for transmitting electrical energy to the traction motors 108''', 110''' of the first locomotive 100''. Also, upon switching the train 101''' into the idle mode, the processor 116''' of the second locomotive 114''' is switched into a braking mode such that the traction motors 108''', 110''' of the second locomotive 114''' transmit electrical energy to the DC traction bus 130''' configured to electrically couple the traction motors 108''', 110''' and the plurality of grids 128''' on the second locomotive 114'''. A pair of sensors 117''', 119''' is positioned to respectively couple the second locomotive traction motors 108''', 110''' to the DC traction bus 130''' and the plurality of grids 128''' to the DC traction bus 130'''. Upon switching the second locomotive 114''' into the braking mode, the sensors 117''', 119''' are configured to respectively measure the electrical power delivered from the second locomotive traction motors 108''', 110''' to the DC traction bus 130''' and the electrical power received by the grids 128''' from the DC traction bus 130'''. The processor 116''' is configured to determine the effectiveness of the braking function 122''' based upon the delivered electrical power and the received electrical power.

FIG. 19 illustrates an exemplary embodiment of the present invention, including the locomotive 100''' having a plurality of first traction motors 108''' and second traction motors 110''' coupled to a respective plurality of wheels 112''' of the locomotive 100'''. The train 101''' operator switches the train 101''' into an idle mode, upon which the processor 116''' is configured to switch a first traction motor 108''' of the locomotive 100''' into a motoring mode such that an engine 102''' (and related components) of the locomotive 100'' transmit electrical energy to the first traction motor 108'''. Additionally, the processor 116''' is configured to switch a second traction motor 110''' of the locomotive 100''' into the braking function 122''', such as a braking mode, for example, such that the second traction motor 110''' transmits electrical energy to the DC traction bus 130''' which electrically couples the traction motors 108''', 110''' and a plurality of grids 128''' on the locomotive 100'''. As discussed above, a respective pair of sensors may be positioned to respectively couple the second traction motor 110''' to the DC traction bus 130''' and the plurality of grids 128''' to the DC traction bus 130'''. Upon switching the second traction motor 110''' into the braking function 122''', such as a braking mode, for example, the respective sensor is configured to measure the electrical power delivered from the second traction motor 110''' to the DC traction bus 130''' and the electrical power received by the grids 128''' from the DC traction bus 130'''. The processor 116''' is configured to determine the effectiveness of the braking function 122''' based upon the delivered electrical power and the received electrical power.

Figure 21:
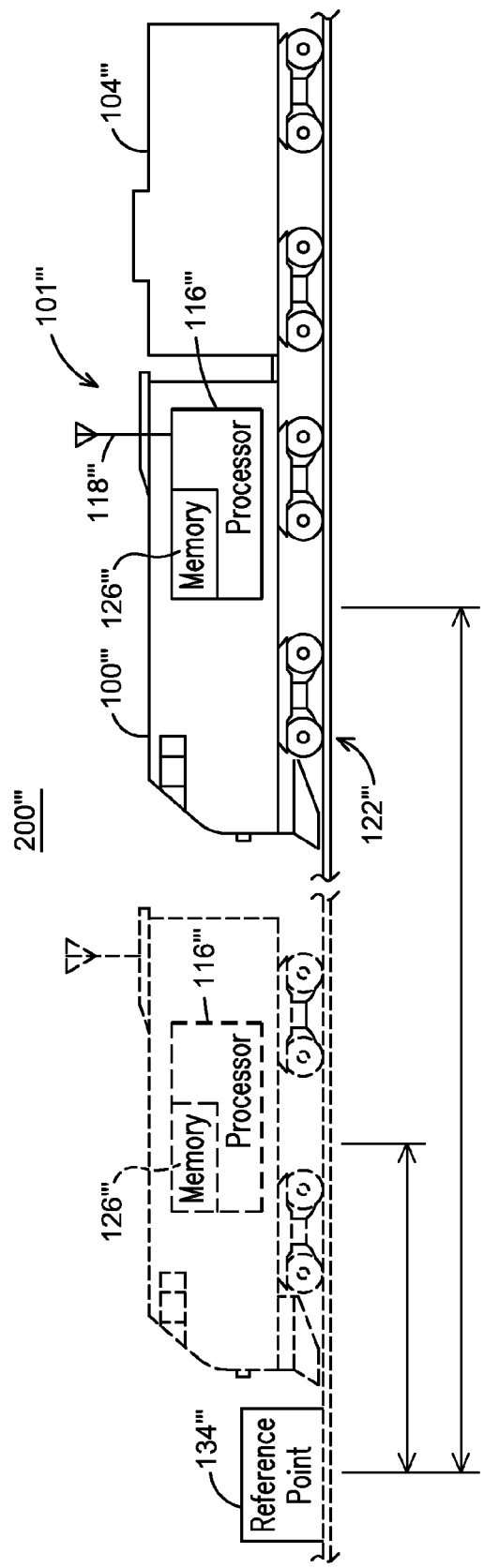
FIG. 21 is an exemplary embodiment of a system for monitoring the effectiveness of a braking function in a powered system in accordance with the present invention.

FIG. 21 illustrates an embodiment of a system 200''' of the present invention. As discussed in the embodiments above, the train 101''' includes a front locomotive 100''' with a processor 116''' and the processor 116''' is configured to switch into a control enforcement mode to prevent the train 101''' from traveling beyond a predetermined location 134''' along the track 124'''. Upon switching into the control enforcement mode, the processor 116''' is configured to monitor the effectiveness of the braking function 122''', using one of the methods discussed above, as the train 101''' approaches the predetermined location 134'''. The processor 116''' is configured to initiate a remedial action upon determining that the effectiveness of the braking function 122''' falls below a predetermined acceptable level. For example, the processor 116''' may monitor the effectiveness of the braking function 122''' by determining whether a parameter of the train 101''' is varied by the predetermined threshold within a fixed distance prior to the predetermined location 134''', such as whether the acceleration of the train 101''' over that fixed distance complies with a minimum deceleration threshold over that fixed distance. The remedial action taken may be activating an alternate braking system, such as an air brake system, for example, activating an alarm to alert the train operator, and reconfiguring the braking system.

Figure 22:
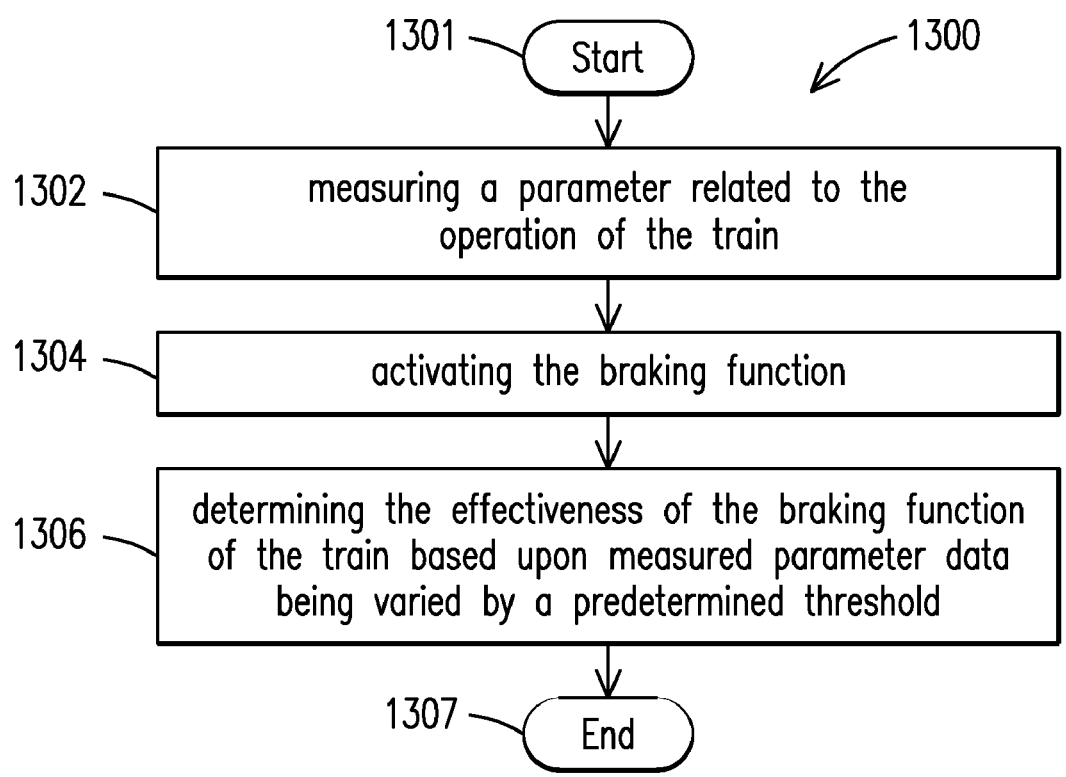
FIG. 22 is a flow chart illustrating an exemplary embodiment of a method for monitoring the effectiveness of braking function in a powered system in accordance with the present invention.

FIG. 22 shows a flow chart depicting an embodiment of a method 1300 for monitoring the effectiveness of a braking function 122''' in a powered system, such as a train, for example. The method 1300 begins at 1301 by measuring 1302 a parameter related to the operation of the train 101'''. Additionally, the method 1300 includes activating 1304 the braking function 122''', followed by determining 1306 the effectiveness of the braking function 122''' of the train 101''' based upon the measured parameter data being varied by a predetermined threshold.

Based on the foregoing specification, the above-discussed embodiments of the invention may be implemented using computer programming or engineering techniques including computer software, firmware, hardware or any combination or subset thereof, wherein the technical effect is to monitor the effectiveness of a braking function in a powered system. Any such resulting program, having computer-readable code means, may be embodied or provided within one or more computer-readable media, thereby making a computer program product, i.e., an article of manufacture, according to the discussed embodiments of the invention. The computer readable media may be, for instance, a fixed (hard) drive, diskette, optical disk, magnetic tape, semiconductor memory such as read-only memory (ROM), etc., or any transmitting/receiving medium such as the Internet or other communication network or link. The article of manufacture containing the computer code may be made and/or used by executing the code directly from one medium, by copying the code from one medium to another medium, or by transmitting the code over a network.

One skilled in the art of computer science will easily be able to combine the software created as described with appropriate general purpose or special purpose computer hardware, such as a microprocessor, to create a computer system or computer sub-system of the method embodiment of the invention. An apparatus for making, using or selling embodiments of the invention may be one or more processing systems including, but not limited to, a central processing unit (CPU), memory, storage devices, communication links and devices, servers, I/O devices, or any sub-components of one or more processing systems, including software, firmware, hardware or any combination or subset thereof, which embody those discussed embodiments the invention.

Figure 23:
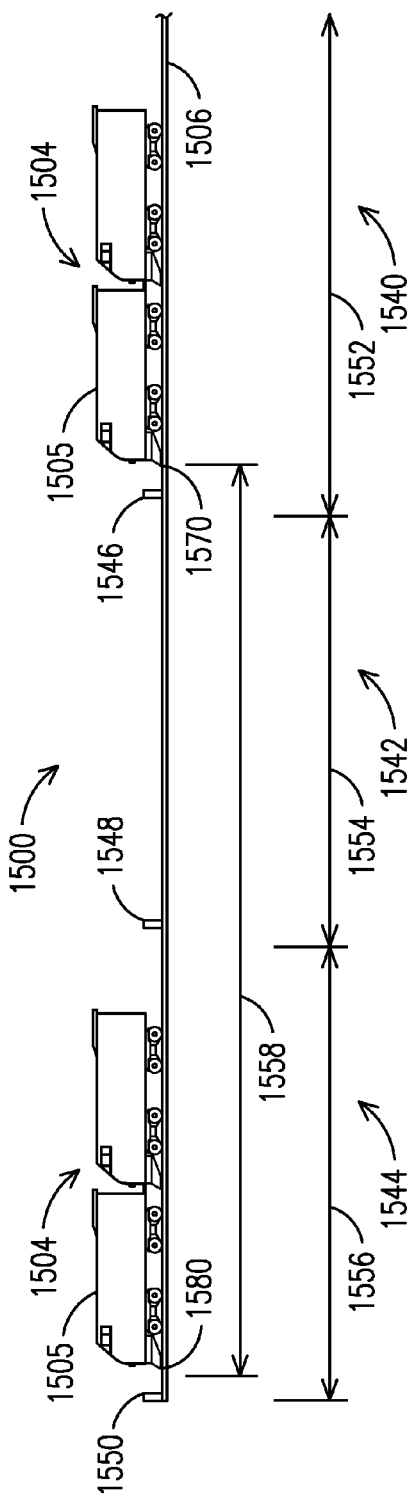
FIG. 23 is an exemplary embodiment of a train with a locomotive traveling along a route spaced into a plurality of block sections.

FIG. 23 illustrates an exemplary embodiment of a system 1500 for optimizing a braking schedule 1560 (FIG. 24) of a powered system traveling along a route, such as a train 1504 including a locomotive 1505 traveling along a railway 1506, for example. In an exemplary embodiment, the train 1504 may include one or more locomotive consists, and the locomotive 1505 may be within one of the locomotive consist(s), for example. As illustrated in FIG. 23, the railway 1506 is separated into block sections 1540,1542,1544, having a respective length 1552,1554,1556, where each respective block section has a railroad signal 1546,1548,1550. As appreciated by one of skill in the art, a train positioned in a block section with a red colored railroad signal is required to completely stop, as another locomotive is positioned in the next block section. A train positioned in a block section with a yellow colored railroad signal is required to slow down to a safe speed, as another locomotive is positioned two block sections ahead, and the locomotive will be required to completely stop in the next block section. Additionally, a train positioned in a block section with a green colored railroad signal may maintain speed, as no locomotive is positioned in the next two block sections. As illustrated in the exemplary embodiment of FIG. 23, if the train 1504 encounters the railroad signals 1546,1548,1550 when the railroad signals 1546,1548,1550 are respectively colored green, yellow and red, the train 1504 will need to come to a complete stop at the third railroad signal 1550. Thus, the train 1504 will need to come to a complete stop as the train 1504 travels from the first block section 1540 to the third block section 1544, or over a stopping distance (or braking region) 1558, which, in this example, is approximately equal to the sum of the lengths 1554,1556 of the second and third block sections 1542,1544. Although FIG. 23 illustrates a stopping distance 1558 between the first block section 1540 and the third block section 1544, the train 1504 need not be continuously slowing down or decelerating throughout this stopping distance 1558, provided that the train 1504 is completely stopped at the red colored third railroad signal 1550 at the stop point 1580. The exemplary embodiment discussed above and illustrated in FIG. 23 is merely an exemplary scenario in which a train would need to come to a complete stop over a certain traveling distance.

Figure 24:
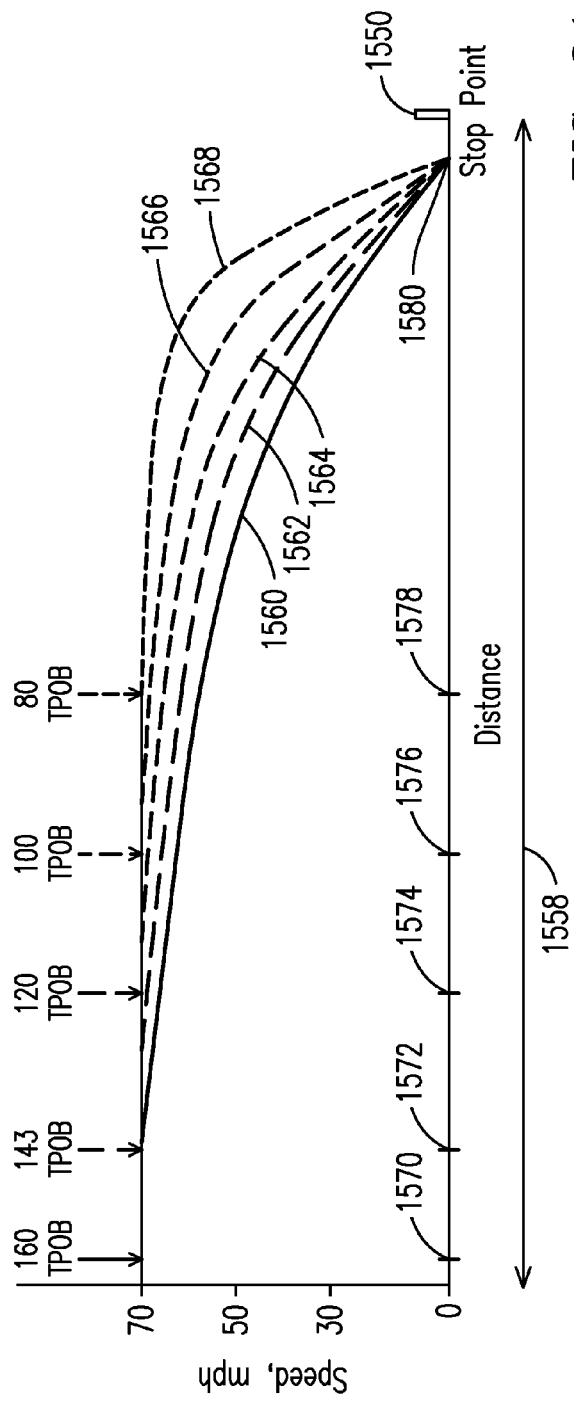
FIG. 24 is an exemplary embodiment of a plurality of braking schedules for a respective train, based on an a measured train parameter.

FIG. 24 illustrates a plurality of braking schedules 1560, 1562,1564,1566, 1568 for the train 1504 illustrated in FIG. 23, as it travels over the stopping distance 1558 and is required to stop at the stop point 1580 at the red colored railroad signal 1550. The braking schedules 1560,1562,1564, 1566,1568 each convey a predetermined speed of the train 1504 from its current location 1570 to the stop point 1580. For example, the braking schedule 1560 involves initiating the braking system of the train 1504 at the current location 1570, since the speed of the train 1504 decreases from this location to zero at the stop point 1580, and maintains a lower predetermined speed than the other braking schedules 1562,1564, 1566,1568 (between the location 1572 and the stop point 1580). In another example, the braking schedule 1568 involves maintaining the current speed at the current location 1570 until an initial braking location 1578, after which the speed of the train 1504 decreases to zero at the stop point 1580, and maintains a higher predetermined speed than the other braking schedules 1560,1562,1564,1566 (between the location 1576 and the stop point 1580). As discussed in greater detail below, the embodiments of the present invention involves selecting an optimal braking schedule which accurately reflects the braking capability of the train 1504. Although FIG. 24 illustrates a plurality of braking schedules, the embodiments of the present invention does not necessarily involve selecting an optimal predetermined braking schedule from among a plurality of predetermined braking schedules, and instead may involve determining an optimal braking schedule over the stopping distance 1558.

Figure 25:
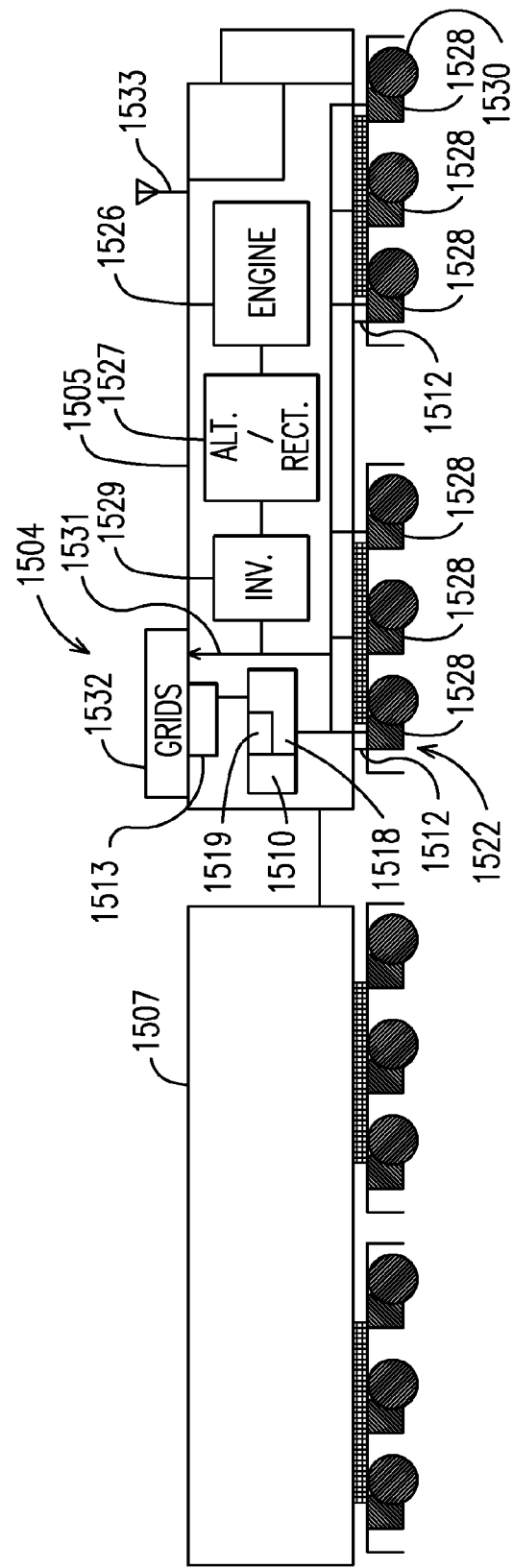
FIG. 25 is an exemplary embodiment of the train in FIG. 23 with a dynamic braking system used within a system for optimizing a braking schedule of the train in accordance with the present invention.

FIG. 25 illustrates an exemplary embodiment of the train 1504 including a locomotive 1505 and a rail car 1507. Although FIG. 25 illustrates one locomotive 1505 and one rail car 1507, a train utilized within the scope of the present invention may have more than one locomotive and/or more than one rail car. The train 1504 is utilized within the system 1500 of optimizing the braking schedule of the train 1504 traveling along the railway 1506. As discussed above, the embodiments of the present invention involve determining an optimal braking schedule for the train 1504 over the stopping distance 1558, which is based on one or more predetermined physical characteristics of the train, such as the mass of the train, for example. Thus, the embodiments of the present invention will measure and/or verify such predetermined characteristics of the train, and appropriately modify the braking schedule in order to achieve an optimal braking schedule over the stopping distance. However, the braking schedule may be based on various other factors related to the operation of the train (i.e., other predetermined characteristics), such as factors related to the operation of a motoring system and/or a braking system of the train. For example, the predetermined characteristic may be a performance rating of the motoring system and/or the braking system of the train.

As illustrated in FIG. 25, the train 1504 includes a dynamic braking system 1522 having a plurality of traction motors 1528 that are coupled to the axles of the wheels 1530 of the locomotive 1505. During an activation of the dynamic braking system 1522, the traction motors 1528 act as an electrical generator and convert the kinetic energy from the wheels 1530 of the locomotive into electrical energy, which is electrically delivered along a bus 1531 to grids 1532, through which the electrical energy is dissipated. Based on an activation level (or notch setting) of the dynamic braking system 1522, a greater/less amount of electrical energy is generated by the traction motors 1528, and is thus passed along the bus 1531 to the grids 1532.

The train 1504 includes sensors 1510,1512,1513 to measure a parameter related to the operation of the train 1504 (referred to herein as a measured parameter), and a processor 1518 that is coupled to the sensors 1510,1512,1513, to receive the measured parameter data. For example, the sensor 1510 measures the speed of the train 1504, and communicates this speed data to the processor 1518, which in-turn may take the time-derivative of the speed data to obtain the deceleration of the train 1504. Alternatively, the sensor 1510 may be an accelerometer, which directly measures the deceleration of the train 1504, and communicates this deceleration data to the processor 1518. A position determination device 1533, such as a global positioning system (GPS) transceiver may be utilized to communicate with one or more GPS satellites, and provide a current location of the train 1504. A memory 1519 of the processor 1518 has a stored predetermined mass of the train 1504; a predetermined grade of the railway 1506 at each location along the railway 1506; and an expected deceleration of the train 1504 based on a notch setting of the dynamic braking system 1522, the predetermined mass of the train 1504, and the predetermined grade of the railway 1506 at a particular location. The expected deceleration is one possible expected parameter, and the processor may store other expected parameters.

When the dynamic braking system 1522 is activated to a particular notch setting, the processor 1518 retrieves the expected deceleration from the memory 1519, based on the stored predetermined mass of the train 1504, the notch setting, and the predetermined grade at the particular location (the current location is determined from the position determination device 1533). The processor 1518 then obtains the measured deceleration data from the sensor 1510, and compares the measured deceleration with the expected deceleration. Based on this comparison, the processor 1518 adjusts the predetermined characteristics of the train 1504, such as the predetermined mass of the train 1504. For example, if the actual deceleration exceeded the expected deceleration, the processor 1518 would decrease the stored predetermined mass of the train 1504 in the memory 1519, and may modify the braking schedule from a first braking schedule 1560 to a second braking schedule 1562 (FIG. 24), for example. If the expected deceleration exceeded the measured deceleration, the processor 1518 would increase the stored predetermined mass of the train 1504 in the memory 1519, and may modify the braking schedule from a third braking schedule 1564 to a second braking schedule 1562, for example. In an exemplary embodiment, the processor 1518 may retrieve a stored predetermined threshold difference from the memory 1519, and the comparison between the measured deceleration and expected deceleration may need to exceed this predetermined threshold difference, in order for the processor 1518 to vary the predetermined mass and braking schedule of the train 1504, for example. Such a predetermined threshold difference may be used for the other comparisons performed by the processor 1518, as described below.

Subsequent to comparing the measured deceleration with the stored expected deceleration, the processor 1518 determines whether a difference in the measured deceleration and the expected deceleration is attributable to a secondary cause other than or apart from an adjustment to the predetermined mass stored in the memory 1519. For example, such secondary causes as an ambient weather condition (e.g., high speed wind), or a structural feature/anomaly of the train 1504, such as a cut-out brake, a cast-iron brake shoe instead of a cast friction brake shoe, and/or a friction force imposed by a bearing, for example. In order to diagnose whether or not the difference in the measured deceleration and expected deceleration is attributable to a structural feature/anomaly, such as a frictional force imposed by a bearing, the processor 1518 may determine the difference in the measured and expected decelerations at various speeds, as the frictional force imposed by the bearing varies with the speed of the train 1504. Similarly, for such a secondary cause as a high speed wind, the processor 1518 may determine the difference in the measured and expected decelerations at various wind speeds, and/or various train travel directions relative to a given wind speed, in order to diagnose whether the difference in the measured and expected decelerations is attributable to such a secondary cause.

Alternatively, the sensor 1510 may be a grade sensor, such as an inclinometer, (e.g., GPS altitude sensor, pressure sensor, or the like) which is used to measure the grade of the railway 1506 at a particular location. The processor 1518 may compare the measured grade level provided by the sensor 1510 with the stored predetermined grade level within the memory 1519 for that particular location. The processor 1518 may determine whether the difference between the measured grade level and predetermined grade level exceeds a predetermined threshold difference, and if so, may correct the predetermined grade level stored in the memory 1519 for the particular location on the railway 1506, based on the measured grade level. In an exemplary embodiment, the predetermined grade level stored in the memory 1519 may be acquired from a shared database utilized by a plurality of trains in a communication network, and the correction to the predetermined grade level may be configured to further correct the shared database, such as by transmitting a signal to a remote station which houses a memory where the shared database is stored, for example.

In addition to the sensor 1510 measuring the deceleration of the train 1504, one or more electrical parameters may be measured during the activation of the dynamic braking system 1522. As illustrated in FIG. 25, a current sensor 1512 is positioned adjacent to the traction motors 1528, is coupled to the processor 1518, and is configured to measure the current passing from the traction motors 1528 along the bus 1531 and to the grids 1532, during the activation of the dynamic braking system 1522. The memory 1519 of the processor 1518 is stored with an expected current (or minimum current) from the traction motors 1528 to the grids 1532, for a particular notch setting of the engine 1526, a predetermined grade level (stored in the memory 1519) at a current location of the railway 1506, and a predetermined mass of the train 1504. The processor 1518 receives the measured current data from the sensor 1512, and compares it with the expected current stored in the memory 1519, for the particular notch setting, predetermined grade level, and predetermined mass. Based on this comparison, the processor 1518 may adjust the stored predetermined mass of the train 1504 within the memory 1519. For example, if the measured current exceeded the expected current, this may indicate that the dynamic braking system 1522 is under-performing present expectations, and thus the processor 1518 may further adjust the braking schedule from a second braking schedule 1562 to a first braking schedule 1560, for example. In another example, if the expected current exceeded the measured current, this may indicate that the dynamic braking system 1522 is out-performing present expectations, and the processor 1518 may further adjust the braking schedule from a first braking schedule 1560 to a second braking schedule 1562. A similar analysis may be performed by measuring the voltage difference across the grids 1532 with a voltage sensor 1513, and using a similar analysis as described above with regard to the electrical current. The above comparison of the measured and expected current presumes that the measured acceleration from the sensor 1510 is approximately equal to an expected acceleration stored in the memory 1519.

As illustrated in FIG. 25, the train 1504 includes a motoring system including the engine 1526, an alternator/rectifier 1527 ("ALT./RECT."), and an inverter 1529 ("INV."), which collectively communicate A/C electrical energy (or D/C electrical energy in a D/C configured locomotive) to traction motors 1528 that are coupled to the axles of the wheels 1530 of the locomotive 1505. Based on an activation level (or notch or other throttle setting) of the engine 1526, a greater/less amount of electrical energy is used to drive the traction motors 1528, thereby driving the axles of the wheels 1530, and potentially accelerating the train 1504 along the railway 1506. As with the dynamic braking system 1522 above, the sensor 1510 may be utilized to measure the acceleration of the train 1504 during an activation of the motoring system. The processor 1518 may retrieve an expected acceleration (or a minimum acceleration) from the memory 1519, based on the notch setting of the engine 1526, the stored predetermined grade level of the railway 1506 at a current location (determined by the position determination device 1533), and the predetermined mass of the train 1504. As described above with regard to the dynamic braking system 1522, the processor 1518 compares the measured acceleration with the expected acceleration, and correspondingly adjusts the stored predetermined mass of the train 1504 in the memory and the braking schedule. For example, if the measured acceleration exceeds the expected/minimum acceleration by greater than a predetermined threshold difference, the processor 1518 may reduce the predetermined mass of the train 1504, for example.

Figure 26:
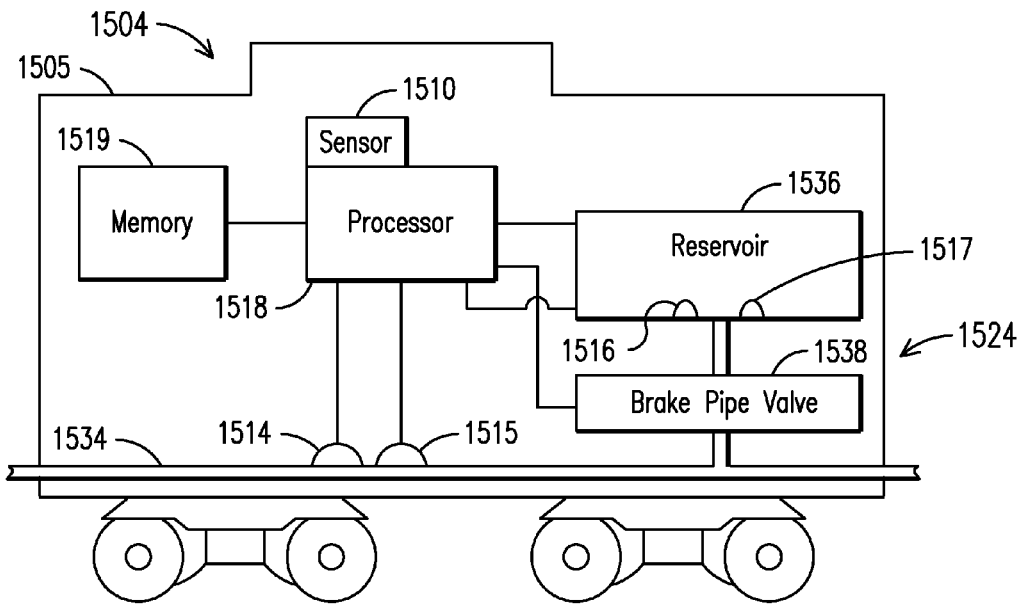
FIG. 26 is an exemplary embodiment of the locomotive in FIG. 23 with an air braking system used within a system for optimizing a braking schedule of the train in accordance with the present invention.

FIG. 26 illustrates an exemplary embodiment of the locomotive 1505 of the train 1504, including an air braking system 1524, which may supplement the dynamic braking system 1522 illustrated in FIG. 25. Although FIG. 26 illustrates a single locomotive 1505, the train 1504 may include one or more locomotives 1505 and/or one or more rail cars 1507, as discussed above in FIG. 25, and the air braking system 1524 may be used in some or all of those locomotive(s) and/or rail car(s). When an air braking system 1524 is installed in more than one locomotive and/or rail car of the train, a determination is made as to how many of the air braking systems 1524 within the train are operative. Such a determination as to whether the air braking system within each locomotive/rail car is operative may be made by comparing a measured and expected parameter related to the operation of the air braking system 1524, as discussed below. The optimal braking schedule may be selected/determined using a factor based on a ratio of the mass of the train 1504 (in tons) to the number of locomotives/rail cars within the train having an operative air braking system (or "tons per operative brake" or "TPOB"). As illustrated in FIG. 24, each braking schedule 1560,1562,1564,1566,1568 is assigned a respective TPOB ratio. In general, the smaller the TPOB ratio, the shorter the time or distance that is required for the train to stop, and thus the longer the time or distance the train may travel within the stopping distance 1558 before the braking system needs to be activated in order for the train to stop at the stop point 1580. Thus, as illustrated in FIG. 24, as the TPOB ratio decreases, the braking schedule is less conservative and more efficient, as the projected train speed is greater than (or equal to) the other braking schedules having a larger TPOB ratio.

As illustrated in FIG. 26, the air braking system 1524 includes an air pipe 1534 extending at least part of the length of the train 1504 (which is to say the air pipe typically extends to each car in the train, but not necessarily from the very front end to the very rear end of the train). Thus, although FIG. 26 only illustrates the locomotive 1505 of the train 1504, the air pipe 1534 extends along at least part of the length of the train 1504, including the rail car(s) and other locomotive(s), if present. Additionally, the air braking system 1524 includes a reservoir 1536 within the locomotive 1505 of the train 1504, and a brake pipe valve 1538 used to controllably couple the reservoir 1536 and the air pipe 1534. The brake pipe valve 1538 is coupled to the processor 1518. A pressure sensor 1514 is positioned to measure a pressure and rate of change of pressure within the air pipe 1534, and an air flow sensor 1515 is positioned to measure a volumetric flow and rate of change of volumetric flow of air passing through the air pipe 1534. Additionally, a pressure sensor 1516 is positioned within the reservoir 1536, to measure a pressure and rate of change of pressure within the reservoir 1536, and an air flow sensor 1517 is also positioned within the reservoir 1536, to measure a volumetric flow and rate of change of volumetric flow of air passing through the reservoir 1536. The sensors 1514,1515, 1516,1517 are coupled to the processor 1518, and provide the pressure and flow data to the processor 1518.

The processor 1518 opens the brake pipe valve 1538 to permit air to enter the reservoir 1536 from the air pipe 1534, when the measured pressure (or air flow) within the air pipe 1534 decreases to a predetermined threshold below the measured pressure (or air flow) within the reservoir 1536. Additionally, the sensor 1510 is utilized to measure the deceleration of the train 1504 during an activation of the air braking system 1524, and to communicate this acceleration data to the processor 1518. Various expected parameters, during an activation of the air braking system 1524, are stored in the memory 1519 of the processor 1518, such as an expected deceleration, an expected pressure within the air pipe 1534, and/or a rate of change of the pressure within the air pipe 1534. These stored expected parameters in the memory 1519 may be based on an activation level of the air braking system 1524, a grade level of the railway 1506 at the particular location of activation of the air braking system 1524, and/or a predetermined mass of the train 1504. Thus, during an activation of the air braking system 1524, the processor 1518 acquires the measured pressure and measured rate of change of pressure in the air pipe 1534 from the pressure sensor 1514, and the measured deceleration of the train 1504 from the sensor 1510. The processor 1518 subsequently compares the pressure, rate of change of pressure, and deceleration with the respective expected pressure, expected rate of change of pressure, and expected deceleration retrieved from the memory 1519. Based on these comparisons, the processor 1518 adjusts the stored predetermined mass of the train 1504 in the memory 1519, and/or adjusts the braking schedule, based on the adjustment to the predetermined mass. For example, if the processor 1518 determined that the measured deceleration exceeded the expected deceleration by a predetermined threshold difference, the processor 1518 would reduce the predetermined mass stored in the memory 1519, and correspondingly vary the braking schedule, such as from a first braking schedule 1560 to a second braking schedule 1562, for example. Additionally, if the processor 1518 determined that the rate of change of pressure exceeded the expected rate of change of pressure in the air pipe 1534 by a predetermined threshold difference, this may indicate that the air braking system 1524 is out-performing the expectations, and thus the processor 1518 would vary the braking schedule from a first braking schedule 1560 to a second braking schedule 1562, for example.

Instead of comparing the measured and the expected pressure and rate of change of pressure within the air pipe 1534, the processor 1518 may compare the measured and expected pressure and rate of change of pressure within the reservoir 1536. As discussed above, the pressure sensor 1516 provides the processor 1518 with the pressure and rate of change of pressure data from within the reservoir 1536. If the processor 1518 compares the pressure parameters to conclude that the air braking system 1524 is out-performing relative to expectations, such as determining that the measured pressure within the reservoir 1536 is greater than the expected pressure within the reservoir 1536, the processor 1518 may vary the braking schedule, such as varying a first braking schedule 1560 to a second braking schedule 1562, for example. Thus, if during an activation of the air braking system 1524, the processor 1518 determines that either the measured pressure exceeded the expected pressure within the reservoir 1536 and/or the rate of change of pressure exceeded the expected rate of change of pressure within the reservoir 1536, the processor 1518 may vary the braking schedule, such as from a first braking schedule 1560 to a second braking schedule 1562, for example. However, if the processor 1518 compares the pressure parameters to conclude that the air braking system 1524 is under-performing relative to expectations, such as determining that the measured pressure within the reservoir 1536 is lower than the expected pressure within the reservoir 1536, the processor 1518 may vary the braking schedule, such as varying a second braking schedule 1562 to a first braking schedule 1560, for example.

As with the above-performed comparisons by the processor 1518 regarding the measured and expected pressure and rate of change of pressure in the air pipe 1534 and/or the reservoir 1536, the processor 1518 may compare the measured and expected volumetric air flow and rate of change of volumetric air flow through the air pipe 1534 and/or the reservoir 1536. As discussed above, the air flow sensor 1515 provides the processor 1518 with the volumetric air flow and rate of change of volumetric air flow through the air pipe 1534 during an activation of the air braking system 1524. Similarly, the air flow sensor 1517 provides the processor 1518 with the volumetric air flow and rate of change of volumetric air flow through the reservoir 1536 during an activation of the air braking system 1524. The memory 1519 of the processor 1518 stores a respective expected air flow and expected rate of change of flow through the respective air pipe 1534 and reservoir 1536, during an activation of the air braking system 1524. As with the expected pressure and rate of change of pressure parameters discussed above, these stored expected parameters in the memory 1519 may be based on an activation level of the air braking system 1524, a grade level of the railway 1506 at the particular location of activation of the air braking system 1524, and/or a predetermined mass of the train 1504. The location of the activation of the air braking system 1524 may be provided by a position determination device (not shown in FIG. 26), similar to that shown in FIG. 25. During an activation of the air braking system 1524, the processor 1518 receives the measured deceleration from the sensor 1510, the measured air flow and rate of change of flow through the air pipe 1534 from the air flow sensor 1515, and/or the measured air flow and rate of change of flow through the reservoir 1536 from the air flow sensor 1517. The processor 1518 compares the measured deceleration, the measured air flow and rate of change of air flow through the air pipe 1534, with the respective expected deceleration, expected air flow and expected rate of change of air flow through the air pipe 1534. Based on comparing the measured deceleration with the expected deceleration, the processor 1518 adjusts the predetermined mass of the train 1504 stored in the memory 1519, such as if the measured deceleration exceeds the expected deceleration by a predetermined threshold difference. Based on comparing the measured and expected air flow parameters within the air pipe/reservoir, the processor 1518 may determine whether the air braking system 1524 is adequately performing relative to expectations. For example, if the measured rate of change of air flow exceeds the expected rate of change of air flow in the air pipe 1534, the processor 1518 may determine that the air braking system 1524 is out-performing relative to expectations, and may adjust the braking schedule, such as varying the braking schedule from a first braking schedule 1560 to a second braking schedule 1562, for example. However, if the measured rate of change of air flow is lower than the expected rate of change of air flow in the air pipe 1534, the processor 1518 may determine that the air braking system 1524 is under-performing relative to expectations, and may adjust the braking schedule from a second braking schedule 1562 to a first braking schedule 1560, for example.

Figure 27:
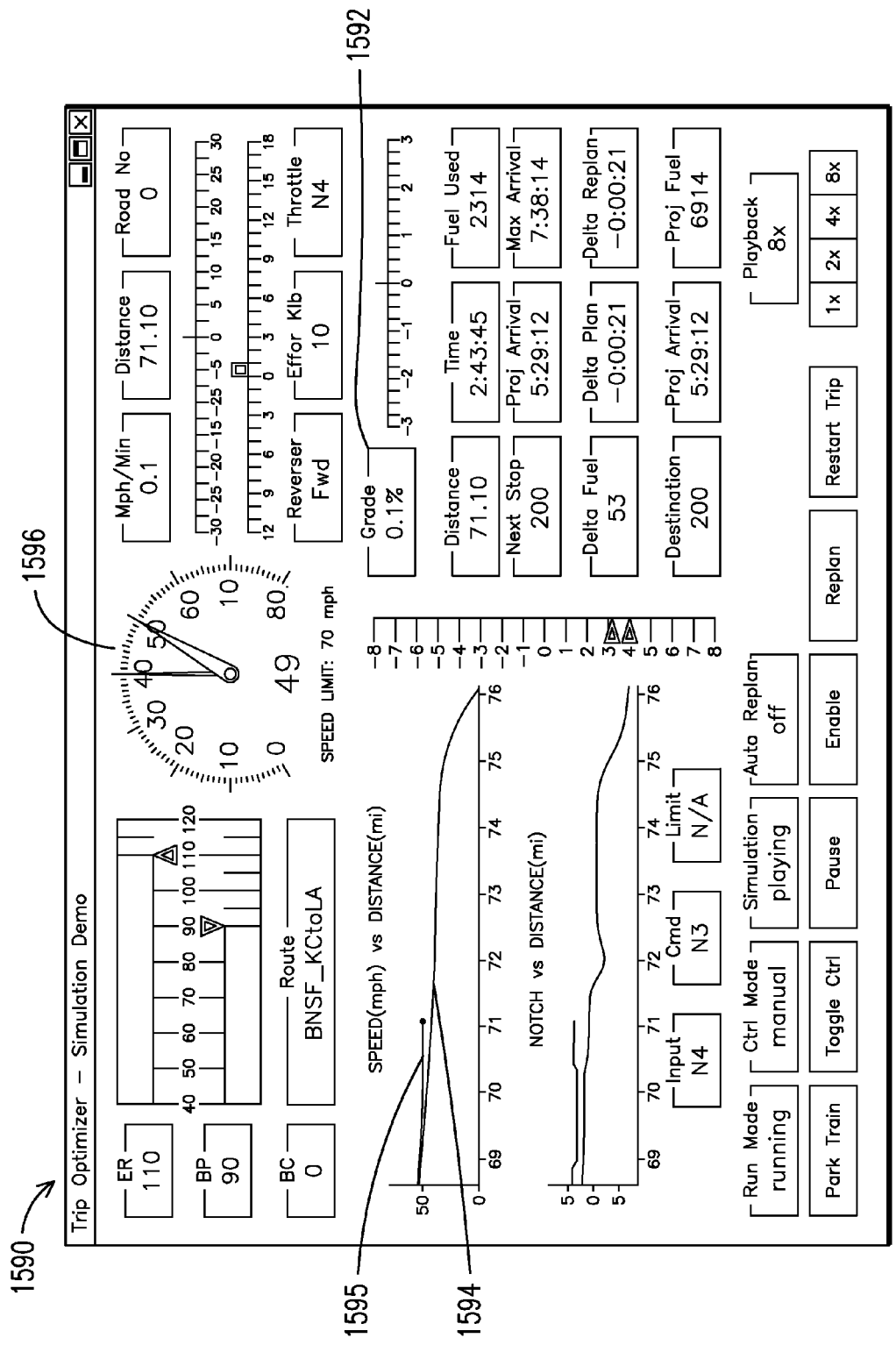
FIG. 27 is an exemplary embodiment of an operator display, within the locomotive illustrated in FIG. 23, illustrating the optimized braking schedule selected from FIG. 24.

FIG. 27 illustrates a sample display 1590 positioned in an operator cabin of the locomotive 1505, which includes a braking schedule 1594 along with a current speed profile 1595, over a distance along the railway 1506. Thus, the operator can visually see whether the current speed of the locomotive 1505 is properly tracking the predetermined speed of the braking schedule 1594, so that the train 1504 stops at the stop point. Additionally, the display 1590 includes a speed gauge 1596 with a current and projected speed, and a grade indicator 1592. For example, in the sample display 1590, the current speed profile 1595 indicates a speed at position 71 in excess of the braking schedule 1594 predetermined speed. Thus, the operator may manually activate the braking system to an activation level such that the current speed profile 1595 approaches the braking schedule 1594 predetermined speed, for example.

Figure 28:
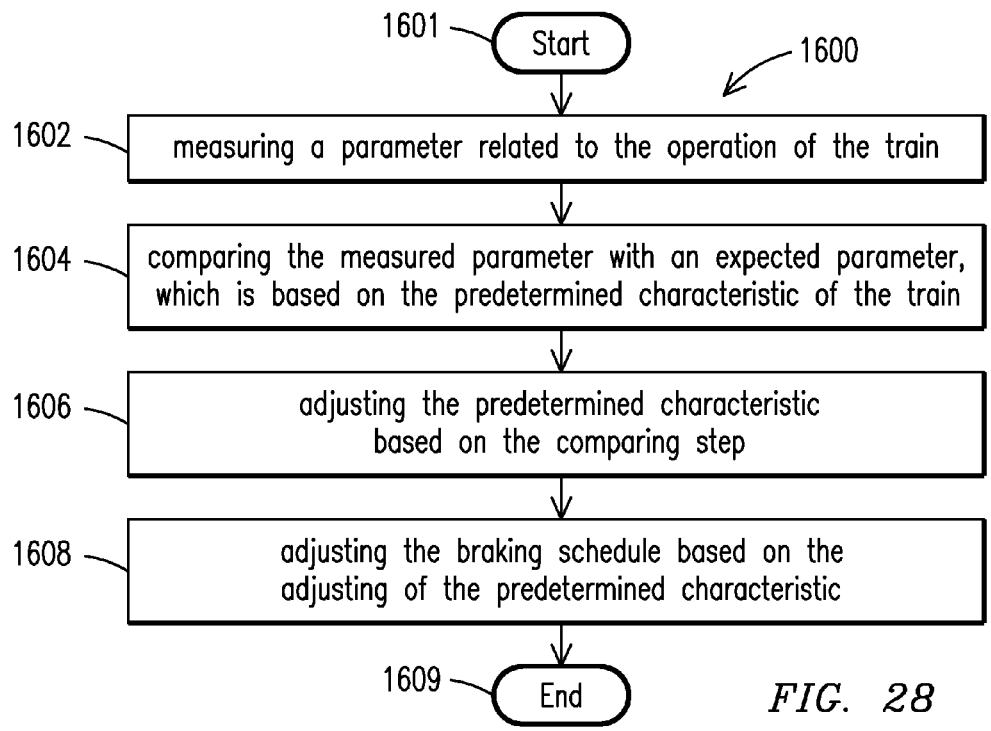
FIG. 28 is a flow chart illustrating an exemplary embodiment of a method for monitoring the effectiveness of braking function in accordance with the present invention.

FIG. 28 illustrates a flow chart depicting a method 1600 for optimizing a braking schedule 1560 of a train 1504 traveling along a railway 1506. The braking schedule 1560 is based on a predetermined characteristic of the train 1504 and is enacted in a stopping distance (or braking region) 1558 along the railway 1506. The method 1600 begins at 1601 by measuring 1602 a parameter related to the operation of the train 1504 (the measured parameter). The method 1600 further includes comparing 1604 the measured parameter with an expected parameter, which is based on the predetermined characteristic of the train 1504. The method 1600 further includes adjusting 1606 the predetermined characteristic based on the comparing 1604 step, and adjusting 1608 the braking schedule 1560 based on the adjusting 1606 of the predetermined characteristic, before ending at 1609.

This written description uses examples to disclose embodiments of the invention, including the best mode, and also to enable any person skilled in the art to make and use the embodiments of the invention. The patentable scope of the embodiments of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system comprising:
   a first sensor configured to measure a parameter related to an operation of a powered system traveling along a route; and
   a processor configured to be coupled to the first sensor and to receive data of the parameter;
   wherein the processor also is configured to compare the parameter that is measured with an expected parameter that is based on at least one predetermined characteristic of the powered system to determine a parameter comparison;
   wherein the processor also is configured to adjust the at least one predetermined characteristic by a characteristic adjustment that is based on the parameter comparison; and
   wherein the processor is configured to adjust a braking schedule of the powered system based on the characteristic adjustment to the at least one predetermined characteristic.

2. The system of claim 1, wherein the parameter that is measured and the expected parameter are related to operation of at least one of a motoring system or a braking system of the powered system; and the at least one predetermined characteristic is at least one of a physical characteristic of the powered system or a performance rating of the at least one of the motoring system or the braking system.

3. The system of claim 2,
   wherein the motoring system includes an engine coupled to a plurality of traction motors coupled to a respective plurality of wheels of the powered system; the expected parameter is a expected acceleration during the operation of the motoring system; the expected acceleration being based on at least one of an activation level of the motoring system, a grade level of the route, or a predetermined mass of the powered system;

wherein the first sensor is configured to measure a measured acceleration of the powered system during the operation of the motoring system; and wherein the processor is configured to compare the measured acceleration that is measured with the expected acceleration to determine an acceleration comparison; and the processor is further configured to adjust the predetermined mass of the powered system by a mass adjustment that is based on the acceleration comparison, and to adjust the braking schedule based on the mass adjustment to the predetermined mass of the powered system.

4. The system of claim 3, further comprising a second sensor that is configured to measure a grade level of the route during the operation of the motoring system; and wherein the processor includes a memory configured to store a predetermined grade level of the route; the processor also being configured to compare the grade level that is measured with the predetermined grade level to determine a grade level comparison, the processor also configured to adjust the predetermined grade level by a grade level adjustment in the memory based on the grade level comparison.

5. The system of claim 3, wherein subsequent to the processor comparing the measured acceleration with the expected acceleration, the processor is configured to determine whether a difference in the measured acceleration and the expected acceleration is based on a secondary cause apart from the mass adjustment to the predetermined mass.

6. The system of claim 3, wherein subsequent to the processor comparing the measured acceleration with the expected acceleration, the processor is configured to determine whether a difference in the measured acceleration and the expected acceleration is based on a secondary cause apart from the mass adjustment to the predetermined mass;

and wherein the secondary cause includes one or more of an ambient weather condition or a structural feature of the powered system traveling along the route.

7. The system of claim 2, wherein the braking system is a dynamic braking system including a plurality of traction motors coupled to a respective plurality of wheels, the plurality of traction motors being electrically coupled to a plurality of grids; the expected parameter including at least one of a expected deceleration or a expected current generated by the plurality of traction motors to the plurality of grids during the operation of the braking system; the expected parameter being based on at least one of an activation level of the braking system, a grade level of the route, or a predetermined mass of the powered system;

wherein the first sensor is configured to measure at least one of a measured deceleration or a measured current generated by the traction motors to the plurality of grids; and wherein the processor is configured to compare the at least one of the measured deceleration the measured current with at least one of the expected deceleration or the expected current to determine at least one of a deceleration comparison or a current comparison; the processor further configured to adjust the predetermined mass of the powered system by a mass adjustment that is based on the at least one of the deceleration comparison or the current comparison, and to adjust the braking schedule based on the mass adjustment to the predetermined mass of the powered system.

8. The system of claim 7, wherein the processor is configured to compare the measured current with the expected current to adjust the performance rating of the braking system by a rating adjustment that is based upon a difference between the measured current and the expected current;

and wherein the processor is further configured to adjust the braking schedule based on the rating adjustment to the performance rating of the braking system.

9. The system of claim 2, wherein the powered system includes a train including at least one locomotive consist and at least one rail car; and the braking system includes an air braking system having:

an air pipe extending at least part of a length of the train;

a reservoir within at least one of a locomotive of the at least one locomotive consist or the at least one rail car; and a respective valve to controllably couple the reservoir and the air pipe, the respective valve configured to be coupled to the processor, and the processor configured to open the respective valve and permit air to enter the reservoir from the air pipe based on a pressure within the air pipe decreasing to a predetermined pressure threshold below a pressure within the reservoir;

wherein the expected parameter is at least one of a expected deceleration, an expected air pipe pressure within the air pipe, or an expected rate of change of air pipe pressure within the air pipe during the operation of the braking system; the expected parameter being based on at least one of an activation level of the braking system, a grade level of the route, or a predetermined mass of the powered system;

further comprising a second sensor configured to measure at least one of a measured deceleration, a measured air pipe pressure at one or more incremental locations along the length of the train, or a measured air pipe pressure rate of change of pressure within the air pipe; and wherein the processor is configured to compare the at least one of the measured deceleration, the measured air pipe pressure, or the measured rate of change of pressure within the air pipe with the at least one of the expected acceleration, the expected air pipe pressure, or the expected rate of change of air pipe pressure to determine a parameter comparison; the processor further configured to adjust the predetermined mass of the powered system by a mass adjustment that is based on the parameter comparison and to adjust the braking schedule based on the mass adjustment to the predetermined mass of the powered system.

10. The system of claim 9, further comprising a third sensor configured to measure a measured reservoir pressure within the reservoir prior to an adjustment to the activation level of the braking system;

wherein the processor is configured to compare the measured reservoir pressure within the reservoir with the measured air pipe pressure within the air pipe to adjust the performance rating of the braking system by a rating adjustment that is based upon a difference between the measured reservoir pressure within the respective reservoir and the measured air pipe pressure within the air pipe; and wherein the processor is further configured to adjust the braking schedule based on the rating adjustment to the performance rating of the braking system.

11. The system of claim 2, wherein the powered system includes a train including at least one locomotive consist and at least one rail car, and the braking system is an air braking system having:

an air pipe extending at least part of a length of the train;

a reservoir within at least one of a locomotive of the at least one locomotive consist or the at least one rail car; and a respective valve to controllably couple the reservoir and the air pipe, the respective valve configured to be coupled to the processor, and the processor configured to open the respective valve and permit air to enter the reservoir from the air pipe based on an air flow within the air pipe decreasing to a predetermined threshold below an air flow within the reservoir;

wherein the expected parameter is at least one of a expected deceleration, an expected air flow within the air pipe, or an expected rate of change of air flow within the air pipe during the operation of the braking system; the expected parameter based on at least one of an activation level of the braking system, a grade level of the route, or a predetermined mass of the powered system;

further comprising a second sensor configured to measure a measured deceleration, a measured air flow within the air pipe at one or more incremental locations along the length of the train, or a measured rate of change of air flow within the air pipe; and wherein the processor is configured to compare the at least one of the measured deceleration, the measured air flow within the air pipe, or the measured rate of change of air flow within the air pipe with the at least one of the expected deceleration, the expected air flow within the air pipe, or the expected rate of change of air flow within the air pipe to determine a parameter comparison; the processor further configured to adjust the predetermined mass of the powered system by a mass adjustment that is based on the parameter comparison, and to adjust the braking schedule based on the mass adjustment to the predetermined mass of the powered system.

12. A method comprising:

enacting a braking schedule in a braking region along a route on which a powered system travels, the braking schedule based on at least one predetermined characteristic of the powered system;

measuring a parameter related to an operation of the powered system;

comparing the parameter that is measured with an expected parameter, the expected parameter based on the at least one predetermined characteristic of the powered system;

adjusting the at least one predetermined characteristic based on the comparing; and adjusting the braking schedule based on the adjusting to the at least one predetermined characteristic.

13. The method of claim 12, wherein the parameter that is measured and the expected parameter are related to an operation of at least one of a motoring system or a braking system of the powered system; and the at least one predetermined characteristic is at least one of a physical characteristic of the powered system or a performance rating of one or more of the motoring system or the braking system.

14. The method of claim 13, wherein the motoring system includes an engine coupled to a plurality of traction motors coupled to a respective plurality of wheels of the powered system; the expected parameter is a expected acceleration during the operation of the motoring system that is based on at least one of an activation level of the motoring system, a grade level of the route, or a predetermined mass of the powered system;

wherein measuring includes measuring a measured acceleration of the powered system during the operation of the motoring system;

wherein comparing includes comparing the measured acceleration with the expected acceleration; and wherein adjusting the at least one predetermined characteristic includes adjusting the predetermined mass of the powered system by a mass adjustment that is based on the comparing.

15. The method of claim 14, wherein subsequent to comparing the measured acceleration with the expected acceleration, the method further includes determining whether a difference between the measured acceleration and the expected acceleration is attributable to a secondary cause other than the mass adjustment to the predetermined mass.

16. The method of claim 14, wherein measuring includes measuring the grade level of the route as a measured grade level during the operation of the motoring system;

wherein comparing includes comparing the measured grade level with a predetermined grade level; and wherein adjusting the at least one predetermined characteristic includes adjusting the predetermined grade level of the route based on the comparing.

17. The method of claim 13, wherein the braking system is a dynamic braking system including a plurality of traction motors coupled to a respective plurality of wheels, the plurality of traction motors being electrically coupled to a plurality of grids; the expected parameter being at least one of a expected deceleration or a expected current generated by the plurality of traction motors to the plurality of grids during the operation of the braking system; the expected parameter being based on at least one of an activation level of the braking system, a grade level of the route, or a predetermined mass of the powered system;

wherein measuring includes measuring at least one of a deceleration of the powered system as a measured deceleration or a current generated by the traction motors to the plurality of grids as a measured current;

wherein comparing includes comparing the at least one of the measured deceleration or the measured current with the at least one of the expected deceleration or the expected current; and wherein adjusting the at least one predetermined characteristic includes adjusting the predetermined mass of the powered system by a mass adjustment that is based on the comparing.

18. The method of claim 17, wherein subsequent to comparing the measured current with the designated current, the method includes:

adjusting the performance rating of the braking system by a braking adjustment that is based upon a difference between the measured current and the expected current; and adjusting the braking schedule based on the braking adjustment of the braking system.

19. The method of claim 13, wherein the powered system includes a train having at least one locomotive consist and at least one rail car; and the braking system includes an air braking system having:

an air pipe extending at least part of a length of the train;

a reservoir within at least one of a locomotive of the at least one locomotive consist or the at least one rail car; and a respective valve to controllably couple the reservoir and the air pipe based on a pressure within the air pipe decreasing to a predetermined threshold below a pressure within the reservoir;

wherein the expected parameter is at least one of an expected deceleration, an expected pressure within the air pipe, or an expected rate of change of pressure within the air pipe during the operation of the braking system; the expected parameter being based on at least one of an activation level of the braking system, a grade level of the route, or a predetermined mass of the powered system;

wherein measuring includes measuring at least one of a measured deceleration of the powered system, a measured pressure of the air pipe at one or more incremental locations along the length of the train, or a measured rate of change of pressure within the air pipe;

wherein comparing includes comparing the at least one of the measured deceleration, the measured pressure of the air pipe, or the measured rate of change of pressure within the air pipe with the at least one of the expected deceleration, the expected pressure, or the expected rate of change; and wherein adjusting the at least one predetermined characteristic includes adjusting the predetermined mass of the powered system by a mass adjustment that is based on the comparing.

20. The method of claim 19, further comprising:

measuring a measured pressure within the reservoir;

adjusting the activation level of the braking system after measuring the measured pressure;

comparing the measured pressure within the reservoir with the measured pressure within the air pipe;

adjusting the performance rating of the braking system by a rating adjustment that is based upon a difference between the measured pressure within the reservoir and the measured pressure within the air pipe; and adjusting the braking schedule based on the rating adjustment to the performance rating of the braking system.

21. The method of claim 13, wherein the powered system includes a train comprising at least one locomotive consist and at least one rail car; and the braking system includes an air braking system having:

an air pipe extending at least part of a length of the train;

a reservoir within at least one of a locomotive of the at least one locomotive consist or the at least one rail car; and a respective valve to controllably couple the reservoir and the air pipe, based on an air flow within the air pipe decreasing to a predetermined threshold below an air flow within the reservoir;

wherein the expected parameter is at least one of an expected deceleration of the powered system, an expected air flow within the air pipe, or an expected rate of change of air flow within the air pipe during the operation of the braking system; and the expected parameter is based on at least one of an activation level of the braking system, a grade level of the route, or a predetermined mass of the powered system;

wherein measuring includes measuring at least one of a measured deceleration of the powered system, a measured air flow at one or more incremental locations along the length of the train, or a measured rate of change of air flow within the air pipe;

wherein comparing includes comparing the at least one of the measured deceleration, the measured air flow, or the measured rate of change of air flow within the air pipe with the at least one of the expected deceleration, the expected air flow, or the expected rate of change of air flow; and wherein adjusting the at least one predetermined characteristic includes adjusting the predetermined mass of the powered system by a mass adjustment that is based on the comparing.

22. A locomotive comprising:

a locomotive traction assembly comprising a chassis, a motoring and system, and a braking system attached to and supported by the chassis;

a sensor attached to the locomotive traction assembly and configured to measure a measured parameter related to an operation of the at least one of the motoring system or the braking system;

a processor coupled to the sensor and configured to receive data of the measured parameter;

wherein the processor is configured to control at least one of the motoring system or the braking system to enact a braking schedule in a braking region along a route of the locomotive, the braking schedule based on at least one predetermined characteristic of the powered system;

wherein the processor is configured to compare the measured parameter with an expected parameter that is based on or otherwise relates to the at least one predetermined characteristic of the powered system to determine a parameter comparison;

wherein the processor is configured to adjust the at least one predetermined characteristic by a characteristic adjustment that is based on the parameter comparison; and wherein the processor is configured to adjust the braking schedule based on the characteristic adjustment of the at least one predetermined characteristic, the predetermined characteristic being at least one of a performance rating of the motoring system, the braking system, or a physical characteristic of the powered system.

* * * * *